US008665571B2

(12) United States Patent
Salcedo et al.

(10) Patent No.: US 8,665,571 B2
(45) Date of Patent: Mar. 4, 2014

(54) APPARATUS AND METHOD FOR INTEGRATED CIRCUIT PROTECTION

(75) Inventors: Javier A Salcedo, North Billerica, MA (US); Paul Cheung, North Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 278 days.

(21) Appl. No.: 13/110,284

(22) Filed: May 18, 2011

(65) Prior Publication Data
US 2012/0293904 A1    Nov. 22, 2012

(51) Int. Cl.
*H02H 9/00*    (2006.01)
*H02H 1/00*    (2006.01)
*H02H 1/04*    (2006.01)
*H02H 3/22*    (2006.01)
*H02H 9/06*    (2006.01)

(52) U.S. Cl.
USPC ............................................. 361/56; 361/118

(58) Field of Classification Search
USPC .................................................... 361/56, 118
See application file for complete search history.

(56) References Cited

U.S. PATENT DOCUMENTS

| 3,436,667 | A | 4/1969 | Leonard |
| 4,633,283 | A | 12/1986 | Avery |
| 5,061,652 | A | 10/1991 | Bendernagel et al. |
| 5,276,582 | A | 1/1994 | Merrill et al. |
| 5,341,005 | A | 8/1994 | Canclini |
| 5,343,053 | A | 8/1994 | Avery |
| 5,652,689 | A | 7/1997 | Yuan |
| 5,663,860 | A | 9/1997 | Swonger |
| 5,742,084 | A | 4/1998 | Yu |
| 5,781,389 | A | 7/1998 | Fukuzako et al. |
| 5,889,644 | A | 3/1999 | Schoenfeld et al. |
| 6,137,140 | A | 10/2000 | Efland et al. |
| 6,144,542 | A | 11/2000 | Ker et al. |

(Continued)

FOREIGN PATENT DOCUMENTS

| DE | 10 2007 040 875 A1 | 3/2009 |
| EP | 0 168 678 A2 | 1/1986 |

(Continued)

OTHER PUBLICATIONS

Anderson et al., *ESD Protection under Wire Bonding Pads*, EOS/ESD Symposium 99-88, pp. 2A.4.1-2A.4.7 (1999).

(Continued)

*Primary Examiner* — Dharti Patel
(74) *Attorney, Agent, or Firm* — Knobbe Martens Olson & Bear LLP

(57) ABSTRACT

Apparatus and methods for integrated circuit protection are provided. In one embodiment, an integrated circuit (IC) includes a first pad, a second pad, a third pad, a first protection subcircuit coupled between the first pad and a common node, a second protection subcircuit coupled between the second pad and the common node, and a third protection subcircuit coupled between the third pad and the common node. The first, second, and third protection subcircuits each include one or more building blocks for maintaining the voltage of each of the pads within a predefined safe range, as well as to maintain the voltage between each of the pads within acceptable limits. A portion of the building blocks used to provide transient signal protection can be shared between pads, thereby reducing the area of the pad protection circuit relative to a scheme using a separate stack of building blocks for each pad.

23 Claims, 48 Drawing Sheets

(56) References Cited

U.S. PATENT DOCUMENTS

| | | |
|---|---|---|
| 6,236,087 B1 | 5/2001 | Daly et al. |
| 6,258,634 B1 | 7/2001 | Wang et al. |
| 6,310,379 B1 | 10/2001 | Andresen et al. |
| 6,329,694 B1 | 12/2001 | Lee et al. |
| 6,404,261 B1 | 6/2002 | Grover et al. |
| 6,512,662 B1 | 1/2003 | Wang |
| 6,590,273 B2 | 7/2003 | Okawa et al. |
| 6,665,160 B2 * | 12/2003 | Lin et al. .................. 361/56 |
| 6,667,870 B1 | 12/2003 | Segervall |
| 6,704,180 B2 | 3/2004 | Tyler et al. |
| 6,724,603 B2 | 4/2004 | Miller et al. |
| 6,756,834 B1 * | 6/2004 | Tong et al. .................. 327/309 |
| 6,768,616 B2 | 7/2004 | Mergens et al. |
| 6,960,792 B1 | 11/2005 | Nguyen |
| 7,034,363 B2 | 4/2006 | Chen |
| 7,038,280 B2 | 5/2006 | Righter |
| 7,071,528 B2 | 7/2006 | Ker et al. |
| 7,232,705 B2 | 6/2007 | Righter |
| 7,232,711 B2 | 6/2007 | Gambino et al. |
| 7,335,543 B2 | 2/2008 | Chen et al. |
| 7,345,341 B2 | 3/2008 | Lin et al. |
| 7,385,793 B1 | 6/2008 | Ansel et al. |
| 7,436,640 B2 | 10/2008 | Su et al. |
| 7,566,914 B2 | 7/2009 | Salcedo et al. |
| 7,601,991 B2 | 10/2009 | Salcedo et al. |
| 7,663,190 B2 | 2/2010 | Vinson |
| 7,714,357 B2 | 5/2010 | Hayashi et al. |
| 7,834,378 B2 | 11/2010 | Ryu et al. |
| 7,969,006 B2 | 6/2011 | Lin et al. |
| 8,044,457 B2 | 10/2011 | Salcedo et al. |
| 8,222,698 B2 | 7/2012 | Salcedo et al. |
| 8,368,116 B2 | 2/2013 | Salcedo et al. |
| 8,432,651 B2 | 4/2013 | Salcedo et al. |
| 2001/0040254 A1 | 11/2001 | Takiguchi |
| 2002/0021538 A1 * | 2/2002 | Chen et al. .................. 361/56 |
| 2002/0109190 A1 | 8/2002 | Ker et al. |
| 2002/0122280 A1 | 9/2002 | Ker et al. |
| 2002/0187601 A1 | 12/2002 | Lee et al. |
| 2003/0076636 A1 | 4/2003 | Ker et al. |
| 2004/0135229 A1 | 7/2004 | Sasahara |
| 2004/0164354 A1 | 8/2004 | Mergens et al. |
| 2004/0190208 A1 | 9/2004 | Levit |
| 2004/0207021 A1 | 10/2004 | Russ et al. |
| 2004/0240128 A1 | 12/2004 | Boselli et al. |
| 2005/0012155 A1 | 1/2005 | Ker et al. |
| 2005/0082618 A1 | 4/2005 | Wu et al. |
| 2005/0087807 A1 | 4/2005 | Righter |
| 2005/0088794 A1 | 4/2005 | Boerstler et al. |
| 2005/0093069 A1 | 5/2005 | Logie |
| 2005/0151160 A1 | 7/2005 | Salcedo et al. |
| 2006/0033163 A1 | 2/2006 | Chen |
| 2006/0109595 A1 | 5/2006 | Watanabe et al. |
| 2006/0145260 A1 | 7/2006 | Kim |
| 2006/0186467 A1 | 8/2006 | Pendharkar et al. |
| 2007/0007545 A1 | 1/2007 | Salcedo et al. |
| 2007/0158748 A1 | 7/2007 | Chu et al. |
| 2008/0044955 A1 | 2/2008 | Salcedo et al. |
| 2008/0067601 A1 | 3/2008 | Chen |
| 2009/0032838 A1 | 2/2009 | Tseng et al. |
| 2009/0206376 A1 | 8/2009 | Mita et al. |
| 2009/0230426 A1 | 9/2009 | Carpenter et al. |
| 2009/0309128 A1 | 12/2009 | Salcedo et al. |
| 2010/0163973 A1 | 7/2010 | Nakamura et al. |
| 2010/0327343 A1 | 12/2010 | Salcedo et al. |
| 2011/0101444 A1 | 5/2011 | Coyne et al. |
| 2011/0110004 A1 | 5/2011 | Maier |
| 2011/0176244 A1 | 7/2011 | Gendron et al. |
| 2011/0284922 A1 | 11/2011 | Salcedo et al. |
| 2011/0303947 A1 | 12/2011 | Salcedo et al. |
| 2011/0304944 A1 | 12/2011 | Salcedo et al. |
| 2012/0007207 A1 | 1/2012 | Salcedo |
| 2012/0008242 A1 | 1/2012 | Salcedo |
| 2012/0199874 A1 | 8/2012 | Salcedo et al. |
| 2012/0205714 A1 | 8/2012 | Salcedo et al. |

FOREIGN PATENT DOCUMENTS

| | | |
|---|---|---|
| EP | 1 703 560 A2 | 9/2006 |
| KR | 10-2006-0067100 | 2/2006 |
| KR | 10-2009-0123683 | 12/2009 |
| KR | 10-2010-0003569 | 1/2010 |

OTHER PUBLICATIONS

Luh et al. *A Zener-Diode-Activated ESD Protection Circuit for Sub-Micron CMOS Processes*, Circuits and Systems, IEEE International Symposium, May 28-31, 2000, Geneva, Switzerland, 4 pages.

Salcedo et al., Electrostatic Discharge Protection Framework for Mixed-Signal High Voltage CMOS Applications, IEEE Xplore, downloaded Feb. 23, 2010 at 12:53 EST.

International Search Report and Written Opinion of the International Searching Authority in counterpart International Appl. No. PCT/US2011/039101, dated Aug. 19, 2011, 92 pages.

Salcedo et al., *Electrostatic Discharge Protection Framework for Mixed-Signal High Voltage CMOS Applications*, 2008 IEEE, 4 pages.

CM1204 Datasheet, ON Semiconductor, 4-Channel ESD Array in CSP, 9 pages (Apr. 2010).

* cited by examiner

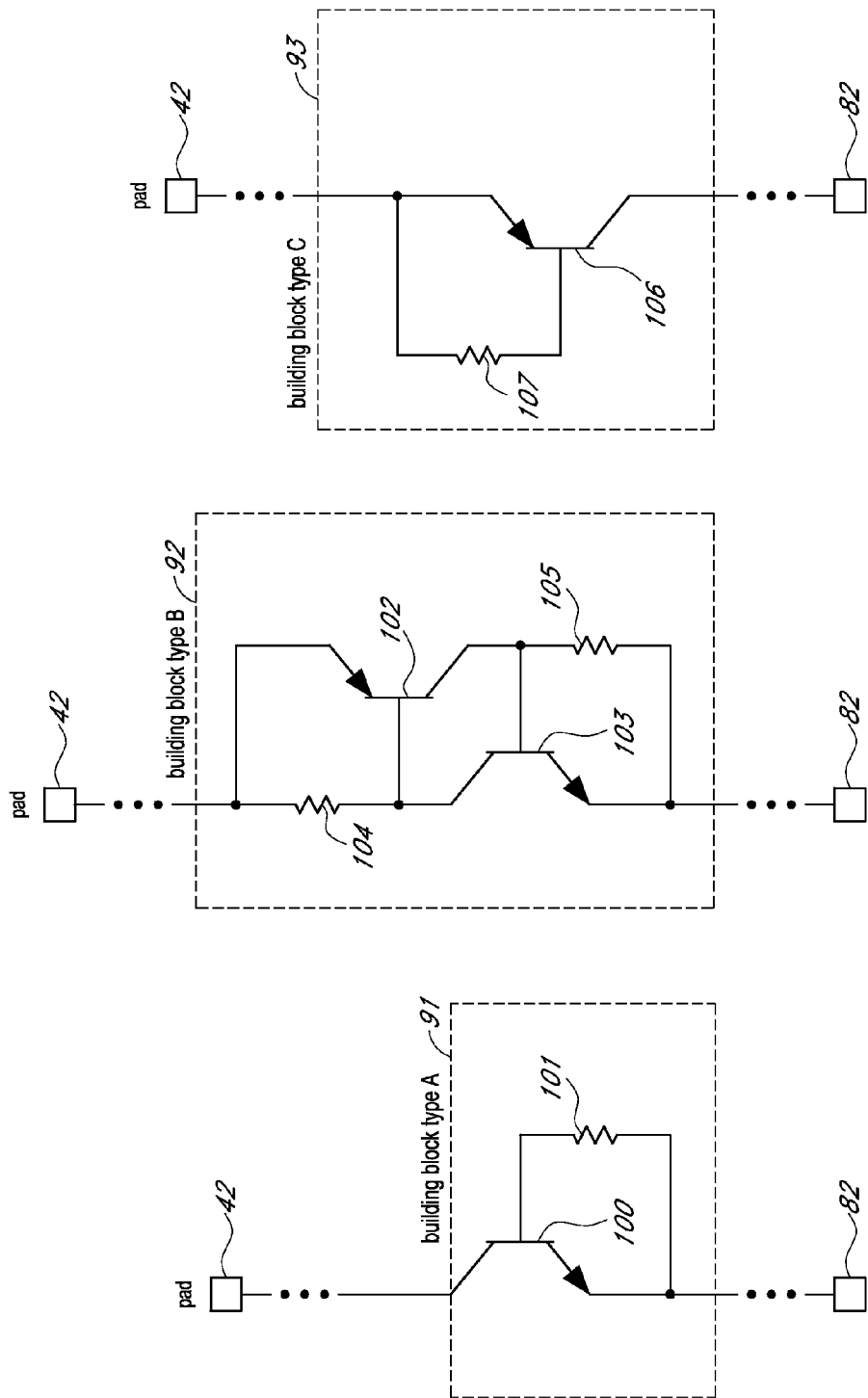

APPARATUS AND METHOD FOR INTEGRATED CIRCUIT PROTECTION

CROSS-REFERENCE TO RELATED APPLICATIONS

This application is related to commonly-owned U.S. patent application Ser. No. 12/797,463, filed Jun. 9, 2010, titled "APPARATUS AND METHOD FOR ELECTRONIC SYSTEMS RELIABILITY" and to commonly-owned U.S. patent application Ser. No. 12/797,461, filed Jun. 9, 2010, titled "APPARATUS AND METHOD FOR PROTECTING ELECTRONIC CIRCUITS".

BACKGROUND

1. Field

Embodiments of the invention relate to electronic systems, and more particularly, to protection circuits for electronic systems.

2. Description of the Related Technology

Certain electronic systems can be exposed to a transient signal event, or an electrical signal of a relatively short duration having rapidly changing voltage and high power. Transient signal events can include, for example, electrostatic discharge (ESD) events arising from the abrupt release of charge from an object or person to an electronic system.

Transient signal events can damage integrated circuits (ICs) inside an electronic system due to overvoltage conditions and/or high levels of power dissipation over relatively small areas of the ICs. High power dissipation can increase IC temperature, and can lead to numerous problems, such as gate oxide punch-through, junction damage, metal damage, and surface charge accumulation. Moreover, transient signal events can induce latch-up (in other words, inadvertent creation of a low-impedance path), thereby disrupting the functioning of the IC and potentially causing permanent damage to the IC. Thus, there is a need to provide an IC with protection from such transient signal events.

SUMMARY

Apparatus and methods for integrated circuit protection are provided. In one embodiment, an apparatus comprises an integrated circuit. The integrated circuit includes a first pad disposed on a surface of the integrated circuit, a second pad disposed on the surface of the integrated circuit, a third pad disposed on the surface of the integrated circuit, and a protection circuit disposed within the integrated circuit. The protection circuit includes a first protection subcircuit electrically coupled between the first pad and a first node of the integrated circuit, a second protection subcircuit electrically coupled between the second pad and the first node, and a third protection subcircuit electrically coupled between the first node and the third pad. The first node is not directly associated with the first pad, the second pad, or the third pad. The first and third protection subcircuits are configured to provide voltage clamping for transient electrical event protection when a transient electrical event is received between the first pad and the third pad by providing a low impedance path between the first pad and the third pad, and the second and third protection subcircuits are configured to provide voltage clamping for transient electrical event protection when a transient electrical event is received between the second pad and the third pad by providing a low impedance path between the second pad and the third pad, and the first and second protection subcircuits are configured to provide voltage clamping for transient electrical event protection when a transient electrical event is received between the first pad and the second pad by providing a low impedance path between the first pad and the second pad.

In another embodiment, an apparatus comprises an integrated circuit. The integrated circuit includes a first pad disposed on a surface of the integrated circuit, a second pad disposed on the surface of the integrated circuit, a third pad disposed on the surface of the integrated circuit, and a protection circuit disposed within the integrated circuit. The protection circuit includes a first means for protecting electrically coupled between the first pad and a first node of the integrated circuit, a second means for protecting electrically coupled between the second pad and the first node, and a third means for protecting electrically coupled between the first node and the third pad. The first node is not directly associated with the first pad, the second pad, or the third pad. The first and third protecting means are configured to provide voltage clamping for transient electrical event protection when a transient electrical event is received between the first pad and the third pad by providing a low impedance path between the first pad and the third pad. The second and third protecting means are configured to provide voltage clamping for transient electrical event protection when a transient electrical event is received between the second pad and the third pad by providing a low impedance path between the second pad and the third pad. The first and second protecting means are configured to provide voltage clamping for transient electrical event protection when a transient electrical event is received between the first pad and the second pad by providing a low impedance path between the first pad and the second pad.

BRIEF DESCRIPTION OF THE DRAWINGS

FIG. 5A is a circuit diagram illustrating a pad circuit building block in accordance with one embodiment.

FIG. 5B is a circuit diagram illustrating a pad circuit building block in accordance with another embodiment.

FIG. 5C is a circuit diagram illustrating a pad circuit building block in accordance with yet another embodiment.

DETAILED DESCRIPTION OF EMBODIMENTS

Figure 1:
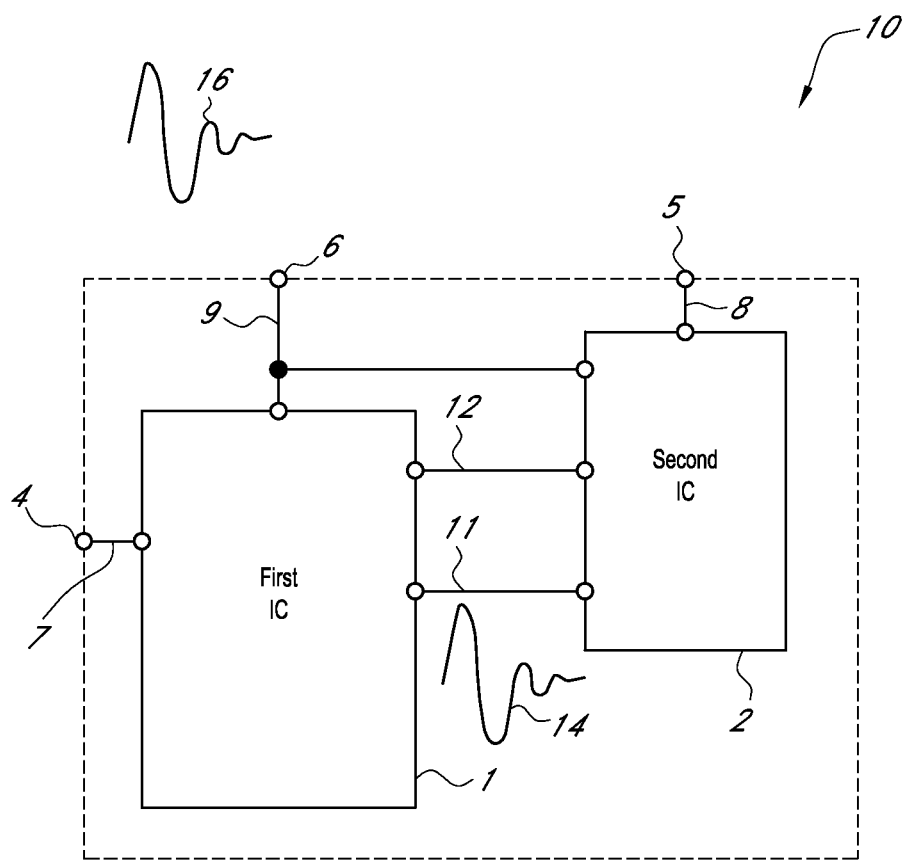
FIG. 1 is a schematic block diagram of one example of an electronic system.

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

Electronic systems are typically configured to protect circuits or components therein from transient signal events. Furthermore, to help assure that an electronic system is reliable, manufacturers can test the electronic system under defined stress conditions, which can be described by standards set by various organizations, such as the Joint Electronic Device Engineering Council (JEDEC), the International Electrotechnical Commission (IEC), and the Automotive Engineering Council (AEC). The standards can cover a wide range of transient signal events, including ESD events.

Electronic circuit reliability can be improved by coupling pad protection circuits to the pads of an IC for transient signal protection. The pad circuits can be configured to maintain the voltage level at the pad within a predefined safe range. However, it can be difficult to provide pad circuits that meet reliability and performance requirements with low manufacturing cost and a relatively small circuit area.

An integrated circuit (IC) can have many pads, and different pads can be exposed to different voltage domains. Each voltage domain can have different performance and reliability requirements. For example, each voltage domain can have a different minimum operating voltage, maximum operating voltage, and constraint on leakage current. There is a need for providing IC protection pads operating over a multitude of voltage domains to enhance electronic circuit reliability for ICs in a simple and cost-effective manner.

Overview of Electronic Systems

FIG. 1 is a schematic block diagram of an electronic system 10, which can include one or more pad circuits according to an embodiment of the invention. The illustrated electronic system 10 includes a first IC 1, a second IC 2, and pins 4, 5, 6. As illustrated in FIG. 1, the pin 4 is electrically connected to the first IC 1 by a connection 7. The pin 5 is electrically connected to the second IC 2 by a connection 8. The electronic system 10 can also include pins electrically connected to both the first and second ICs 1, 2. For example, the illustrated pin 6 is electrically connected to the first and second ICs 1, 2 by a connection 9. Additionally, the first and second ICs 1, 2 can be electrically connected to one another by one or more connections internal to the electronic system 10, such as by connections 11 and 12. The first and second ICs 1, 2 can be exposed to user contact via, for example, the pins 4, 5, 6. The user contact can be through a relatively low-impedance connection.

The first and second ICs 1, 2 can be exposed to transient signal events, such as ESD events, which can cause IC damage and induce latch-up. For example, the connection 11 can receive a device-level transient signal event 14, and/or the pin 6 can receive a system-level transient signal event 16. The transient signal events 14, 16 can travel along the connections 11, 9, respectively, and can be received at the pads of the first and second ICs 1, 2.

In some embodiments, the first and second ICs 1, 2 can include pads, and can be provided with pad circuits configured to ensure reliability of the ICs by maintaining the voltage level at the pads within a selected range, which can vary from pad to pad. For example, either or both of the first and second ICs 1, 2 can include one or more pads configured to operate over a multitude of voltage domains or current bias conditions, each having varying performance and reliability requirements.

Overview of Power Management ICs

In some embodiments, one or more pad circuits can be employed in an IC, such as the first IC 1 of FIG. 1, and can be configured to provide transient signal protection to one or more internal circuits of the IC. The pad circuit can be configured to divert a current associated with a transient signal event received on a pad of the IC to other nodes or pads of the IC, thereby providing transient signal protection, as will be described in further detail below. The current can be shunted from, for example, a low-impedance output pad, a high-impedance input pad, or a low-impedance power or ground pad, to a low impedance pad or node of the IC. When no transient signal event is present, the pad circuit can remain in a high-impedance/low-leakage state, thereby reducing or minimizing static power dissipation resulting from leakage current and improving the operation of leakage sensitive circuitry, as will be described in detail below.

In other embodiments, one or more pad circuits can be provided in a single IC (for example, the first IC 1 of FIG. 1), and can be configured to provide transient signal protection for another component (for example, the second IC 2 of FIG. 1). The first IC 1 can be physically separated from the second IC 2, or it can be encapsulated in a common package with the second IC 2. In such embodiments, one or more pad circuits can be placed in a stand-alone IC, in a common package for system-on-a-package applications, or integrated with an IC in a common semiconductor substrate for system-on-a-chip applications.

Figure 2:
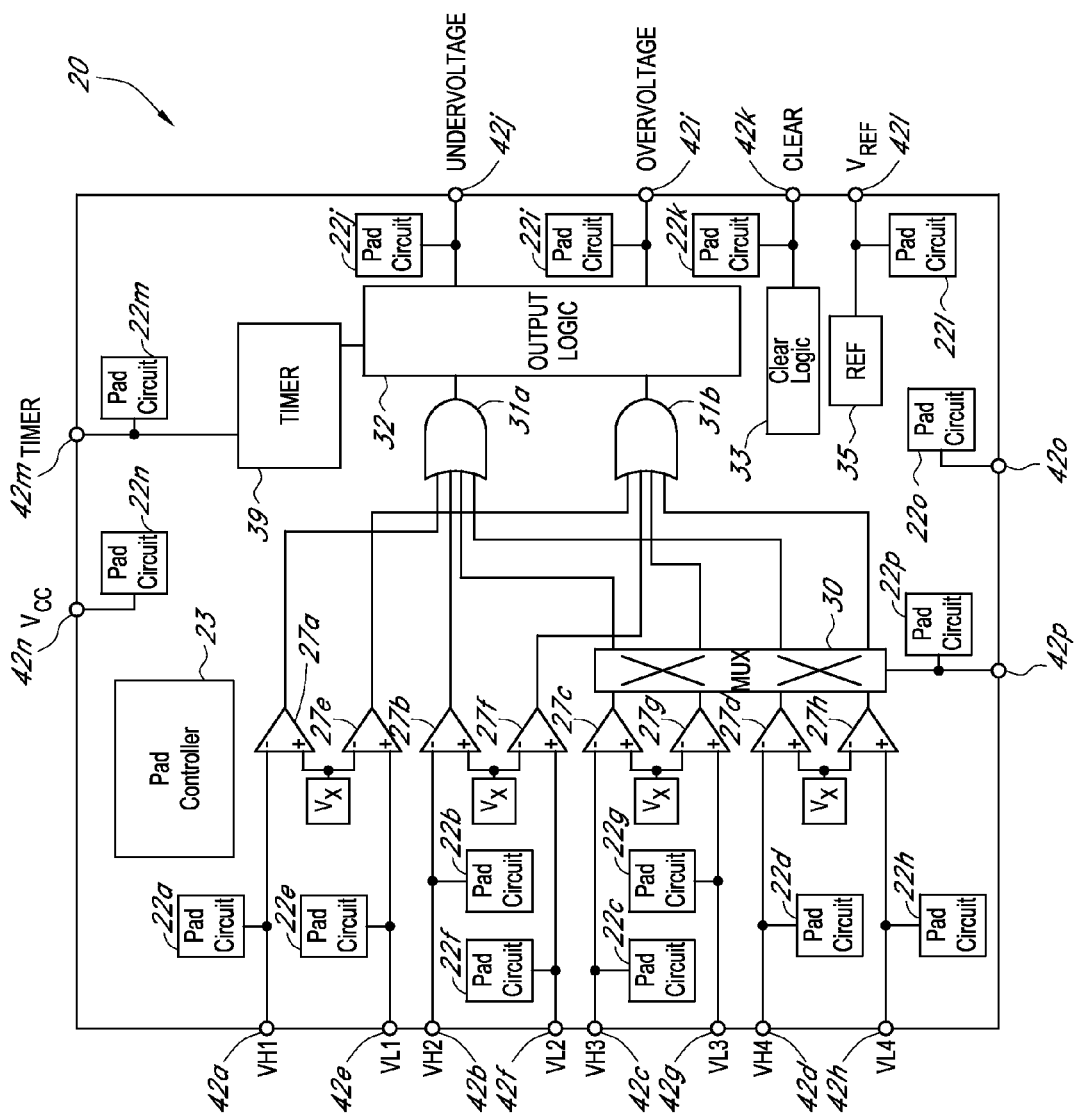
FIG. 2 is a schematic block diagram of an integrated circuit including pad circuits according to some embodiments.

FIG. 2 is a schematic block diagram of one example of an integrated circuit (IC) including pad circuits according to some embodiments. The IC 20 can be a power management IC, which can include, for example, pad circuits 22a-22p, a pad controller 23, comparators 27a-27h, a multiplexer 30, first and second OR gates 31a, 31b, an output logic 32, a clear logic 33, a voltage reference circuit 35, a timer 39, and pads 42a-42p. The power management IC 20 can be included in an electronic system, such as the electronic system 10 of FIG. 1, and can be, for example, the first IC 1 or the second IC 2. Depending on a design specification, not all of the illustrated components are necessary. For example, skilled artisans will appreciate that the pad controller 23 need not be included, that the power management IC 20 can be modified to monitor more or fewer voltage domains, and that the power management IC 20 can have more extensive or less extensive functionality.

Furthermore, although the pad circuits are illustrated in the context of the power management IC 20, the pad circuits can be employed in a wide array of ICs and other electronics having pads configured to operate over a multitude of voltage domains or current bias conditions.

The power management IC 20 can be configured to simultaneously monitor multiple voltage domains for overvoltage and undervoltage conditions, as will be described below. For example, the power management IC 20 can generate an overvoltage signal coupled to the pad 42i (OVERVOLTAGE), which can indicate whether or not an overvoltage condition is detected on any of the pads 42a-42d (VH1, VH2, VH3, and VH4, respectively). Additionally, the power management IC 20 can generate an undervoltage signal coupled to the pad 42j (UNDERVOLTAGE), which can indicate whether or not an undervoltage condition is detected on any of the pads 42e-42h (VL1, VL2, VL3, and VL4, respectively). Although the illustrated power management IC 20 is configured to monitor up to four voltage domains, skilled artisans will appreciate that this choice is merely illustrative, and that alternate embodiments of the power management IC 20 can be configured to be able to monitor more or fewer voltage domains, as well as to feature more extensive or less extensive functionality.

The power management IC 20 can aid in the integration and bias of ICs and other components of the electronic system 10. The power management IC 20 can also detect overvoltage conditions and/or undervoltage conditions which can endanger the proper operation of the electronic system 10. Additionally, the power management IC 20 can aid in reducing power consumption by detecting overvoltage conditions which can undesirably increase power consumption.

The power management IC 20 can be subject to stringent performance and design requirements. For example, the power management IC 20 can be subject to relatively tight constraints on leakage current in order to reduce static power dissipation and to improve performance for leakage-sensitive circuitry, as will be described below. Additionally, the power management IC 20 can be used to interact with multiple voltage domains, and thus should be able to handle relatively high input and output voltages without latching-up or sustaining physical damage. Moreover, there can be stringent requirements regarding the expense of the design and manufacture of the power management IC 20. Furthermore, in certain embodiments, configurability of the performance and design parameters of the power management IC 20 can be desirable, thereby permitting the power management IC 20 to be employed in a vast array of electronic systems and applications.

Each of the comparators 27a-27h can monitor an overvoltage or undervoltage condition of a voltage domain. This can be accomplished by providing a voltage from a voltage domain to a comparator. For example, a resistor divider (not shown in FIG. 2) having a series of resistors can be placed between a voltage supply of a voltage domain and a voltage reference, such as ground. A voltage can be tapped between the series of resistors and can be provided to a pad of the power management IC 20, such as, for example, the pad 42a (VH1). The voltage received at the pad 42a can be provided to the comparator 27a, which in turn can compare the voltage received from the pad 42a to a threshold voltage Vx. In one embodiment, the threshold voltage Vx is selected to be about 500 mV. By selecting the voltage provided to the pad 42a (for example, by selecting the number and magnitude of the resistors in the divider), the output of the comparator 27a can be configured to change when the voltage supply of a voltage domain exceeds a selected value. Likewise, by selecting the voltage provided to the pad 42e in a similar manner, the output of the comparator 27e can be configured to change when the supply of a voltage domain falls below a selected value.

As described above, the voltage provided to the pads 42a-42h can be provided from a resistor divider. The impedance of the resistors in the resistor divider can be relatively large (for example, tens of Mega-Ohms) so as to minimize system-level static power consumption. Thus, the accuracy of the resistor divider can be sensitive to the leakage of the pads 42a-42h, and there can be stringent performance requirements on the leakage current of the pads 42a-42h.

The first OR gate 31a can determine if one or more of the comparators coupled to its inputs indicate that an overvoltage condition has been detected. Likewise, the second OR gate 31b can determine if one or more of the comparators coupled to its inputs indicate that an undervoltage condition has been detected. In the illustrated embodiment, the outputs of comparators 27a, 27b are provided to the first OR gate 31a, while the outputs of the comparators 27e, 27f are provided to the second OR gate 31b.

Additionally, the first and second OR gates 31a, 31b can each receive signals from the multiplexer 30. The multiplexer 30 can allow overvoltage and undervoltage detection to be performed on voltage domains having a negative polarity with respect to the voltage received on the ground pad 42o (GND), such that overvoltage and undervoltage relate to magnitudes or absolute values of voltage. In particular, the multiplexer 30 can select which comparator signals are provided to the first and second OR gates 31a, 31b in response to a select control signal received from the pad 42p (SEL). For example, the multiplexer 30 can be configured to selectively provide the first OR gate 31a with the output of the comparator 27c or the comparator 27g, and the output of the comparator 27d or the comparator 27h, based on a state of the select control signal received from the pad 42p (SEL). Likewise, the multiplexer 30 can be configured to selectively provide the second OR gate 31b with the output of the comparator 27c or the comparator 27g, and the output of the comparator 27d or the comparator 27h, based on a state of the select control signal received from the pad 42p (SEL). By selecting which comparator outputs are provided to the first and second OR gates 31a, 31b, overvoltage and undervoltage detection can be performed on the voltages on the pads 42c, 42d and 42g, 42h, even for voltage domains having a negative polarity with respect to ground. The multiplexer 30 can be implemented with logic gates, with 3-state gates, or the like.

The output logic 32 can control the state of the pad 42i (OVERVOLTAGE) and the pad 42j (UNDERVOLTAGE). For example, the output logic 32 can indicate that an overvoltage or undervoltage condition has been detected based at least in part on the outputs of the first and second OR gates 31a, 31b. The output logic 32 can signal the detection of an overvoltage or undervoltage condition for a duration exceeding the time that the first or second OR gates 31a, 31b indicates that an overvoltage or undervoltage condition has been detected. For example, the output logic 32 can receive a signal from the timer 39, which can indicate the duration that the overvoltage or undervoltage condition should be asserted. The timer 39 can be electrically connected to the pad 42m (TIMER) and can be configured to have a drive strength and corresponding drive resistance. The pad 42m can be electrically connected to an external capacitor, which can have a variable capacitance to establish an RC time constant for determining the reset delay of the timer 39.

The output logic 32 can also be configured to communicate with the clear logic 33. The clear logic 33 can receive a clear control signal from pad 42k (CLEAR). In response to the clear control signal, the output logic 32 can reset the state of the pads 42i (OVERVOLTAGE) and 42j (UNDERVOLTAGE) to indicate that no overvoltage or undervoltage condition has been detected.

The power management IC 20 can also provide an output reference voltage on pad 42l ($V_{REF}$). This voltage can be selected to be, for example, about 1 V. The output voltage reference can be used by other components of the electronic system in which the power management IC 20 is implemented (for example, the electronic system 10 of FIG. 1). For example, the reference voltage can be provided as a reference voltage to one end of a resistor divider configured to provide a voltage to the pads 42a-42h for overvoltage or undervoltage detection.

As described above, the power management IC 20 can be configured to monitor multiple voltage domains, for example, four voltage domains for overvoltage and undervoltage conditions. Each of the voltage domains can have the same or different operating conditions and parameters. Additionally, the power management IC 20 can include a multitude of output pads, such as the pad 42i for indicating the detection of an overvoltage condition, the pad 42j for indicating the detection of an undervoltage condition, the pad 42p for providing the output voltage reference. The power management IC 20 can also include control pads, such as the pad 42p (SEL), the pad 42k (CLEAR), and the pad 42m (TIMER). Furthermore, the power management IC 20 can include the power pad 42n (Vcc) and the ground pad 42o (GND).

In some embodiments, the electronic system (for example, the electronic system 10 of FIG. 1) having the pads 42a-42p can have different requirements for minimum operating voltage, maximum operating voltage, and leakage current for each of the pads 42a-42p. Thus, each of the pads 42a-42p described above can have different performance and design requirements. In order to meet reliability requirements across a wide variety of applications, it can be desirable that one or more of the pads 42a-42p have a pad circuit configured to protect the power management IC 20 from overvoltage conditions and latch-up. Furthermore, it can be desirable that each pad circuit 22a-22p is configurable to operate with different reliability and performance parameters, for example, by changing only metal layers during back-end processing, or by using the pad controller 23 after fabrication. This can advantageously permit the pad circuits 22a-22p to be configurable for a particular application without requiring a redesign of the power management IC 20.

Figure 3A:
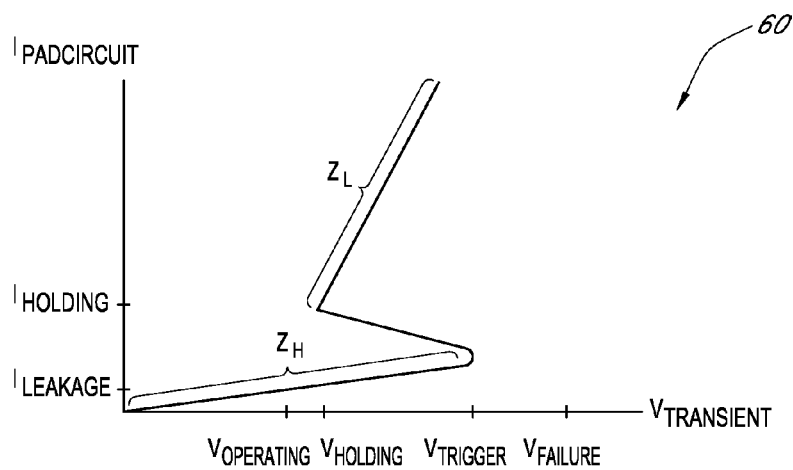
FIG. 3A is a graph of one example of pad circuit current versus transient signal voltage.

FIG. 3A illustrates a graph 60 of one example of pad circuit current versus transient signal voltage. As described above, it can be desirable for each pad circuit 42a-42p to be configured to maintain the voltage level at the pad within a predefined safe range. Thus, the pad circuit can shunt a large portion of the current associated with the transient signal event before the voltage of the transient signal $V_{TRANSIENT}$ reaches a voltage $V_{FAILURE}$ that can cause damage to the power management IC 20. Additionally, the pad circuit can conduct a relatively low current at the normal operating voltage $V_{OPERATING}$) thereby minimizing static power dissipation resulting from the leakage current $I_{LEAKAGE}$ and improving the performance of leakage sensitive circuitry, such a resistor divider.

Furthermore, as shown in the graph 60, the pad circuit can transition from a high-impedance state $Z_H$ to a low-impedance state $Z_L$ when the voltage of the transient signal $V_{TRANSIENT}$ reaches the voltage $V_{TRIGGER}$. Thereafter, the pad circuit can shunt a large current over a wide range of transient signal voltage levels. The pad circuit can remain in the low-impedance state $Z_L$ as long as the transient signal voltage level is above a holding voltage $V_{HOLDING}$ and the rate of voltage change is in the range of normal frequency operating conditions, rather than in the range of high frequency conditions and relatively fast rise and fall times which can be associated with a transient signal event. In certain embodiments, it can be desirable for the holding voltage $V_{HOLDING}$ to be above the operating voltage $V_{OPERATION}$ so that the pad circuit does not remain in the low-impedance state $Z_L$ after passage of the transient signal event and a return to normal operating voltage levels.

Figure 3B:
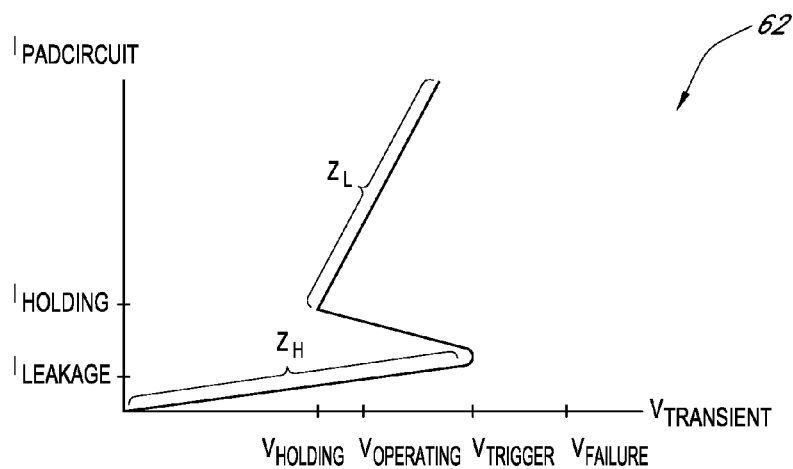
FIG. 3B is a graph of another example of pad circuit current versus transient signal voltage.

FIG. 3B is a graph 62 of another example of pad circuit current versus transient signal voltage. As shown in FIG. 3B, a pad circuit can transition from a high-impedance state $Z_H$ to a low-impedance state $Z_L$ when the voltage of the transient signal $V_{TRANSIENT}$ reaches the voltage $V_{TRIGGER}$. Thereafter, the pad circuit can shunt a large current over a wide range of transient signal voltage levels. The pad circuit can remain in the low-impedance state $Z_L$ as long as the transient signal voltage level is above a holding voltage $V_{HOLDING}$. It can be desirable for the holding voltage $V_{HOLDING}$ to be below the operating voltage $V_{OPERATION}$ in order to provide enhanced protection against transient signal events and to reduce the circuit area needed to provide a desired pad shunting current. This technique can be employed, for example, in embodiments in which the holding current $I_{HOLDING}$ exceeds the maximum current the pad can supply when biased at normal operating voltage levels. Thus, in certain embodiments, the pad circuit need not remain in the low-impedance state $Z_L$ after passage of the transient signal event and a return to normal operating voltage levels, even when $V_{OPERATION}$ exceeds $V_{HOLDING}$, because the pad may not be able to supply a sufficient holding current $I_{HOLDING}$ to retain the pad circuit in the low-impedance state $Z_L$.

As described above, the operating and reliability parameters of a pad circuit can vary widely, depending on a particular application. For purposes of illustration only, one particular electronic system can have the characteristics shown in Table 1 below for selected pads of FIG. 2.

TABLE 1

| Pad | $V_{OPERATION}$ | | $V_{HOLDING}$ | | $V_{TRIGGER}$ | | $I_{LEAKAGE}$ | |
|---|---|---|---|---|---|---|---|---|
| | Min | Max | Min | Max | Min | Max | Min | Max |
| VH1 | 0 V | 8 V | 9 V | 13 V | 16 V | 20 V | 0 nA | 15 nA |
| VH2 | 0 V | 8 V | 6 V | 10 V | 16 V | 20 V | 0 nA | 15 nA |
| VH3 | 0 V | 8 V | 3 V | 7 V | 16 V | 20 V | 0 nA | 15 nA |
| VH4 | 0 V | 16 V | 6 V | 10 V | 24 V | 30 V | 0 nA | 15 nA |
| Vcc | 18 V | 20 V | 22 V | 24 V | 24 V | 30 V | 0 nA | 10 nA |
| OVER-VOLTAGE | 0 V | 16 V | 14 V | 18 V | 24 V | 30 V | 0 nA | 15 nA |
| UNDER-VOLTAGE | 0 V | 16 V | 8 V | 12 V | 24 V | 30 V | 0 nA | 15 nA |

There is a need for pad circuits which can be configured to meet the performance and design parameters of an electronic circuit or IC (such as the power management IC 20 of FIG. 2) required for a particular application. Furthermore, in certain embodiments, there is a need for pad circuits which can operate with different reliability and performance parameters, for example, by changing only metal layers, or by configuring the power management IC 20 post-fabrication by selecting the setting of a pad controller 23. This can advantageously permit pad circuits 42a-42p to be configured for a particular application without requiring a redesign of the power management IC 20. The pad controller 23 can employ metal or poly fuses to control the operation of an ESD tolerant switch, as will be described in further detail below.

IC Pad Circuits for Protection from Transient Signal Event

Figure 4B:
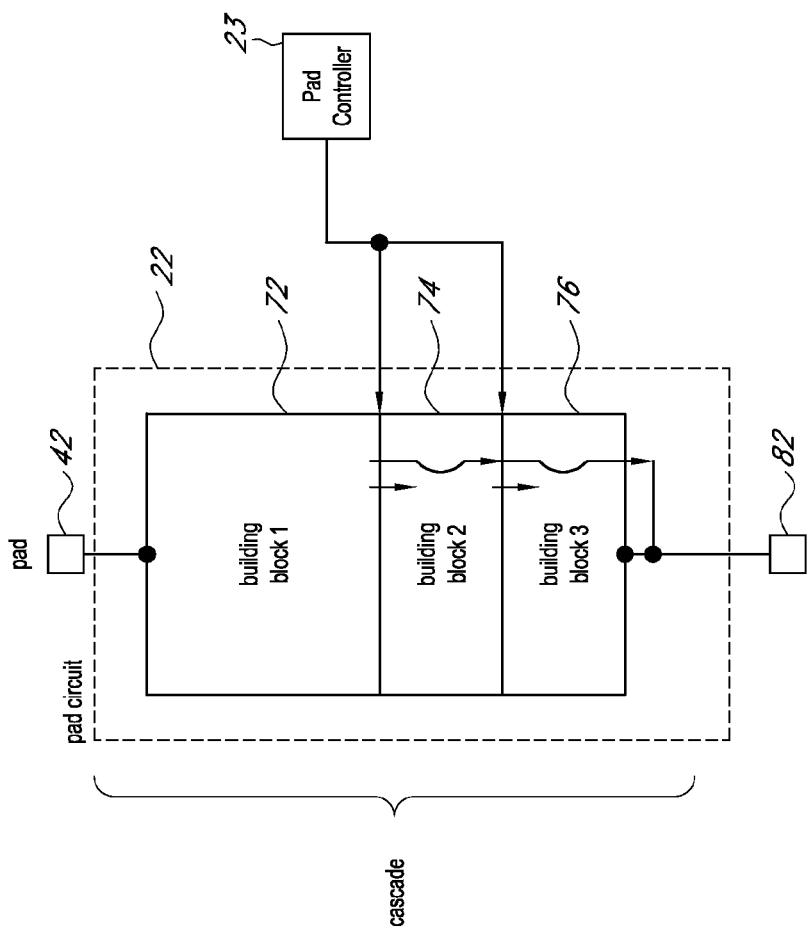
FIG. 4B is a schematic block diagram of a pad circuit in accordance with another embodiment.
Figure 4A:
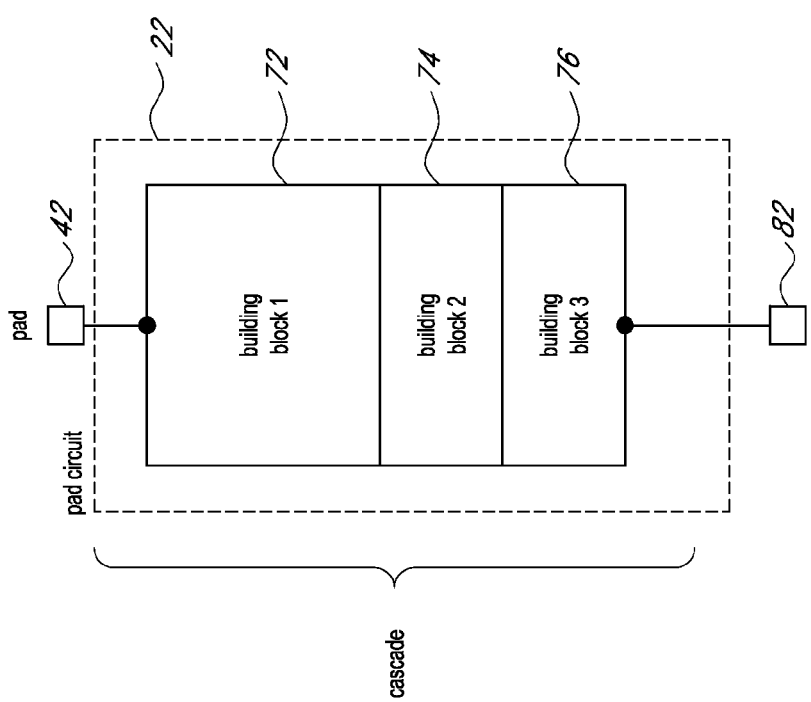
FIG. 4A is a schematic block diagram of a pad circuit in accordance with one embodiment.

FIG. 4A is a schematic block diagram of a pad circuit 22 according to an embodiment of the invention. The illustrated pad circuit 22 includes a first building block 72, a second building block 74, and a third building block 76. The first, second, and third building blocks 72, 74, 76 can be connected end-to-end in a cascade configuration between a pad 42 and a node 82, and can be subcircuits of the pad circuit 22. Additional or fewer building blocks can be included in the cascade to achieve the desired reliability and performance parameters, as will be described in further detail below. The pad circuit 22 can be, for example, any of the pad circuits 22a-22p shown in FIG. 2, and the pad 42 can be any of the pads 42a-42p, including, for example, low-impedance output pads, high-impedance input pads, and low-impedance power pads. The node 82 can be, for example, a low impedance node or pad of the power management IC 20 configured to handle a relatively large shunted current.

The building blocks 72, 74, 76 can form a pad circuit that has characteristics shown in FIG. 3A or 3B. In one embodiment, the first, second, and third building blocks 72, 74, 76 can be selected from a variety of types, such as a variety of electrically isolated clamp structures, so as to achieve the desired performance and reliability parameters for the pad circuit 22. For example, a first type of building block (Type A) can have a holding voltage $V_{H\_A}$ and a trigger voltage $V_{T\_A}$. A second type of building block (Type B) can have, for example, a trigger voltage $V_{T\_B}$ and a holding voltage $V_{H\_B}$. By arranging additional or fewer of each type of building block, the overall holding voltage and trigger voltage of embodiments of the pad circuit 22 can be selectively varied. As will be described below, the building block types can be selected such that, when combining i number of Type A building blocks and j number of Type B building blocks in a cascade configuration, the pad circuit 22 can have a trigger voltage $V_{TRIGGER}$ roughly equal to about $i*V_{T\_A}+j*V_{T\_B}$, and a holding voltage $V_{HOLDING}$ roughly equal to about $i*V_{H\_A}+j*V_{H\_B}$. Thus, by selecting the type and/or number of building blocks employed after manufacturing, and/or selecting the value of $V_{H\_A}$, $V_{H\_B}$, $V_{T\_A}$ and $V_{T\_B}$ during design of the building blocks, a scalable family of pad circuit embodiments can be created which can be adapted for a multitude of electronic systems and applications.

The design cost associated with designing the pad circuits can be reduced as compared to, for example, an approach in which different diode, bipolar, silicon controlled rectifier, and/or MOS devices are employed to achieve the reliability and performance requirements needed for each pad circuit. Moreover, in one embodiment, a first building block is placed below the pad and additional building blocks are placed in the vicinity of the pad. During back-end fabrication (for example, fabrication of metal layers), building blocks can be included in a cascade configuration with the first building block. Thus, each pad circuit 22 can be configured for a particular electronic system or application by changing the metal layers to control the building block configuration, as will be described below.

FIG. 4B is a schematic block diagram of a pad circuit in accordance with one embodiment. The illustrated pad circuit 22 includes a first building block 72, a second building block 74, and a third building block 76. The first, second, and third building blocks 72, 74, 76 can be connected end-to-end in a cascade configuration between a pad 42 and a node 82. Additional or fewer building blocks and blocks of a variety of types can be included in the cascade, as described earlier in connection with FIG. 4A.

Additionally, as illustrated in FIG. 4B, the pad controller 23 can be configured to control the connections between the cascaded building blocks. For example, the pad controller 23 can be configured to bypass the second building block 74, thus selectively omitting the second building block 74 from the cascade. In one embodiment, a first building block is formed below the pad and additional building blocks are formed in the vicinity of the pad. After completing both front-end and back-end fabrication, particular building blocks can be included in a cascade with the first building block using the pad controller 23. For example, the pad controller 23 can be configured to include or exclude particular building blocks, thereby configuring the pad circuit 22 to have the trigger voltage $V_{TRIGGER}$ and holding voltage $V_{HOLDING}$ desired for a particular application. In one embodiment, each pad circuit 22 can be individually controlled by the pad controller 23 to achieve the desired cascade. In alternative embodiments, groupings of pads can be collectively configured by the pad controller 23. This can be desirable, for example, when a particular group of pads, such as VH1 and VL1 of FIG. 2, may have similar performance and reliability requirements.

In one embodiment, the pad controller 23 is configured to use metal or poly fuses to control the operation of an ESD tolerant switch. The switch can be configured to bypass the operation of particular building blocks in the pad circuit 22. In an alternate embodiment, the pad controller 23 can include a multitude of fuse-controlled filaments that can be independently biased to configure each pad circuit 22 per combinations of building block types, such as the building block types which will be described later with reference to FIGS. 5A-5C.

Although FIGS. 4A and 4B were described in the context of Type A and Type B building blocks, additional building block types can be used. For example, a Type C building block can have a holding voltage $V_{H\_C}$ and a trigger voltage $V_{T\_C}$ that are different from the holding voltages and the trigger voltages, respectively, of the first and second types of building blocks. The pad circuit 22 can combine i number of Type A building blocks, j number of Type B building blocks, and k number of Type C building blocks such that the pad circuit 22 has a trigger voltage $V_{TRIGGER}$ roughly equal to about $i*V_{T\_A}+j*V_{T\_B}+k*V_{T\_C}$, and a holding voltage $V_{HOLDING}$ roughly equal to about $i*V_{H\_A}+j*V_{H\_B}+k*V_{H\_C}$. The inclusion of additional building block types can increase the multitude of configurations of the cascade at the expense of an increase in design complexity. Furthermore, the number of building blocks in the cascade can also be increased to provide additional configurations, provided that each building block remains properly biased at the increased trigger and holding voltages. For example, in an electrically isolated clamp embodiment in which a deep n-well layer provides electrical isolation between building blocks, the number of building blocks can be limited by the voltage level provided to the deep n-well to maintain electrical isolation.

FIGS. 5A-5C illustrate the circuits of a family of building block types, one or more of which can be employed as a building block type in the pad circuits of FIGS. 4A and 4B, as well as in the pad circuits described further below, such as the pad circuits of FIGS. 20A and 20B.

FIG. 5A is a circuit diagram illustrating a pad circuit building block (for example, the Type A building block described above in connection with FIGS. 4A and 4B) in accordance with one embodiment. The Type A building block 91 includes a resistor 101 and a NPN bipolar transistor 100 having an emitter, a base, and a collector. The resistor 101 includes a first end electrically connected to the base of the transistor 100, and a second end electrically connected to the emitter of the transistor 100. The resistor 101 can have, for example, a resistance between about 5Ω and about 55Ω. The collector of the transistor 100 can be electrically connected to another building block or to a pad 42. The emitter of the transistor 100 can be electrically connected to another building block or to a node 82.

FIG. 5B is a circuit diagram illustrating a pad circuit building block (for example, the Type B building block described above in connection with FIGS. 4A and 4B) in accordance with another embodiment. The Type B building block 92 includes a PNP bipolar transistor 102, an NPN bipolar transistor 103, a first resistor 104 and a second resistor 105. The PNP transistor 102 and the NPN transistor 103 each include an emitter, a base, and a collector. The first resistor 104 includes a first end electrically connected to the emitter of the PNP transistor 102, and a second end electrically connected to the base of the PNP transistor 102 and to the collector of the NPN transistor 103. The first resistor 104 can have, for example, a resistance between about 5Ω and about 35Ω. The second resistor 105 includes a first end electrically connected to the collector of the PNP transistor 102 and to the base of the NPN transistor 103, and a second end electrically connected to the emitter of the NPN transistor 103. The second resistor 105 can have, for example, a resistance between about 50Ω and about 250Ω. The emitter of the PNP transistor 102 can be electrically connected to another building block or to a pad 42. The emitter of the NPN transistor 103 can be connected to another building block or to a node 82.

As skilled artisans will appreciate, the PNP transistor 102 and NPN transistor 103 are configured to be in feedback. At a certain level of the collector current of the PNP transistor 102, the feedback between the PNP transistor 102 and the NPN transistor 103 can be regenerative and can cause the Type B building block 92 to enter a low-impedance state.

FIG. 5C is a circuit diagram illustrating a pad circuit building block (for example, the Type C building block described above in connection with FIGS. 4A-4B) in accordance with yet another embodiment. The Type C building block 93 includes a resistor 107 and a PNP bipolar transistor 106 having an emitter, a base, and a collector. A first end of the resistor 107 is electrically connected to the emitter of the transistor 106, and a second end is electrically connected to the base of the transistor 106. The resistor 107 can have, for example, a resistance between about 11Ω and about 85Ω. The emitter of the transistor 106 can be electrically connected to another building block or to a pad 42. The collector of the transistor 106 can be connected to another building block or to a node 82.

With reference to FIGS. 5A-5C, the trigger and holding voltages of the Type A, Type B, and Type C building blocks can be selected so as to aid in configuring the pad circuit 22 to have a trigger voltage $V_{TRIGGER}$ and a holding voltage $V_{HOLDING}$ desired for a particular electronic system or application. For example, the trigger voltage of the Type A building block $V_{T\_A}$ and the trigger voltage of the Type B building block $V_{T\_B}$ can be based on the collector-emitter breakdown voltage of the NPN transistor 100 and the NPN transistor 103, respectively. Additionally, the positive feedback between the NPN transistor 103 and the PNP transistor 102 in Type B Building block 92 can make the holding voltage $V_{H\_B}$ of the Type B building block 92 less than the holding voltage $V_{H\_A}$ of the Type A building block 91. Furthermore, the Type C building block can have a holding voltage $V_{H\_C}$ greater than either the holding voltage $V_{H\_A}$ or $V_{H\_B}$, and can have a trigger voltage $V_{T\_C}$ based on the collector-emitter breakdown voltage of the PNP transistor 106.

In one embodiment, the Type A building block 91 and the Type B building block 92 are configured to have about the same trigger voltage, $V_{T\_A}=V_{T\_B}=V_T$. Additionally, the positive feedback between the NPN transistor 103 and the PNP transistor 102 is employed to selectively decrease the holding voltage $V_{H\_B}$ of the Type B building block 92 relative to the holding voltage $V_{H\_A}$ of the Type A building block. Thus, in some embodiments, i number of Type A building blocks and j number of Type B building blocks can be combined in a cascade configuration to produce a pad circuit 22 having a trigger voltage $V_{TRIGGER}$ roughly equal to about $(i+j)*V_T$, and a holding voltage $V_{HOLDING}$ roughly equal to about $i*V_{H\_A}+j*V_{H\_B}$, where $V_{H\_B}$ is selected to be less than $V_{H\_A}$. This permits configurations having the same number of building blocks in the cascade to have about the same trigger voltage $V_{TRIGGER}$. Additionally, the type of building blocks in the cascade can be selected to achieve the desired holding voltage $V_{HOLDING}$ of the pad circuit 22.

Skilled artisans will appreciate that the desired trigger voltage and holding voltage of each building block type can be achieved by proper selection of a variety of parameters, including, for example, the geometries of the transistors, the common-emitter gain or "β" of the transistors, and by selecting the resistance of the resistors.

Bipolar Transistor Structures for Pad Circuits

Figure 6A:
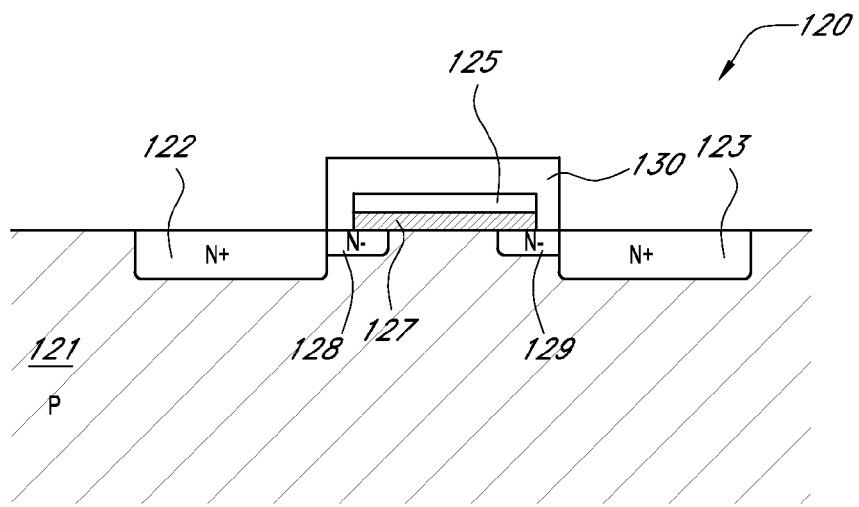
FIG. 6A is a cross section of a conventional NMOS transistor having a lightly doped drain (LDD) structure.
Figure 6B:
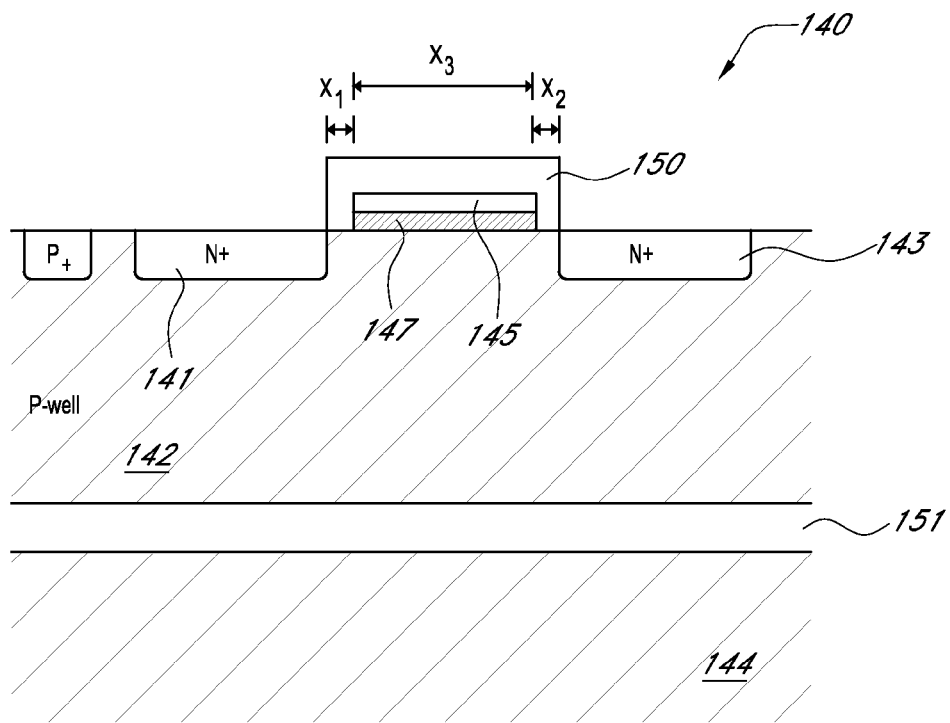
FIG. 6B is a cross section of an NPN bipolar transistor in accordance with one embodiment.
Figure 6C:
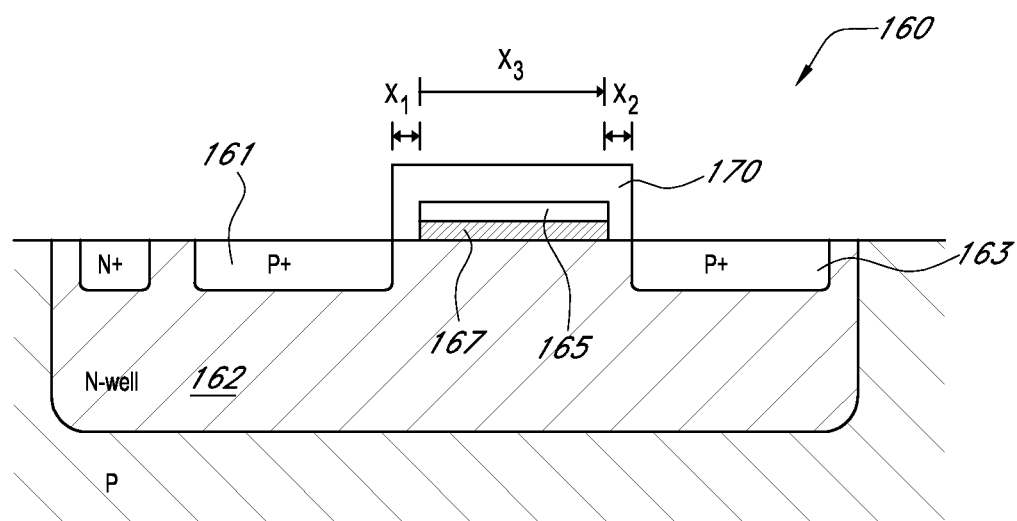
FIG. 6C is a cross section of a PNP bipolar transistor in accordance with another embodiment.

FIGS. 6A-6C illustrate cross sections of various transistor structures. As will be described below, FIGS. 6B and 6C illustrate cross sections of transistor structures according to embodiments of the invention. These transistors can be used in pad circuit building blocks, even in processes lacking dedicated bipolar transistor masks.

FIG. 6A illustrates a cross section of a conventional NMOS transistor having a lightly doped drain (LDD) structure. The LDD NMOS transistor 120 is formed on a substrate 121 and includes an n+ drain region 122, an n+ source region 123, a gate 125, gate oxide 127, a lightly doped (n−) drain extension region 128, a lightly doped source extension region 129, and sidewall spacers 130.

The n+ drain region 122 can be more heavily doped than the n− drain extension region 128. The difference in doping can reduce the electric fields near the drain region, thereby improving the speed and reliability of the transistor 120 while lowering gate-drain capacitance and minimizing the injection of hot electrons into the gate 125. Likewise, the n+ source region 123 can be more heavily doped than the n− source extension region 129 and provide similar improvements to the transistor 120.

In a conventional LDD process, the gate electrode 125 is used as a mask for n−LDD implantation used to form the drain and source extension regions 128, 129. Thereafter, sidewall spacers 130 can be provided and employed as a mask for n+ implantation used to form the drain region 122 and the source region 123.

FIG. 6B illustrates a cross section of a parasitic NPN bipolar transistor in accordance with one embodiment. The illustrated parasitic NPN bipolar transistor or gated NPN bipolar transistor 140 includes an emitter 141, a base 142 formed of a p-well, a collector 143, a gate or plate 145, an oxide layer 147, an isolation layer 151, and sidewall spacers 150. The emitter 141, the collector 143, the plate 145, and the oxide layer 147 have structures similar to those of the drain region 122, the source region 123, the gate 125, and the oxide layer 127, respectively, of the conventional NMOS transistor 120 of FIG. 6A. In contrast to the LDD NMOS transistor 120 shown in FIG. 6A, the illustrated bipolar transistor 140 does not have structures similar to those of the source and drain extension regions of the NMOS transistor 120.

Removal of the source and drain extension regions can result in transistor conduction being dominated by a bipolar component, rather than by a FET component. In particular, when a voltage is applied to the plate 145, the inversion layer may not extend from the emitter 141 to the collector 143, and thus the FET component of the current can be weak. Thus, during an overvoltage condition, the parasitic NPN bipolar transistor 140 can serve as the primary conduction path, and the parasitic NPN bipolar transistor 140 can function similarly to a traditional bipolar transistor.

The resulting structure can have lower leakage than a conventional NMOS structure and withstand relatively large voltages without breakdown. Further, the resulting structure can be sized so as to employ the parasitic bipolar structure for transient signal protection without drawbacks, such as reduced reliability, typically encountered in high performance analog applications when degrading the standard MOS device characteristics. Since the parasitic NPN bipolar transistor 140 can be formed using a process used to create a conventional LDD MOS transistor, such as the NMOS transistor 120 of FIG. 6A, both the parasitic NPN bipolar transistor 140 and the LDD NMOS transistor 120 can be fabricated simultaneously on a common substrate.

The parasitic bipolar transistor 140 can have desirable properties for ESD protection and can be used in building blocks described above in connection with FIGS. 5A-5B. The use of the parasitic NPN bipolar transistor 140 can be desirable, for example, in a process which includes conventional LDD MOS transistors, but which lacks a dedicated bipolar process. In one embodiment, a single additional mask can be added during fabrication of transistors to determine which transistor structures receive the LDD implant and which do not.

The sidewall spacers 150 can be formed using, for example, an oxide, such as $SiO_2$, or a nitride. However, other sidewall spacer materials can be utilized in certain manufacturing processes. A distance $x_1$ between the emitter 141 and the plate 145 can be selected to be, for example, in a range of about 0.1 μm to 2.0 μm. A distance $x_2$ between the collector 143 and the plate 145 can be selected to be, for example, in a range of about 0.1 μm to 2.0 μm.

The plate 145 can be formed from a variety of materials, including, for example, doped or undoped polysilicon. Although the plate 145 is illustrated as a single layer, the plate 145 can include multiple layers, such as, for example, layers of polysilicon and silicide. In one embodiment, the plate 145 can have a plate length $x_3$ selected to be in a range of about 0.25 μm to about 0.6 μm, for example, about 0.5 μm. However, skilled artisans will appreciate that the length of the plate 145 can vary depending on the particular process and application. The plate 145 can be formed over the oxide layer 147, which can correspond to, for example, any oxide layer dielectric known in the art or any oxide layer dielectric later discovered, including high-k oxide layers.

The emitter 141 and the collector 143 of the bipolar transistor 140 can be formed using a variety of materials, including for example, any n-type doping material. The spacing between the emitter 141 and the collector 143 can correspond to the sum of the distance x1, the distance x2, and the plate length x3. In one embodiment, the spacing between the emitter 141 and collector 143 is selected to be in the range of about 0.45 μm to about 4.6 μm. The doping between the emitter and the collector, both beneath the sidewall spacers 151 and the plate can consist essentially of n-type, which can result in transistor conduction being dominated by a bipolar component, rather than by a FET component. Thus, when a voltage is applied to the plate 145, the inversion layer may not extend from the emitter 141 to the collector 143, and thus the FET component of the current can be weak. Accordingly, during an overvoltage condition, the parasitic NPN bipolar transistor 140 can serve as the primary conduction path, and the parasitic NPN bipolar transistor 140 can function similarly to a traditional bipolar transistor.

The base 142 can be electrically isolated from the substrate 144 using a wide variety of techniques. In the illustrated embodiment, the isolation layer 151 is a deep n-well layer provided to electrically isolate the base 142 from the substrate 144. Persons of ordinary skill in the art will appreciate that a variety of techniques to provide electrical isolation are well known in the art and can be used in accordance with the teachings herein. For example, the isolation layer 151 can be an n-type buried layer or an isolation layer of a silicon-on-insulator (SOI) technology. The parasitic bipolar transistor 140 can undergo back end processing to form, for example, contacts and metallization. Skilled artisans will appreciate that various processes can be used for such back end processing.

FIG. 6C is a cross section of a PNP bipolar transistor 160 in accordance with one embodiment. The illustrated parasitic PNP bipolar transistor or gated PNP bipolar transistor 160 includes an emitter 161, a base 162 formed of an n-well, a collector 163, a gate or plate 165, an oxide layer 167, and sidewall spacers 170. The PNP bipolar transistor 160 can be formed in a manner similar to that of the NPN bipolar transistor 140 by selecting impurities with opposite polarity to that described above.

The parasitic NPN bipolar transistor 140 and the parasitic PNP bipolar transistor 160 can be formed by omitting the implantation of the LDD layer in a conventional MOS process. As will be described in detail below, the NPN bipolar transistor 140 and the PNP bipolar transistor 160 can be used in the building blocks of FIGS. 5A-5C, thereby permitting the fabrication of a family of pad circuit building blocks even with a process lacking dedicated bipolar masks. The building blocks can be cascaded to achieve the desired holding and trigger voltages for a pad circuit, such as the pad circuit 22 of FIGS. 4A and 4B.

Alternative Embodiments of IC Pad Circuits

FIGS. 7A-8B represent building block types, one or more of which can be employed as a building block type in the pad circuits of FIGS. 4A and 4B, as well as in the pad circuits described further below, such as the pad circuits of FIGS. 20A and 20B.

Figure 7A:
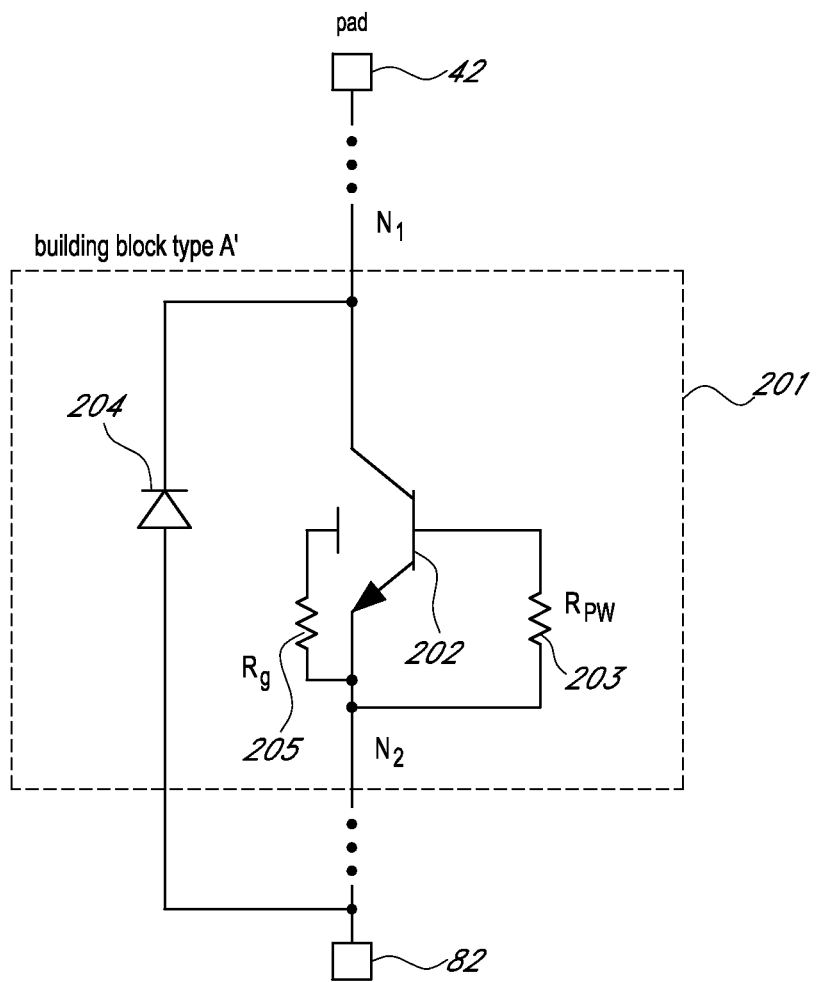
FIG. 7A is a circuit diagram illustrating a pad circuit building block in accordance with yet another embodiment.

FIG. 7A is a circuit diagram illustrating a pad circuit building block in accordance with yet another embodiment. The illustrated Type A' building block 201 can be connected in a cascade between a pad 42 and a node 82, and includes a first resistor 203, a second resistor 205, a diode 204, and a NPN bipolar transistor 202 having an emitter, a base, a collector, and a plate. The NPN bipolar transistor 202 can have the structure of the NPN bipolar transistor 140 of FIG. 6B.

The diode 204 includes an anode electrically connected to the node 82, and a cathode electrically connected to the collector of the NPN bipolar transistor 202 at a node $N_1$. The node $N_1$ can be electrically connected to another building block in a cascade, such as the cascade of FIG. 4A, or to the pad 42. The first resistor 203 includes a first end electrically connected to the base of the NPN bipolar transistor 202, and a second end electrically connected to the emitter of the NPN bipolar transistor 202 and to a first end of the second resistor 205 at a node $N_2$. The first resistor 203 can have, for example, a resistance between about 5Ω and about 55Ω. In one embodiment, described below with reference to FIG. 7B, the first resistor 203 is implemented using a multi-finger array to achieve the target resistance, such as an array of six fingers each having a resistance selected from the range of about 30Ω and about 320Ω. The node $N_2$ can be electrically connected to another building block in a cascade or to the node 82. The second resistor 205 includes a second end electrically connected to the plate of the NPN bipolar transistor 202. The second resistor 205 can have, for example, a resistance between about 50Ω and about 50 kΩ.

As was described before with reference to FIGS. 4A and 4B, the pad circuit 22 can be employed in, for example, any of the pad circuits 22a-22p shown in FIG. 2, and the pad 42 can be any of the pads 42a-42p, including, for example, low-impedance output pads, high-impedance input pads, and low-impedance power pads. The node 82 can be, for example, a low impedance node or pad of the power management IC 20 configured to handle a relatively large shunted current. A transient signal event can be received at the pad 42. If the transient signal event has a voltage which is negative with respect to the node 82, the diode 204 can provide current which can aid in protecting the power management IC 20.

If the transient signal event has a voltage that is positive with respect to the node 82, the NPN bipolar transistor 202 can aid in providing transient signal protection. The trigger voltage of the Type A' building block $V_{T\_A'}$ can be based on the collector-emitter breakdown voltage of the NPN bipolar transistor 202. Additionally, the plate and the collector of the NPN bipolar transistor 202 can function to form a capacitor, which can enhance how the NPN bipolar transistor 202 performs when a transient signal event having a positive voltage is received by increasing the displacement current, as will be described below.

If the transient signal received on pad 42 causes the node $N_1$ to have a rate of change $dV_{N1}/dt$ and the capacitance between the plate and the collector of the NPN bipolar transistor 202 has a value of $C_{202}$, a displacement current can be injected by the capacitor equal to about $C_{202}*dV_{N1}/dt$. A portion of this current can be injected in the base of the NPN bipolar transistor 202, which can increase the speed at which the Type A' building block 201 provides transient signal protection. As described above, a transient signal event can be associated with fast rise and fall times (for example, from about 0.1 ns to about 1.0 μs) relative to the range of normal signal operating conditions. Thus, the NPN bipolar transistor 202 can be configured to have a trigger voltage which decreases in response to rates of voltage change associated with the very high frequency conditions of a transient signal event. During normal operation, the absence of the lightly doped drain (LDD) can make the leakage of the NPN bipolar transistor 202 relatively low, even over a relatively wide range of temperatures, for example, between about −40° C. and about 140° C.

Figure 7B:
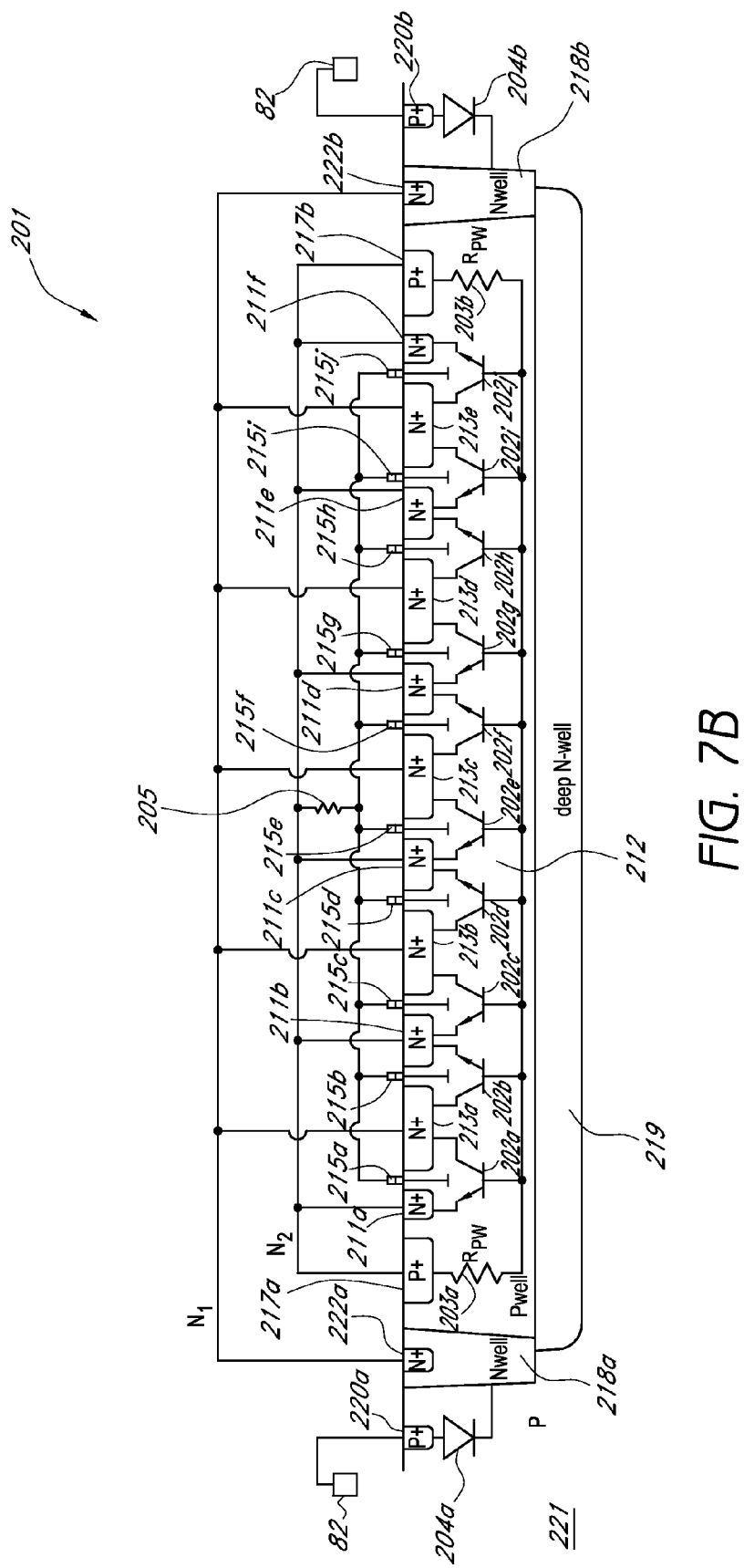
FIG. 7B is a cross section of one implementation of the pad circuit building block of FIG. 7A.

FIG. 7B illustrates an annotated cross section of one implementation of the pad circuit building block of FIG. 7A. The illustrated Type A' building block 201 includes a substrate 221, emitters 211a-211f, base 212, collectors 213a-213e, plates 215a-215j, base contacts 217a, 217b, n-wells 218a, 218b, deep n-well 219, and substrate contacts 220a, 220b. The cross section has been annotated to illustrate examples of circuit devices formed, such as parasitic NPN bipolar transistors 202a-202j, resistors 203a, 203b, and diodes 204a, 204b. The diagram is also annotated to show the second resistor 205, which can be formed using, for example, n-diffusion or poly (not shown in this Figure). The Type A' building block 201 can undergo back end processing to form contacts and metallization. These details have been omitted from FIG. 7B for clarity.

The diodes 204a, 204b can be formed from the substrate 221 and n-wells 218a, 218b. For example, the diode 204a has an anode formed from the substrate 221 and a cathode formed from the n-well 218a. Similarly, the diode 204b has an anode formed from the substrate 221 and a cathode formed from the n-well 218b.

The NPN bipolar transistors 202a-202j can be formed from emitters 211a-211f, collectors 213a-213e, plates 215a-215j, and base 212. For example, the NPN bipolar transistor 202a can be formed from the emitter 211a, the plate 215a, the collector 213a, and the base 212. The NPN bipolar transistors 202b-202j can be formed in a similar manner from emitters 211b-211f, collectors 213a-213e, plates 215b-215j, and base 212. Additional details of the NPN bipolar transistors 202a-202j can be as described above with reference to FIG. 6B.

The base 212 can be electrically isolated from the substrate 221 using n-wells 218a, 218b and deep n-well 219. The n-wells 218a, 218b and deep n-well 219 can also provide electrically isolation of the building block from other building blocks. The n-well contacts 222a, 222b can form a guard ring around the Type A' building block 201. The n-well contacts 222a, 222b can be contacted to a metal layer above by using multiple rows of contacts, thereby permitting the guard ring to be connected to the collectors 213a-213e through metal. The guard ring can eliminate the formation of unintended parasitic paths between the pad circuit and surrounding semiconductor components when integrated on-chip. Additionally, the substrate contacts 220a, 220b can form a substrate ring which can aid in protecting the Type A' building block 201 from latch-up.

The resistors 203a, 203b can be formed from the resistance between the bases of NPN bipolar transistors 202a-202j and the base contacts 217a, 217b. The resistance along the paths between the bases of the NPN bipolar transistors 202a-202j and the base contacts 217a, 217b can be modeled by the resistors 203a, 203b.

Persons of ordinary skill in the art will appreciate that the cross-section shown in FIG. 7B can result in the formation of the circuit shown in FIG. 7A. For example, each of the emitters of the NPN bipolar transistors 202a-202j can be electrically connected together to form a common emitter. Likewise, each of the collectors, plates, and bases of the NPN bipolar transistors 202a-202j can be electrically connected together to form a common collector, a common plate, and a common base, respectively. Thus, each of the NPN bipolar transistors 202a-202j can be legs of the NPN bipolar transistor 202. Additionally, the diodes 204a, 204b can be represented by the diode 204, and the resistors 203a, 203b can be represented by the first resistor 203. The second resistor 205 can be formed using, for example, n-diffusion or poly (not shown in this Figure). Thus, FIG. 7B illustrates a cross section of an implementation of the pad circuit building block of FIG. 7A. Skilled artisans will appreciate that numerous layout implementations of the Type A' building block 201 are possible.

As described earlier with reference to FIG. 7A, the capacitance between the plate and the collector of the NPN bipolar transistor 202 can result in a current which can be injected in the base of the NPN bipolar transistor 202. This can increase the speed at which the Type A' building block 201 provides transient signal protection. The second resistor 205 can have a resistance selected to provide injection into the base of the NPN bipolar transistors at a frequency associated with a transient signal event. In one embodiment, the second resistor 205 can have a resistance in the range of about 200Ω to 50 Ω.

Each of the NPN bipolar transistors 202a-202j can be legs of the NPN bipolar transistor 202 as described above. In one embodiment, each of the NPN bipolar transistors has a plate width (for example, the width of the plate 145 in a direction orthogonal to the plate length $x_3$ of FIG. 6B) between about 30 µm and 100 µm, so that the total plate width (the sum of the plates widths of all legs) is in the range of about 300 µm to 1,000 µm. In one embodiment, the plate length of each NPN bipolar transistors (for example, $x_3$ in FIG. 6B) is selected to be between about 0.25 µm and about 0.6 µm, for example, about 0.5 µm. Although the cross section shown in FIG. 7B illustrates the NPN bipolar transistor 202 as having ten legs, skilled artisans will appreciate that more or fewer legs can be selected depending on, for example, the desired dimensions of the pad circuit and the desired total plate width. In one embodiment described with reference to FIGS. 17A-17H, the number and width of the legs are selected so that the implementation of the Type A' building block 201 can fit under a bonding pad.

Figure 8A:
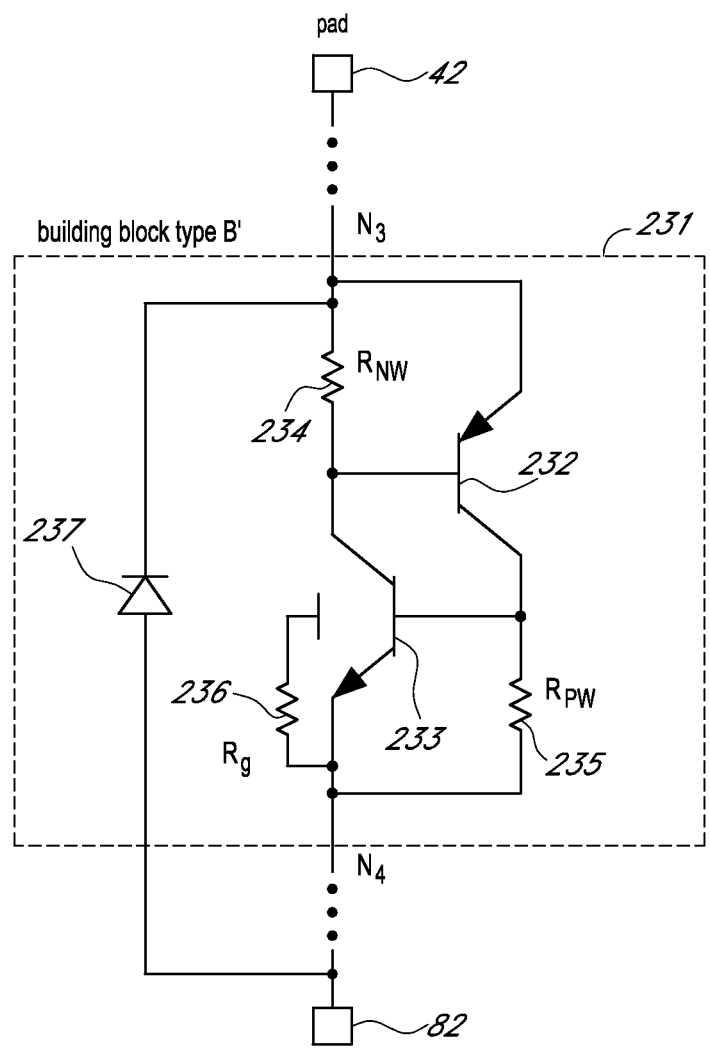
FIG. 8A is a circuit diagram illustrating a pad circuit building block in accordance with yet another embodiment.

FIG. 8A is a circuit diagram illustrating a pad circuit building block in accordance with yet another embodiment. The illustrated Type B' building block 231 can be connected in a cascade between the pad 42 and the node 82, and includes a PNP transistor 232, a NPN bipolar transistor 233, a first resistor 234, a second resistor 235, a third resistor 236, and a diode 237. The PNP transistor 232 includes an emitter, a base, and a collector. The NPN bipolar transistor 233 includes an emitter, a base, a collector and a plate, and can have a structure similar to that of the NPN bipolar transistor 140 of FIG. 6B.

The diode 237 includes an anode electrically connected to the node 82, and a cathode electrically connected to a first end of the first resistor 234 and to the emitter of the PNP transistor 232 at a node $N_3$. The node $N_3$ can be electrically connected to another building block in a cascade, such as the cascade of FIG. 4A, or to the pad 42. The first resistor 234 also includes a second end electrically connected to the base of the PNP transistor 232 and to the collector of the NPN bipolar transistor 233. The first resistor 234 can have, for example, a resistance between about 5Ω and about 35Ω. In one embodiment, described below with reference to FIG. 8B, the first resistor 234 is implemented using a multi-finger array to achieve the target resistance, such as an array of two fingers each having a resistance selected from the range of about 10Ω and about 70Ω. The second resistor 235 includes a first end electrically connected to the collector of the PNP transistor 232 and to the base of the NPN bipolar transistor 233, and a second end electrically connected to the emitter of the NPN bipolar transistor 233 and to a first end of the third resistor 236 at a node $N_4$. The second resistor 235 can have, for example, a resistance between about 50Ω and about 250Ω. In one embodiment, described below with reference to FIG. 8B, the second resistor 235 is implemented using a multi-finger array to achieve the target resistance, such as an array of two fingers each having a resistance selected from the range of about 100Ω and about 500Ω. The node $N_4$ can be electrically connected to another building block in a cascade or to the node 82. The third resistor 236 includes a second end electrically connected to the plate of the NPN bipolar transistor 233. The third resistor 236 can have, for example, a resistance between about 200Ω and about 50 kΩ.

As was described before with reference to FIGS. 4A and 4B, the pad circuit 22 can be, for example, any of the pad circuits 22a-22p shown in FIG. 2, and the pad 42 can be any of the pads 42a-42p. The node 82 can be, for example, a low impedance node or pad of the power management IC 20 configured to handle a relatively large shunted current. A transient signal event can be received at the pad 42. If the transient signal event has a voltage that is negative with respect to the node 82, the diode 237 can provide current which can aid in protecting the power management IC 20.

If the transient signal event has a voltage which is positive with respect to the node 82, the PNP transistor 232 and the NPN bipolar transistor 233 can aid in providing transient signal protection. The trigger voltage of the Type B' building block $V_{T\_B'}$ can be based on the collector-emitter breakdown voltage of the NPN bipolar transistor 233. Additionally, the positive feedback between the NPN bipolar transistor 233 and the PNP transistor 232 can make the holding voltage $V_{T\_B'}$ of the Type B' building block 231 less than the holding voltage $V_{H\_A'}$ of the Type A' building block 201 of FIG. 7A.

The plate and the collector of the NPN bipolar transistor 233 can function to form a capacitor which can enhance the performance of the NPN bipolar transistor 233 when a transient signal event having a positive voltage is received, as was described earlier. For example, a portion of this current can be injected in the base of the NPN bipolar transistor 233 through capacitive coupling, which can aid the speed at which the Type B' building block 231 provides transient signal protection. Thus, the NPN bipolar transistor 233 can be configured to have a trigger voltage which is lower at rates of voltage change associated with the very high frequency conditions of a transient signal event. During normal operation, the absence of the lightly doped drain (LDD) can make the leakage of the NPN bipolar transistor 233 low, even at relatively high temperatures.

Figure 8B:
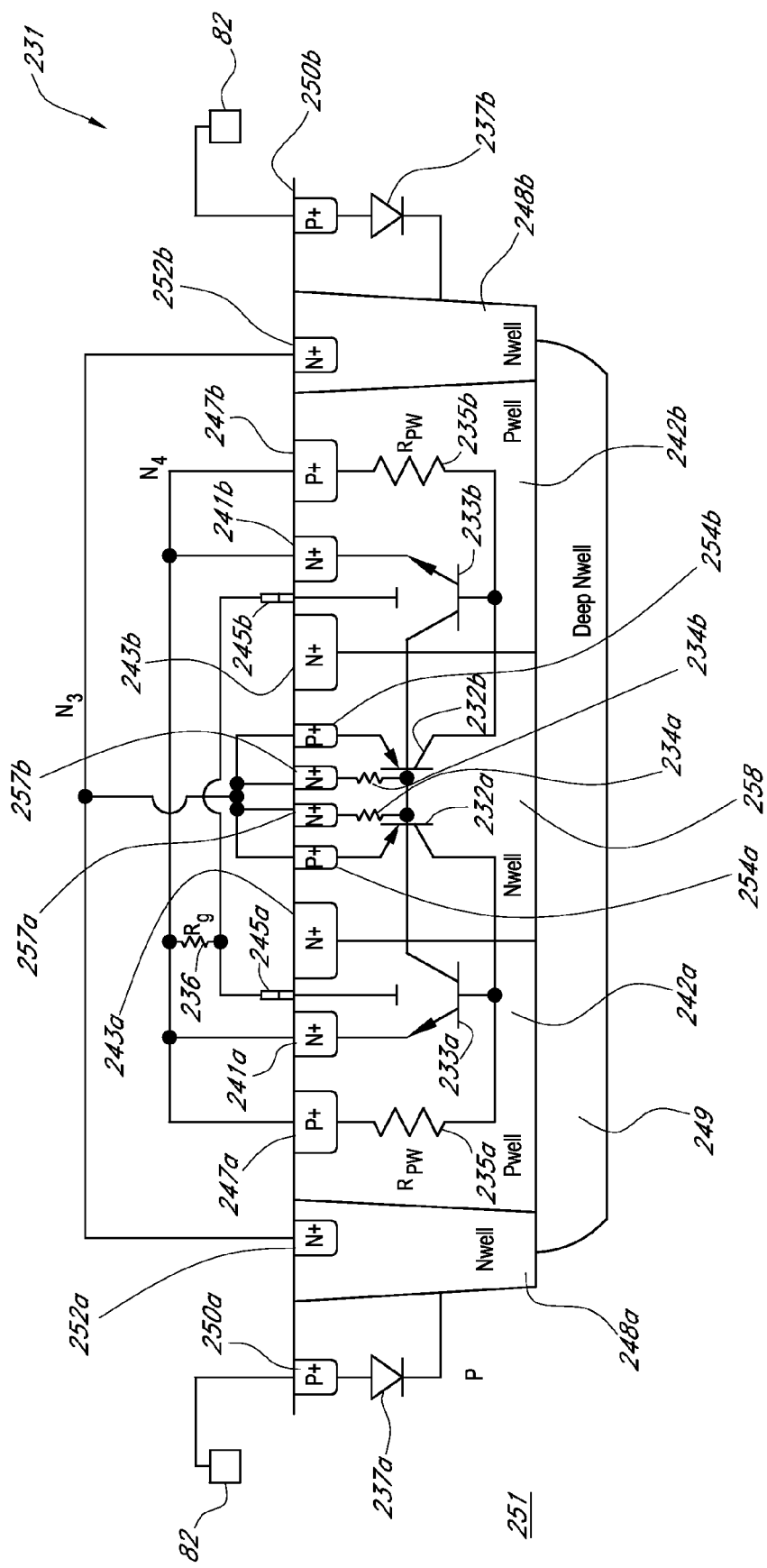
FIG. 8B is a cross section of one implementation of the pad circuit building block of FIG. 8A.

FIG. 8B is an annotated cross section of one implementation of the pad circuit building block of FIG. 8A. The illustrated Type B' building block 231 includes NPN emitters 241a, 241b, NPN bases 242a, 242b, NPN collector contacts 243a, 243b, plates 245a, 245b, NPN base contacts 247a, 247b, PNP base 258, PNP base contacts 257a, 257b, n-wells 248a, 248b, deep n-well 249, and substrate contacts 250a, 250b. As illustrated, the NPN collector contacts 243a, 243b are each formed partially in a p-well and partially in an n-well. For example, the NPN collector contact 243a is partially formed in the NPN base 242a, and partially formed in the PNP base 258, and the NPN collector contact 243b is partially formed in the NPN base 242b and partially formed in the PNP base 258. The cross section has been annotated to show certain circuit components formed from the layout, including NPN bipolar transistors 233a, 233b, PNP transistors 232a, 232b, p-well resistors 235a, 235b, n-well resistors 234a, 234b, and diodes 237a, 237b. The diagram is also annotated to show the third resistor 236, which can be formed using, for example, n-diffusion (not shown in this Figure). The Type B' building block 231 can undergo back end processing to form contacts and metallization. These details have been omitted from FIG. 8B for clarity.

The diodes 237a, 237b can be formed from substrate 251 and n-wells 248a, 248b. For example, the diode 237a has an anode formed from the substrate 251 and a cathode formed from the n-well 248a. The diode 237b has an anode formed from the substrate 251 and a cathode formed from the n-well 248b.

The NPN bipolar transistors 233a, 233b can be formed from NPN emitters 241a, 241b, PNP base 258, NPN collector contacts 243a, 243b, plates 245a, 245b, and NPN bases 242a, 242b. For example, the NPN bipolar transistor 233a can be formed from the NPN emitter 241a, the plate 245a, the PNP base 258, the NPN collector contact 243a, and the NPN base 242a. Likewise, the NPN bipolar transistor 233b can be foamed from the NPN emitter 241b, the plate 245b, the PNP base 258, the NPN collector contact 243b, and the NPN base 242b. Although the NPN bipolar transistors 233a, 233b are connected to NPN collector contacts 243a, 243b, in the illustrated embodiment, the contacts 243a, 243b are not connected to metal layers, and thus the PNP base 258 can also serve as the collectors for NPN bipolar transistors 233a, 233b.

Additional details of the NPN bipolar transistors 233a, 233b can be found above with reference to FIG. 6B.

The NPN bases 242a, 242b can be electrically isolated using n-wells 248a, 248b, n-well of the PNP base 258, and deep n-well 249. The n-well contacts 252a, 252b can form part of a guard ring around the Type B' building block 231. The substrate contacts 250a, 250b can form a portion of a substrate ring which can aid in protecting the Type B' building block 231 from latch-up.

The p-well resistors 235a, 235b can be formed from the resistance between the bases of NPN bipolar transistors 233a, 233b and the base contacts 247a, 247b. Skilled artisans will appreciate that the p-wells of the bases 242a, 242b can have a resistivity along the electrical path between the bases of NPN bipolar transistors 233a, 233b and the base contacts 247a, 247b, which can be modeled by p-well resistors 235a, 235b.

The PNP transistors 232a, 232b can be formed from PNP emitters 254a, 254b, PNP base 258, and the NPN bases 242a, 242b. For example, the PNP transistor 232a can have an emitter formed from the PNP emitter 254a, a base formed from the PNP base 258, and a collector formed from the NPN base 242a. Likewise, the PNP transistor 232b can have an emitter formed from the PNP emitter 254b, a base formed from the PNP base 258, and a collector formed from the NPN base 242b.

The n-well resistors 234a, 234b can be formed from the resistance between the bases of PNP transistors 232a, 232b and the PNP base contacts 257a, 257b. Skilled artisans will appreciate that the n-well of the PNP base 258 can have a resistivity along the electrical path between the bases of PNP transistors 232a, 232b and the PNP base contacts 257a, 257b, which can be modeled by n-well resistors 234a, 234b.

Persons of ordinary skill in the art will appreciate that the cross-section shown in FIG. 8B can result in the formation of the circuit shown in FIG. 8A. For example, each of the NPN bipolar transistors 233a, 233b can be legs of the NPN bipolar transistor 233. Likewise, each of the PNP transistors 232a, 232b can be legs of the PNP transistor 232. Additionally, the diodes 237a, 237b can form the diode 237, the n-well resistors 234a, 234b can form the first resistor 234, and the p-well resistors 235a, 235b can form the second resistor 235. The third resistor 236 can be formed using, for example, re-diffusion or poly (not shown in this Figure). Thus, FIG. 8B is a cross section of one implementation of the of the pad circuit building block of FIG. 8A. Skilled artisans will appreciate that numerous variations of the Type B' building block 201 are possible.

As was described above with reference to FIG. 8A, when a transient signal is present, the capacitance between the plate and the collector of the NPN bipolar transistor 233 can result in a current being injected in the base of the NPN bipolar transistor 233. This can aid the speed at which the Type B' building block 231 provides transient signal protection. The third resistor 236 can have a resistance selected to provide injection into the base of the NPN bipolar transistor 233 at a frequency associated with a particular transient signal event. In one embodiment, the third resistor 236 has a resistance selected in the range of about 200Ω to 50 kΩs.

Each of the NPN bipolar transistors 233a, 233b can be legs of the NPN bipolar transistor 233. In one embodiment, each NPN bipolar transistor 233a, 233b has a plate width typically selected between about 30 μm and 50 μm, so that the total plate width of the NPN bipolar transistor 233 is in the range of about 60 μm to 100 μm. The length of each NPN bipolar transistor 233a, 233b can have a length selected between, for example, about 0.25 μm and 0.6 μm, for example, about 0.5 μm. Although the cross section in FIG. 8B shows the NPN bipolar transistor 233 as having two legs, skilled artisans will appreciate that additional or fewer legs can be selected depending on a variety of factors, including the desired pad circuit dimensions and the desired total plate width. In one embodiment described with reference to FIGS. 18A-18B, the number and width of the legs is selected so that two instantiations of the Type B' building block 231 can fit under a bonding pad.

The PNP transistors 232a, 232b can be legs of the PNP transistor 232. Although the cross section illustrated in FIG. 8B shows the PNP transistor 232 as having two legs, skilled artisans will appreciate that additional or fewer legs can be selected depending on a variety of factors such as the manufacturing process and application.

With reference to FIGS. 4A, 4B, 7A, and 8A, the trigger voltages $V_{T\_A'}$, $V_{T\_B'}$ and the holding voltages $V_{H\_A'}$, $V_{H\_B'}$ of the Type A' and Type B' building blocks can be selected so that the pad circuit 22 has a trigger voltage $V_{TRIGGER}$ and a holding voltage $V_{HOLDING}$ desired for a particular electronic system or application. For example, i number of Type A' building blocks and j number of Type B' building blocks can be cascaded so that the pad circuit 22 has a trigger voltage $V_{TRIGGER}$ roughly equal to about $i*V_{T\_A'}+j*V_{T\_B'}$, and a holding voltage $V_{HOLDING}$ roughly equal to about $i*V_{H\_A'}+j*V_{H\_B'}$. By selecting the Type and number of building blocks employed, and/or by selecting the value of $V_{H\_A'}$, $V_{H\_B'}$, $V_{T\_A'}$ and $V_{T\_B'}$ during design of the building blocks, a scalable family of pad circuits can be created which can be adapted for a multitude of electronic systems and applications. The design cost associated with designing the pad circuits can be reduced as compared to, for example, an approach in which different diode, bipolar, silicon controlled rectifier and MOS devices are employed to achieve the reliability and performance requirements needed for each pad circuit. The desired trigger voltage and holding voltage of each building block type can be achieved by proper selection of a variety of parameters, including, for example, the geometries of the transistors, the common-emitter gain or "β" of the transistors, and by selecting the resistance of the resistors.

In one embodiment, the Type A' building block 201 and the Type B' building block 231 are configured to have about the same trigger voltage, $V_{T\_A'}=V_{T\_B'}=V_T$. Additionally, the positive feedback between the NPN bipolar transistor 233 and the PNP transistor 232 is employed to selectively decrease the holding voltage $V_{H\_B'}$ of the Type B' building block 231 relative to the holding voltage $V_{H\_A'}$ of the Type A' building block 201. Thus, i number of Type A' building blocks and j number of Type B' building blocks can be combined in a cascade configuration to produce a pad circuit 22 having a trigger voltage $V_{TRIGGER}$ roughly equal to about $(i+j)*V_T$, and a holding voltage $V_{HOLDING}$ roughly equal to about $i*V_{H\_A'}+j*V_{H\_B'}$, where $V_{H\_B'}$ is selected to be less than $V_{H\_A'}$. This permits configurations having the same number of building blocks in the cascade to have about the same trigger voltage $V_{TRIGGER}$. Additionally, the type of building blocks in the cascade can be selected to achieve the desired holding voltage $V_{HOLDING}$ of the pad circuit 22.

FIGS. 9A-14B illustrate various other embodiments in a family of cascaded building blocks using Type A' building block 201 and Type B' building block 231. Although FIGS. 9A-14B are described in the context of Type A' and Type B' building blocks 201, 231 of FIGS. 7A and 8A, skilled artisans will appreciate that similar configurations can be created using the Type A and Type B building blocks 91, 92 of FIGS. 5A and 5B.

As was described earlier with reference to Table 1 and FIGS. 3A and 3B, there is a need for pad circuits which can be configured to meet the performance and design parameters required for a particular application. For example, various pads of the power management IC 20 can have different reliability and performance parameters, as shown in Table 1. FIGS. 9A-14B illustrate various cascade configurations of Type A' and Type B' building blocks 201, 231, which can be employed to meet different reliability and performance parameters, as will be described below. In one embodiment, the type and number of building blocks are selected during design for a particular application. In another embodiment, a multitude of building blocks are placed in the vicinity of the pad during front end fabrication, and the desired configuration is selected by changing metal layers and via connections during back end processing. In yet another embodiment, a multitude of building blocks are placed in the vicinity of the bonding pad, and the type and number of the building blocks are selected using the pad controller 23 after fabrication, as was described earlier.

Figure 9A:
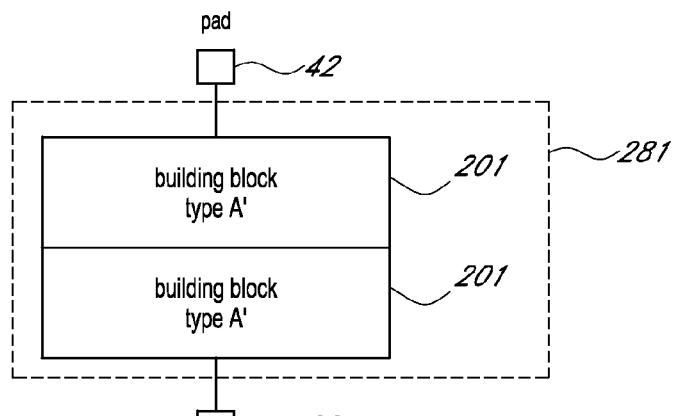
FIG. 9A is a schematic block diagram of a pad circuit according to a first embodiment.

FIG. 9A is a schematic block diagram of a pad circuit according to a first embodiment. The illustrated pad circuit 281 includes two Type A' building blocks 201 connected in a cascade between the pad 42 and the node 82. The Type A' building block 201 can be configured to have a trigger voltage $V_{T\_A'}$ equal to about the trigger voltage $V_{T\_B'}$ of the Type B' building block 231 of FIG. 8A. However, the holding voltage $V_{H\_A'}$ of the Type A' building block 201 can be configured to be greater than the holding voltage $V_{H\_B'}$ of the Type B' building block 231. Thus, the pad circuit 281 can be employed, for example, in an input pad having a moderate operating voltage and requiring a relatively high holding voltage. For example, if $V_{T\_A'}$ is equal to about 9 V and $V_{H\_A'}$ is equal to about 5 V, the pad circuit 281 can have a trigger voltage of about 18 V and a holding voltage of about 10 V. Thus, the pad circuit 281 can have a holding voltage and trigger voltage appropriate for the pad VH1 in Table 1.

Figure 9B:
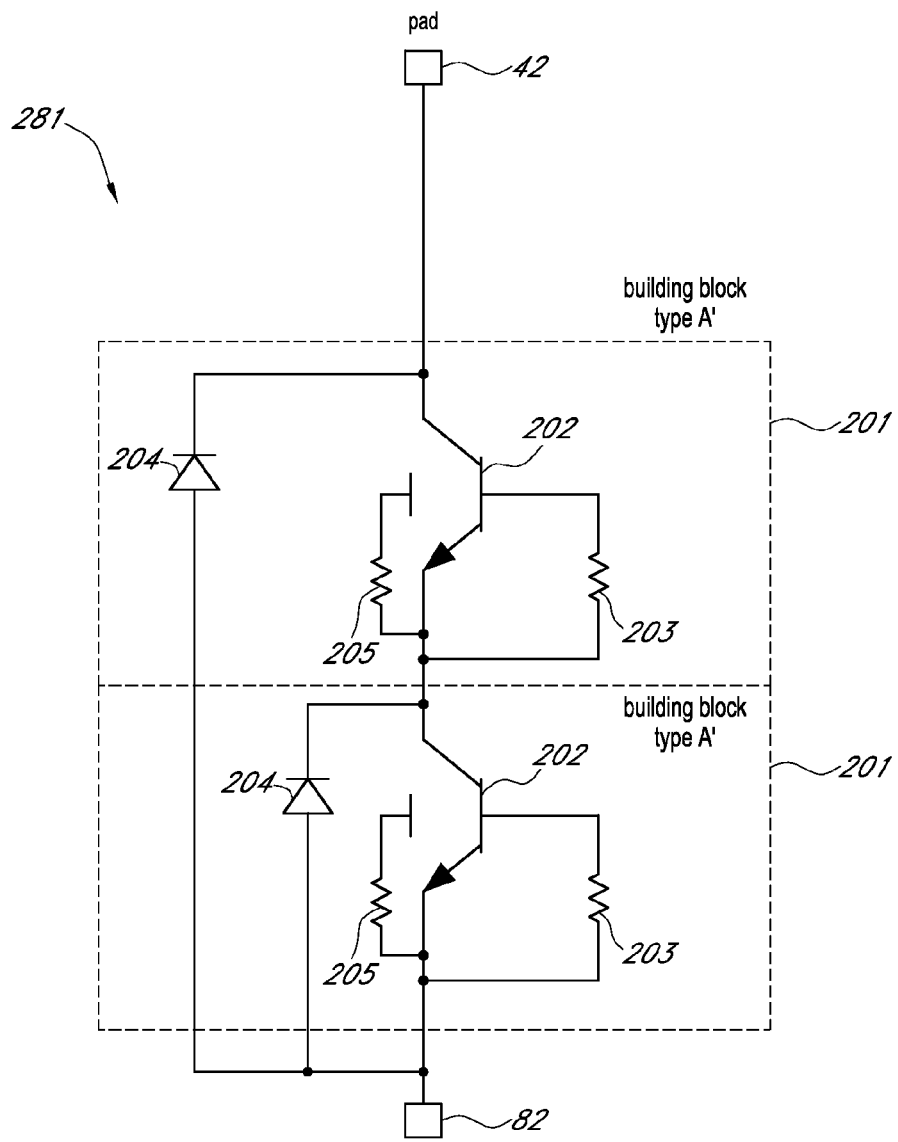
FIG. 9B is a circuit diagram of the pad circuit of FIG. 9A.

FIG. 9B is a circuit diagram of the pad circuit of FIG. 9A. The illustrated pad circuit 281 includes two Type A' building blocks connected in a cascade configuration between the pad 42 and the node 82. Each Type A' building block 201 includes a first resistor 203, a second resistor 205, a diode 204, and a NPN bipolar transistor 202 having an emitter, a base, a collector, and a plate. Additional details of the Type A' building block 201 can be as described earlier with reference to FIG. 7A.

Figure 10A:
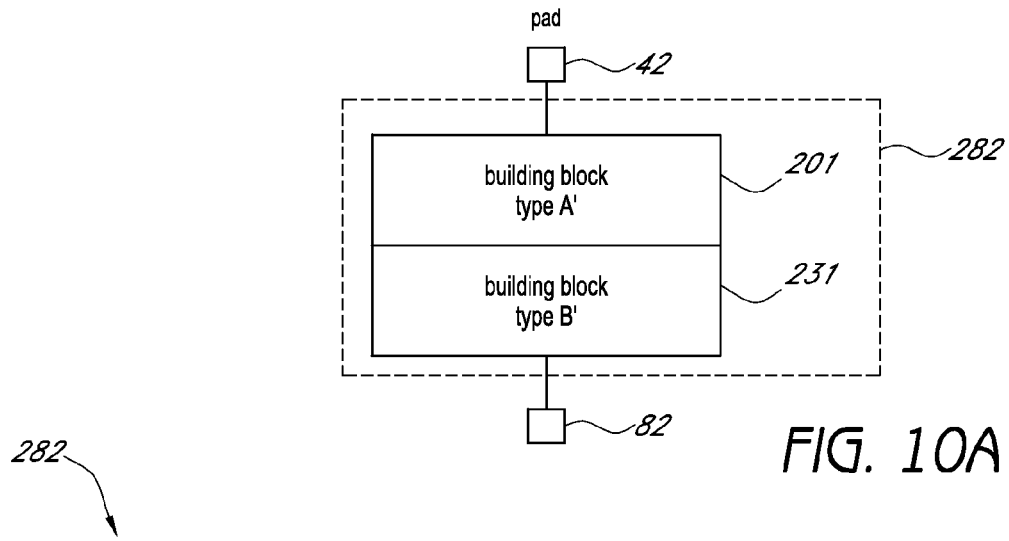
FIG. 10A is a schematic block diagram of a pad circuit according to a second embodiment.

FIG. 10A is a schematic block diagram of a pad circuit according to a second embodiment. The illustrated pad circuit 282 includes a Type A' building block 201 connected in a cascade with a Type B' building block 231 between the pad 42 and the node 82. As described above, the Type A' building block 201 can be configured to have a trigger voltage $V_{T\_A'}$ equal to about the trigger voltage $V_{T\_B'}$ of the Type B' building block 231. However, the holding voltage $V_{H\_A'}$ of the Type A' building block 201 can be configured to be greater than the holding voltage $V_{H\_B'}$ of the Type B' building block 231. Thus, the pad circuit 282 can be employed, for example, in an input pad having a relatively moderate operating voltage and requiring a relatively moderate holding voltage. For example, if $V_{T\_A'}$ and $V_{T\_B'}$ are equal to about 9 V, $V_{H\_A'}$ is equal to about 5 V, and $V_{H\_B'}$ is equal to about 2.5 V, the pad circuit 282 can have a trigger voltage of about 18 V and a holding voltage of about 7.5 V. Thus, the pad circuit 282 can have a holding voltage and trigger voltage appropriate for the pad VH2 in Table 1.

Figure 10B:
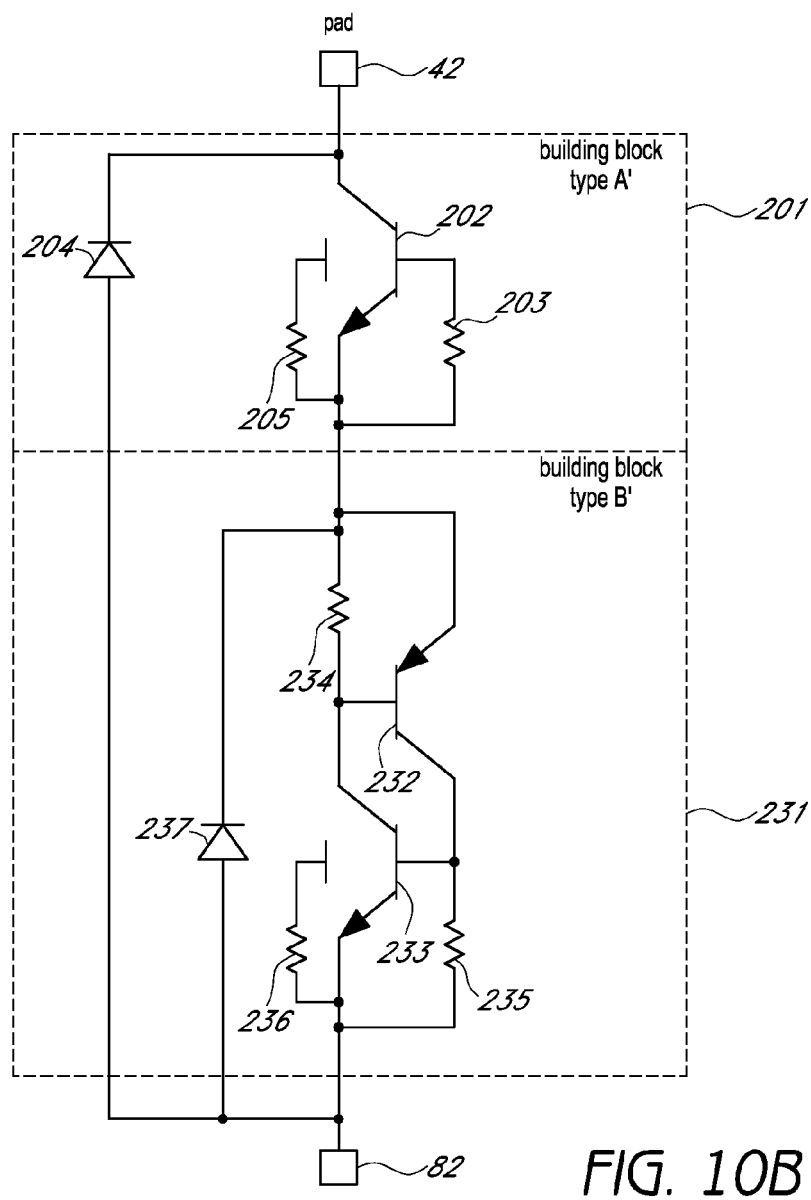
FIG. 10B is a circuit diagram of the pad circuit of FIG. 10A.

FIG. 10B is a circuit diagram of the pad circuit of FIG. 10A. The illustrated pad circuit 282 includes a Type A' building block 201 and a Type B' building block 231 connected in a cascade configuration between the pad 42 and the node 82.

The Type A' building block 201 includes a first resistor 203, a second resistor 205, a diode 204, and a NPN bipolar transistor 202 having an emitter, a base, a collector, and a plate. Additional details of the Type A' building block 201 can be as described earlier with reference to FIG. 7A. The Type B' building block 231 includes a PNP transistor 232, a NPN bipolar transistor 233, a first resistor 234, a second resistor 235, a third resistor 236, and a diode 237. The PNP transistor 232 includes an emitter, a base, and a collector, and the NPN bipolar transistor 233 includes an emitter, a base, a collector and a plate. Additional details of the Type B' building block 231 can be as described earlier with reference to FIG. 8A.

Figure 11A:
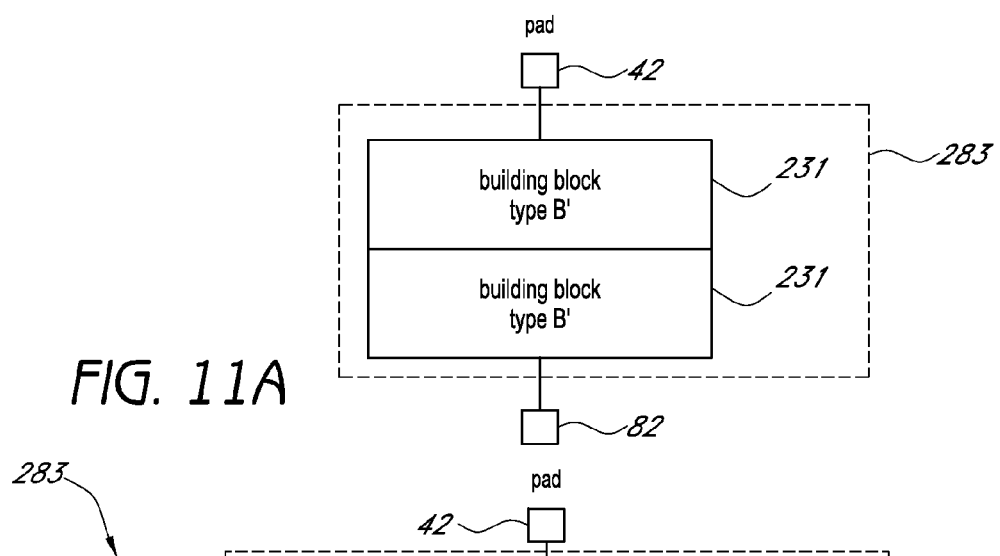
FIG. 11A is a schematic block diagram of a pad circuit according to a third embodiment.

FIG. 11A is a schematic block diagram of a pad circuit according to a third embodiment. The illustrated pad circuit 283 includes two Type B' building block 231 connected in a cascade between the pad 42 and the node 82. As described above, the Type B' building block 231 can be configured to have a trigger voltage $V_{T\_B'}$ equal to about the trigger voltage $V_{T\_A'}$ of the Type A' building block 201 of FIG. 7A. However, the holding voltage $V_{H\_B'}$ of the Type B' building block 231 can be configured to be greater than the holding voltage $V_{H\_A'}$ of the Type A' building block 201. Thus, the pad circuit 283 can be employed, for example, in an input pad having a relatively moderate operating voltage and requiring a relatively low holding voltage. For example, if $V_{T\_B'}$ is equal to about 9 V and $V_{H\_B'}$ is equal to about 2.5 V, the pad circuit 283 can have a trigger voltage of about 18 V and a holding voltage of about 5 V. Thus, the pad circuit 283 can have a holding voltage and trigger voltage appropriate for the pad VH3 in Table 1.

Figure 11B:
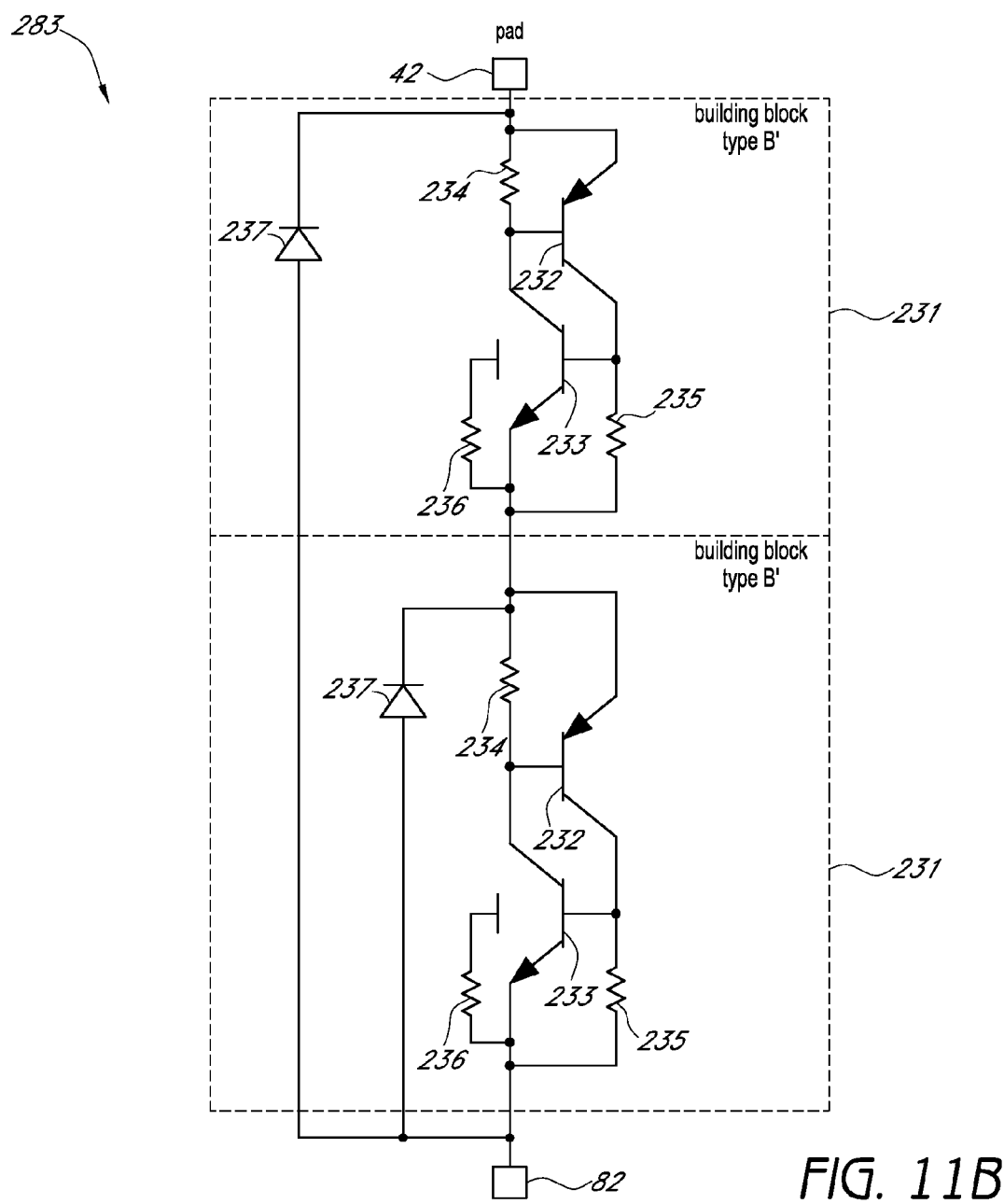
FIG. 11B is a circuit diagram of the pad circuit of FIG. 11A.

FIG. 11B is a circuit diagram of the pad circuit of FIG. 11A. The illustrated pad circuit 283 includes two Type B' building blocks 231 connected in a cascade configuration between the pad 42 and the node 82. Each Type B' building block 231 includes a PNP transistor 232, a NPN bipolar transistor 233, a first resistor 234, a second resistor 235, a third resistor 236, and a diode 237. The PNP transistor 232 includes an emitter, a base, and a collector, and the NPN bipolar transistor 233 includes an emitter, a base, a collector and a plate. Additional details of the Type B' building block 231 can be as described earlier with reference to FIG. 8A.

Figure 12A:
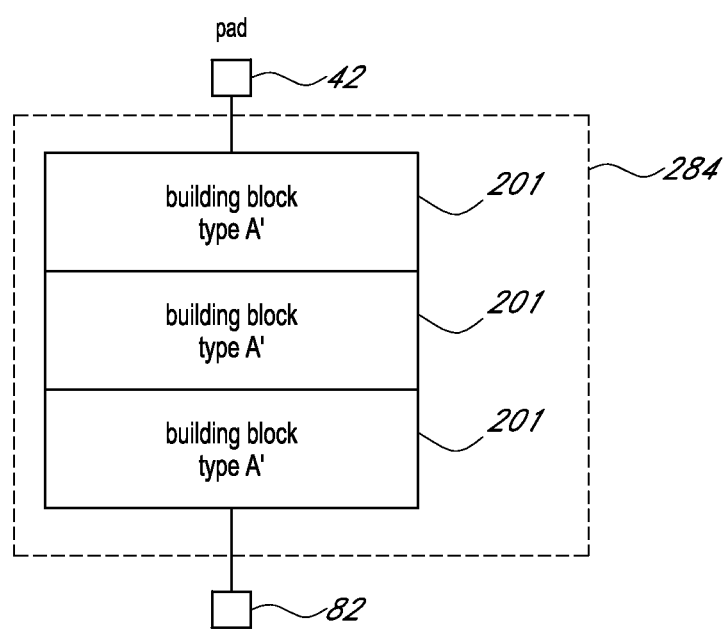
FIG. 12A is a schematic block diagram of a pad circuit according to a fourth embodiment.

FIG. 12A is a schematic block diagram of a pad circuit according to a fourth embodiment. The illustrated pad circuit 284 includes three Type A' building blocks 201 connected in a cascade between the pad 42 and the node 82. The Type A' building block 201 can be configured to have a trigger voltage $V_{T\_A'}$ equal to about the trigger voltage $V_{T\_B'}$ of the Type B' building block 231 of FIG. 8A. However, the holding voltage $V_{H\_A'}$ of the Type A' building block 201 can be configured to be greater than the holding voltage $V_{H\_B'}$ of the Type B' building block 231. Thus, the pad circuit 284 can be employed, for example, in an output pad having a relatively high operating voltage and requiring a relatively high holding voltage. For example, if $V_{T\_A'}$ is equal to about 9 V and $V_{H\_A'}$ is equal to about 5 V, the pad circuit 284 can have a trigger voltage of about 27 V and a holding voltage of about 15 V. Thus, the pad circuit 284 can have a holding voltage and trigger voltage appropriate for the pad OVERVOLTAGE in Table 1.

Figure 12B:
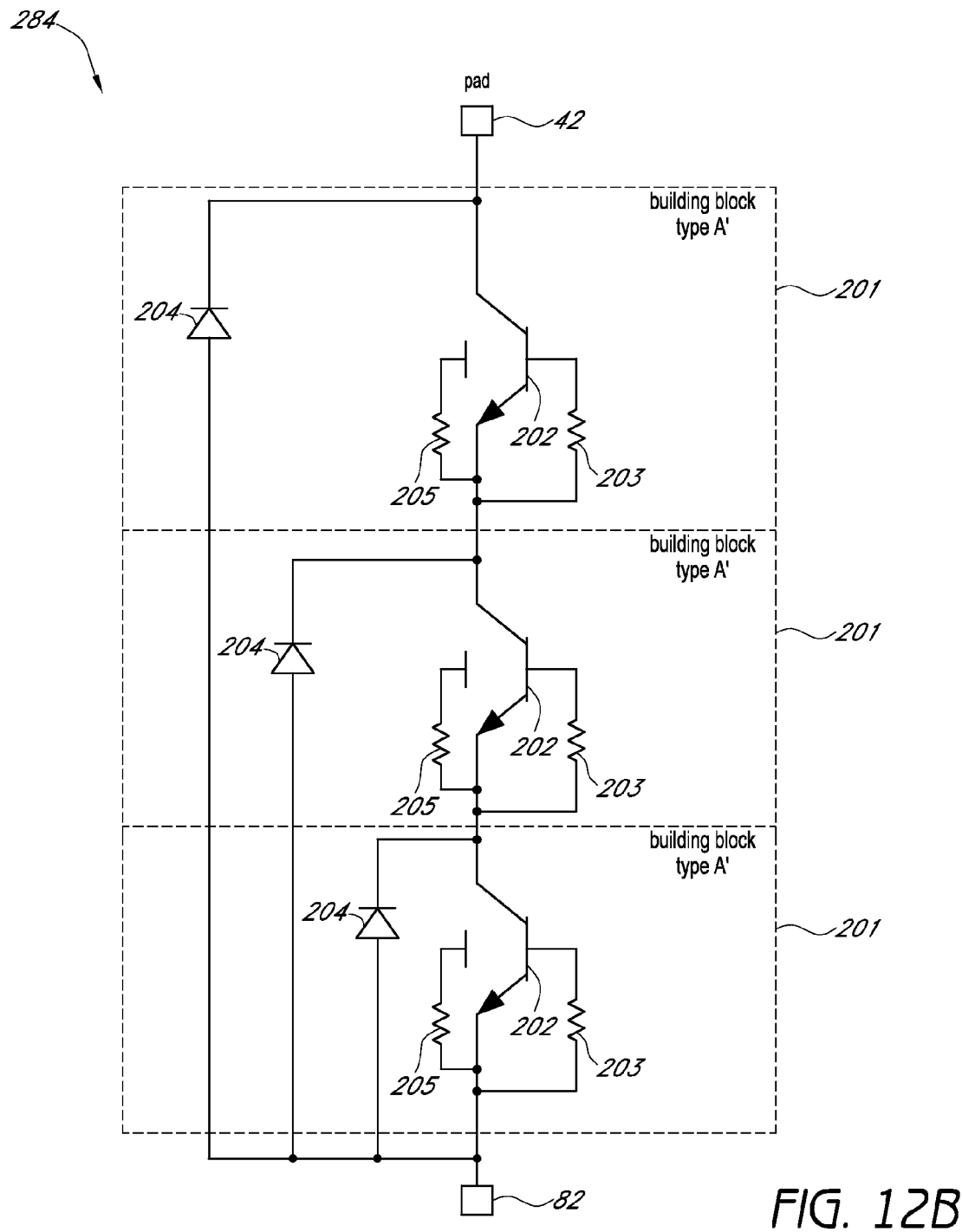
FIG. 12B is a circuit diagram of the pad circuit of FIG. 12A.

FIG. 12B is a circuit diagram of the pad circuit of FIG. 12A. The illustrated pad circuit 284 includes three Type A' building blocks connected in a cascade configuration between the pad 42 and the node 82. Each Type A' building block 201 includes a first resistor 203, a second resistor 205, a diode 204, and a NPN bipolar transistor 202 having an emitter, a base, a collector, and a plate. Additional details of the Type A' building block 201 can be as described earlier with reference to FIG. 7A.

Figure 13A:
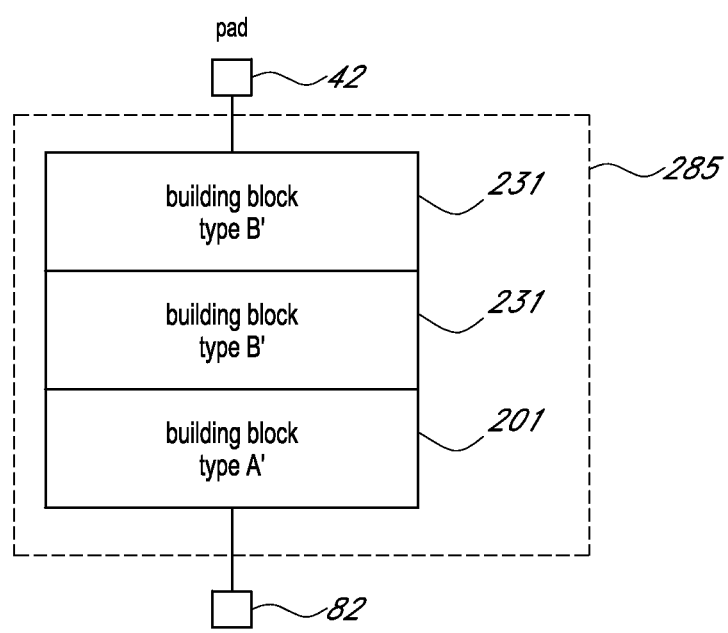
FIG. 13A is a schematic block diagram of a pad circuit according to a fifth embodiment.

FIG. 13A is a schematic block diagram of a pad circuit according to a fifth embodiment. The illustrated pad circuit 285 includes two Type B' building blocks 231 connected in a cascade with a Type A' building block 201 between the pad 42 and the node 82. As described above, the Type A' building block 201 can be configured to have a trigger voltage $V_{T\_A'}$ equal to about the trigger voltage $V_{T\_B'}$ of the Type B' building block 231. However, the holding voltage $V_{H\_A'}$ of the Type A' building block 201 can be configured to be greater than the holding voltage $V_{H\_B'}$ of the Type B' building block 231. Thus, the pad circuit 285 can be employed, for example, in an output pad having a relatively high operating voltage and requiring a relatively moderate holding voltage. For example, if $V_{T\_A'}$ and $V_{T\_B'}$ are equal to about 9 V, $V_{H\_A'}$ is equal to about 5 V, and $V_{H\_B'}$ is equal to about 2.5 V, the pad circuit 285 can have a trigger voltage of about 27 V and a holding voltage of about 10 V. Thus, the pad circuit 285 can have a holding voltage and trigger voltage appropriate for the pad UNDERVOLTAGE in Table 1.

Figure 13B:
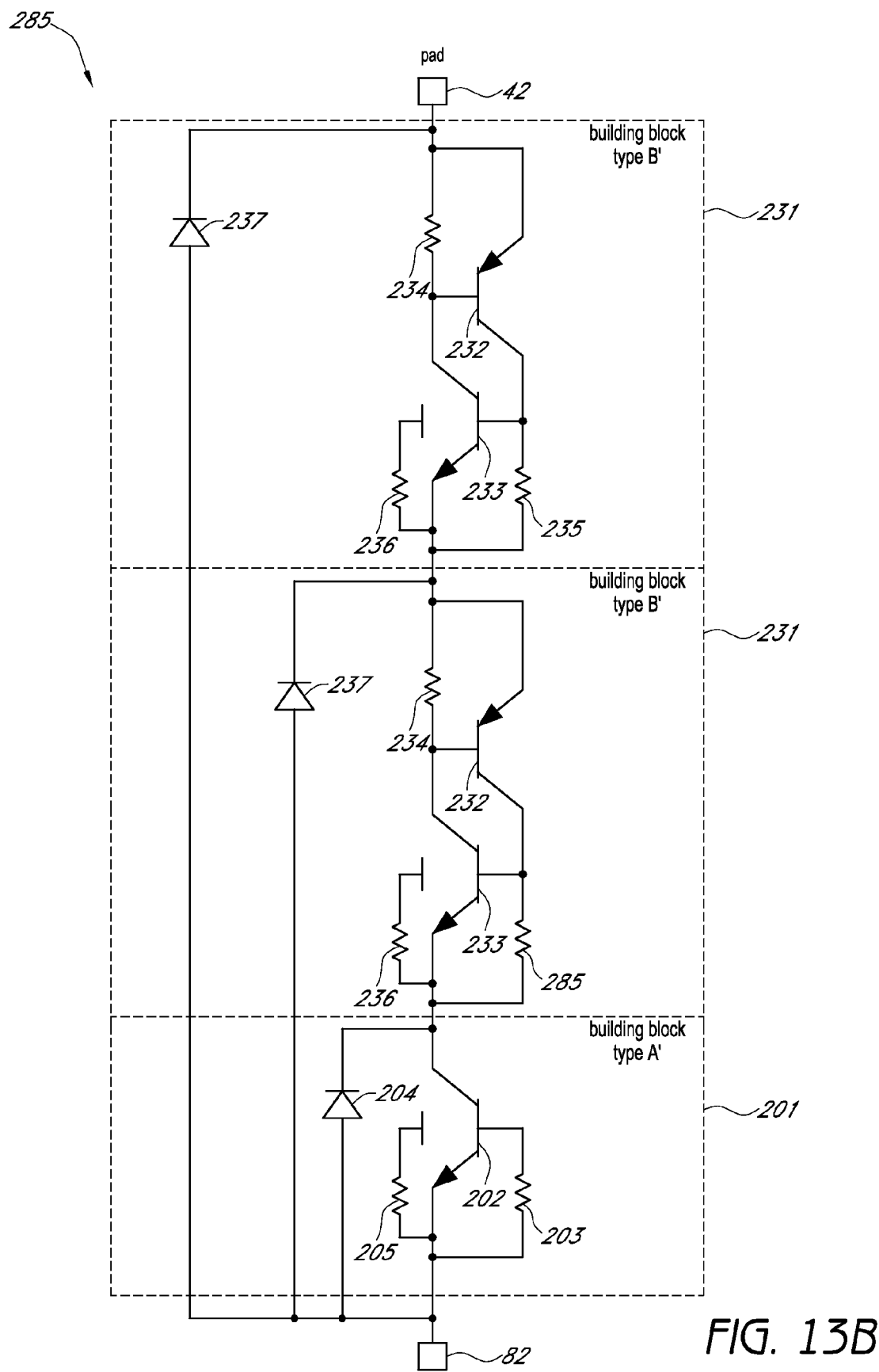
FIG. 13B is a circuit diagram of the pad circuit of FIG. 13A.

FIG. 13B is a circuit diagram of the pad circuit of FIG. 13A. The illustrated pad circuit 285 includes two Type B' building blocks 231 connected in a cascade with a Type A' building block 201 between the pad 42 and the node 82. The Type A' building block 201 includes a first resistor 203, a second resistor 205, a diode 204, and a NPN bipolar transistor 202 having an emitter, a base, a collector, and a plate. Additional details of the Type A' building block 201 can be as described earlier with reference to FIG. 7A. Each Type B' building block 231 includes a PNP transistor 232, a NPN bipolar transistor 233, a first resistor 234, a second resistor 235, a third resistor 236, and a diode 237. The PNP transistor 232 includes an emitter, a base, and a collector, and the NPN bipolar transistor 233 includes an emitter, a base, a collector and a plate. Additional details of the Type B' building block 231 can be as described earlier with reference to FIG. 8A.

Figure 14A:
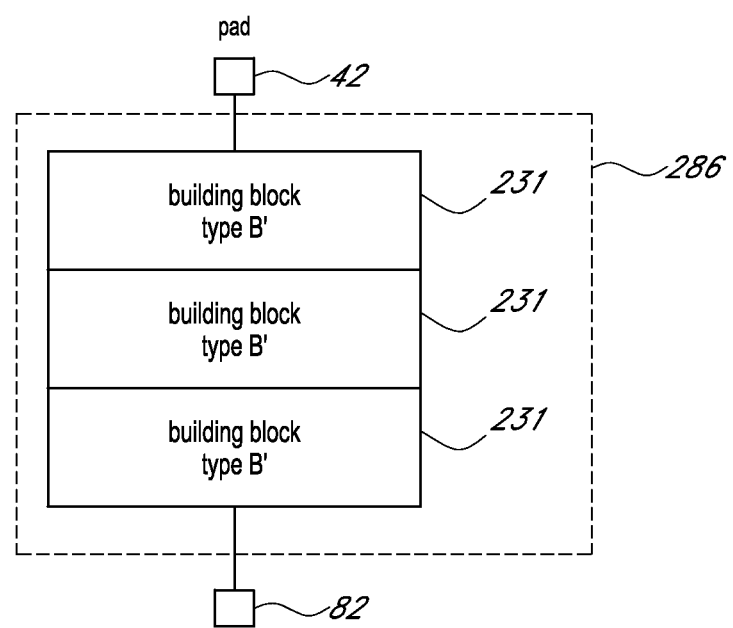
FIG. 14A is a schematic block diagram of a pad circuit according to a sixth embodiment.

FIG. 14A is a schematic block diagram of a pad circuit according to a sixth embodiment. The illustrated pad circuit 286 includes three Type B' building block 231 connected in a cascade between the pad 42 and the node 82. As described above, the Type B' building block 231 can be configured to have a trigger voltage $V_{T\_B'}$ equal to about the trigger voltage $V_{T\_A'}$ of the Type A' building block 201 of FIG. 7A. However, the holding voltage $V_{H\_B'}$ of the Type B' building block 231 can be configured to be greater than the holding voltage $V_{H\_A'}$ of the Type A' building block 201. Thus, the pad circuit 286 can be employed, for example, in an input pad having a relatively high operating voltage and requiring a relatively low holding voltage. For example, if $V_{T\_B'}$ is equal to about 9 V and $V_{H\_B'}$ is equal to about 2.5 V, the pad circuit 286 can have a trigger voltage of about 27 V and a holding voltage of about 7.5 V. Thus, the pad circuit 286 can have a holding voltage and trigger voltage appropriate for the pad VH4 in Table 1.

Figure 14B:
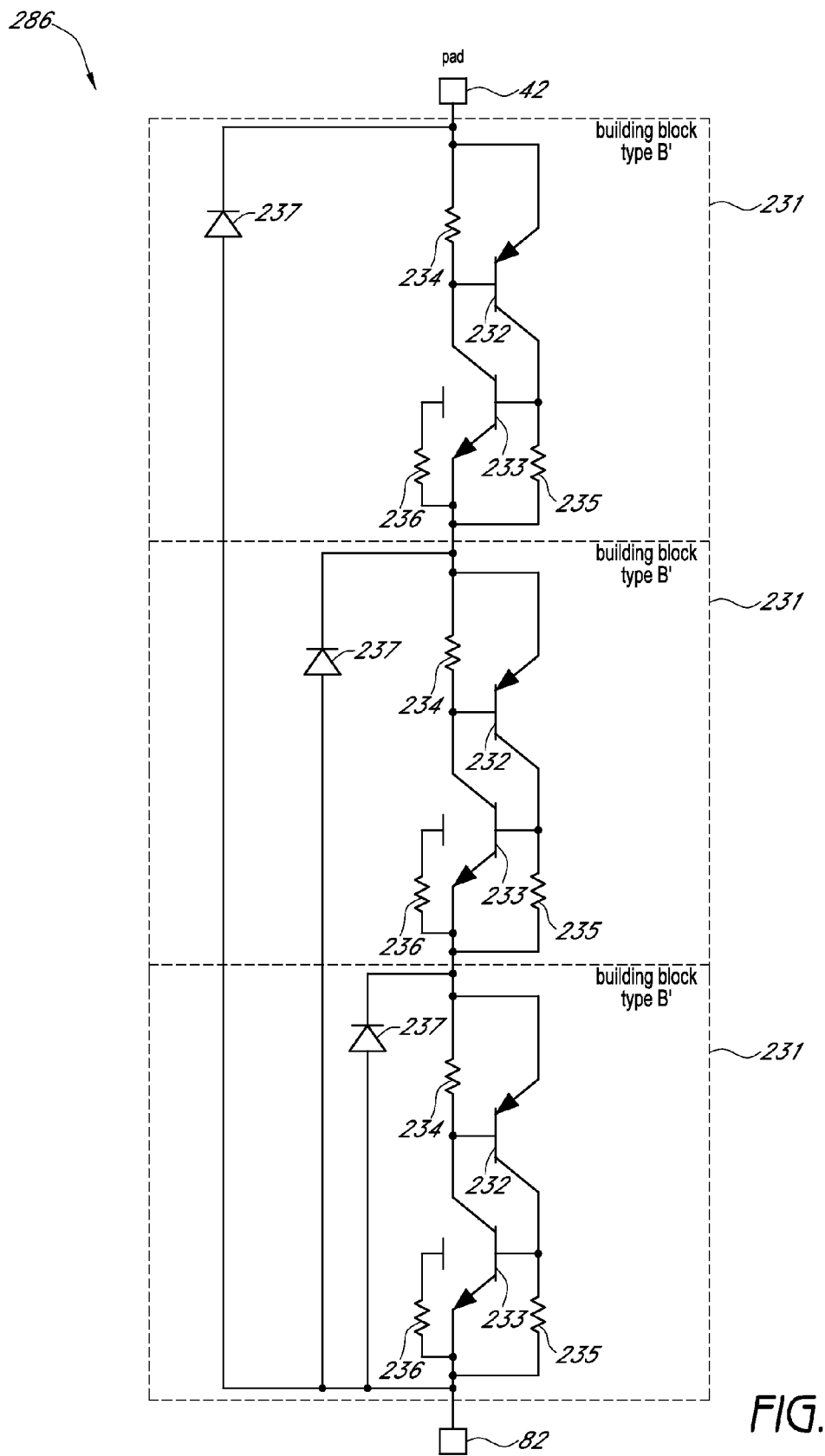
FIG. 14B is a circuit diagram of the pad circuit of FIG. 14B.

FIG. 14B is a circuit diagram of the pad circuit of FIG. 14B. The illustrated pad circuit 286 includes three Type B' building block 231 connected in a cascade between the pad 42 and the node 82. Each Type B' building block 231 includes a PNP transistor 232, a NPN bipolar transistor 233, a first resistor 234, a second resistor 235, a third resistor 236, and a diode 237. The PNP transistor 232 includes an emitter, a base, and a collector, and the NPN bipolar transistor 233 includes an emitter, a base, a collector and a plate. Additional details of the Type B' building block 231 can be as described earlier with reference to FIG. 8A.

In the embodiments shown in FIGS. 9A-14B, cascaded building block configurations employ Type A' and Type B' building blocks 201, 231. However, one or more additional building block types can be included. For example, a Type C' building block having a holding voltage $V_{H\_C'}$ and a trigger voltage $V_{T\_C'}$ can be utilized. The pad circuit 22 can combine i number of Type A' building blocks, j number of Type B' building blocks, and k number of Type C' building blocks such that the pad circuit 22 has a trigger voltage $V_{TRIGGER}$ roughly equal to about $i*V_{T\_A'}+j*V_{T\_B'}+k*V_{T\_C'}$, and a holding voltage $V_{HOLDING}$ roughly equal to about $i*V_{H\_A'}+j*V_{H\_B'}+k*V_{H\_C'}$. Providing additional types of building block can increase the multitude of configurations of the cascade at the expense of an increase in design complexity.

Figure 15:
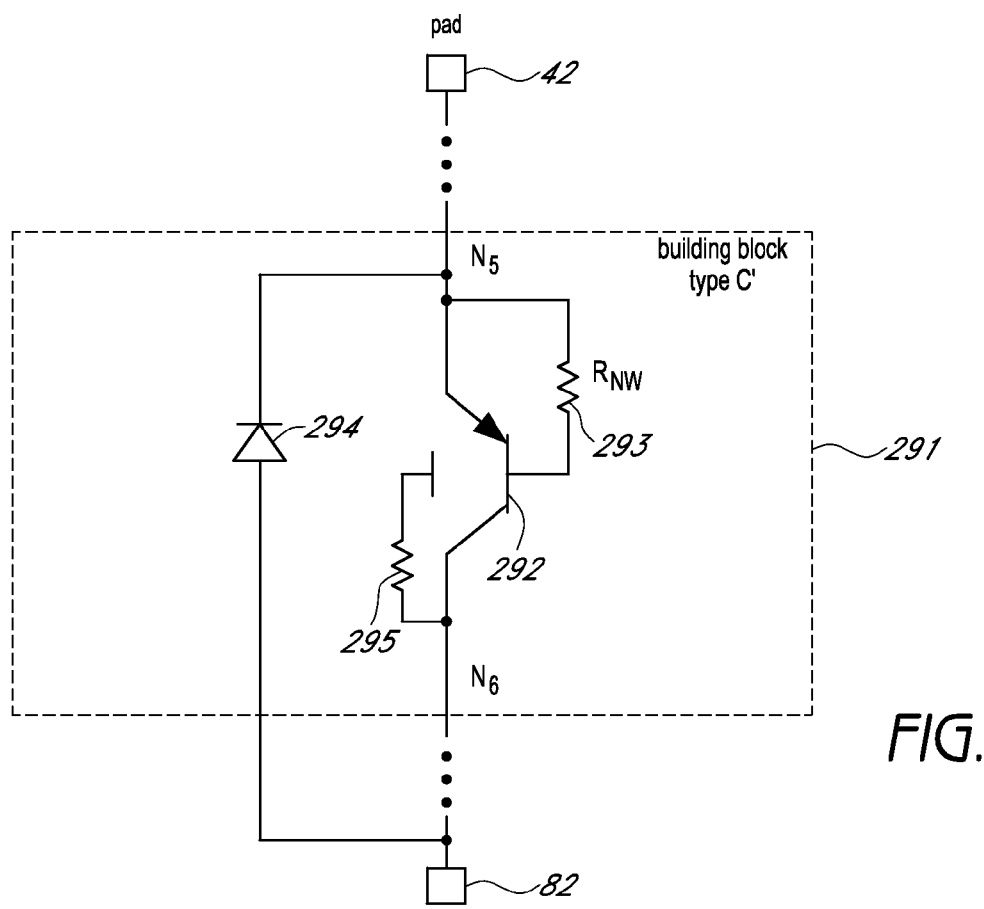
FIG. 15 is a circuit diagram illustrating a pad circuit building block in accordance with yet another embodiment.

FIG. 15 is a circuit diagram illustrating a pad circuit building block in accordance with yet another embodiment. The Type C' building block 291 can be connected in a cascade with other building blocks between the pad 42 and the node 82. The illustrated Type C' building block 291 includes a first resistor 293, a second resistor 295, a diode 294, and a PNP bipolar transistor 292 having an emitter, a base, a collector, and a plate. The PNP bipolar transistor 292 can have a structure similar to that of the PNP bipolar transistor 160 of FIG. 6C.

The diode 294 includes an anode electrically connected to the node 82, and a cathode electrically connected to the emitter of the PNP bipolar transistor 292 and to a first end of the first resistor 293 at a node $N_5$. The node $N_5$ can be electrically connected to another building block in a cascade, such as the cascaded building blocks of FIGS. 4A and 4B, or to the pad 42. The first resistor 293 includes a second end electrically connected to the base of the PNP bipolar transistor 292. The first resistor 293 can have, for example, a resistance between about 11Ω and about 85Ω. In one embodiment, the first resistor 293 is implemented using a multi-finger array to achieve the target resistance, such as an array of six fingers each having a resistance selected from the range of about 66Ω and about 510Ω. The second resistor 295 includes a first end electrically connected to the plate of the PNP bipolar transistor 292, and a second end electrically connected to the collector of the NPN bipolar transistor 292 at a node $N_6$. The second resistor 295 can have, for example, a resistance between about 200Ω and about 50 kΩ. The node $N_6$ can be electrically connected to another building block in a cascade or to the node 82.

The pad circuit 22 can be, for example, any of the pad circuits 22a-22p shown in FIG. 2, and the pad 42 can be any of the pads 42a-42p, including, for example, low-impedance output pads, high-impedance input pads, and low-impedance power pads. The node 82 can be, for example, a low impedance node or pad of the power management IC 20 configured to handle a relatively large shunted current. A transient signal event can be received at the pad 42. If the transient signal event has a voltage that is negative with respect to the node 82, the diode 294 can provide current which can aid in protecting the power management IC 20.

If the transient signal event has a voltage which is positive with respect to the node 82, the PNP bipolar transistor 292 can aid in providing transient signal protection. The trigger voltage of the Type C' building block $V_{T\_C'}$ can be based on the collector-emitter breakdown voltage of the PNP bipolar transistor 292. The Type C' building block can have a holding voltage $V_{H\_C'}$ greater than either the holding voltage $V_{H\_A'}$ or $V_{H\_B'}$. During normal operation, the absence of the LDD can make the leakage of the PNP bipolar transistor 292 low, even at relatively high temperatures. The PNP bipolar transistor 292 can have a lower leakage current as compared to a similarly sized PMOS transistor.

Figure 16A:
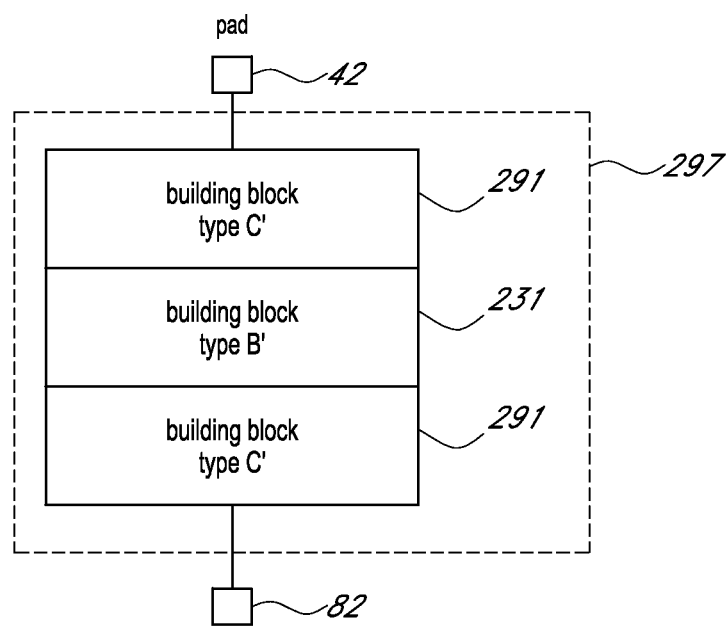
FIG. 16A is a schematic block diagram of a pad circuit according to a seventh embodiment.

FIG. 16A is a schematic block diagram of a pad circuit according to a seventh embodiment. The illustrated pad circuit 297 includes a Type C' building block 291, a Type B' building block 231, and a Type C' building block 291 connected in a cascade between the pad 42 and the node 82. As described above, the holding voltage $V_{H\_C'}$ of the Type C' building block 291 can be configured to be greater than the holding voltage $V_{H\_B'}$ of the Type B' building block 231 or the holding voltage $V_{H\_A'}$ of the Type A' building block 201. Furthermore, in certain processes, the leakage of the Type C' building block 291 can be less than that of the Type A' and Type B' building blocks 201, 231. Thus, the pad circuit 297 can be used, for example, in a very low leakage power pad having a relatively high operating voltage and requiring a relatively high holding voltage. For example, if $V_{T\_A'}$ and $V_{T\_B'}$ are equal to about 9 V, $V_{T\_C'}$ is equal to about 10 V, $V_{H\_B'}$ is equal to about 2.5 V, and $V_{H\_C'}$ is equal to about 10V, the pad circuit 285 can have a trigger voltage of about 29 V and a holding voltage of about 22.5 V. Thus, the pad circuit 297 can have a holding voltage and trigger voltage appropriate for the pad Vcc in Table 1. Additionally, in certain processes, the leakage current of the pad circuit 297 can be less than certain pad circuit configurations using only Type A' and Type B' building blocks, and thus pad circuit configurations with Type C' building blocks can be employed for very low leakage pads.

Figure 16B:
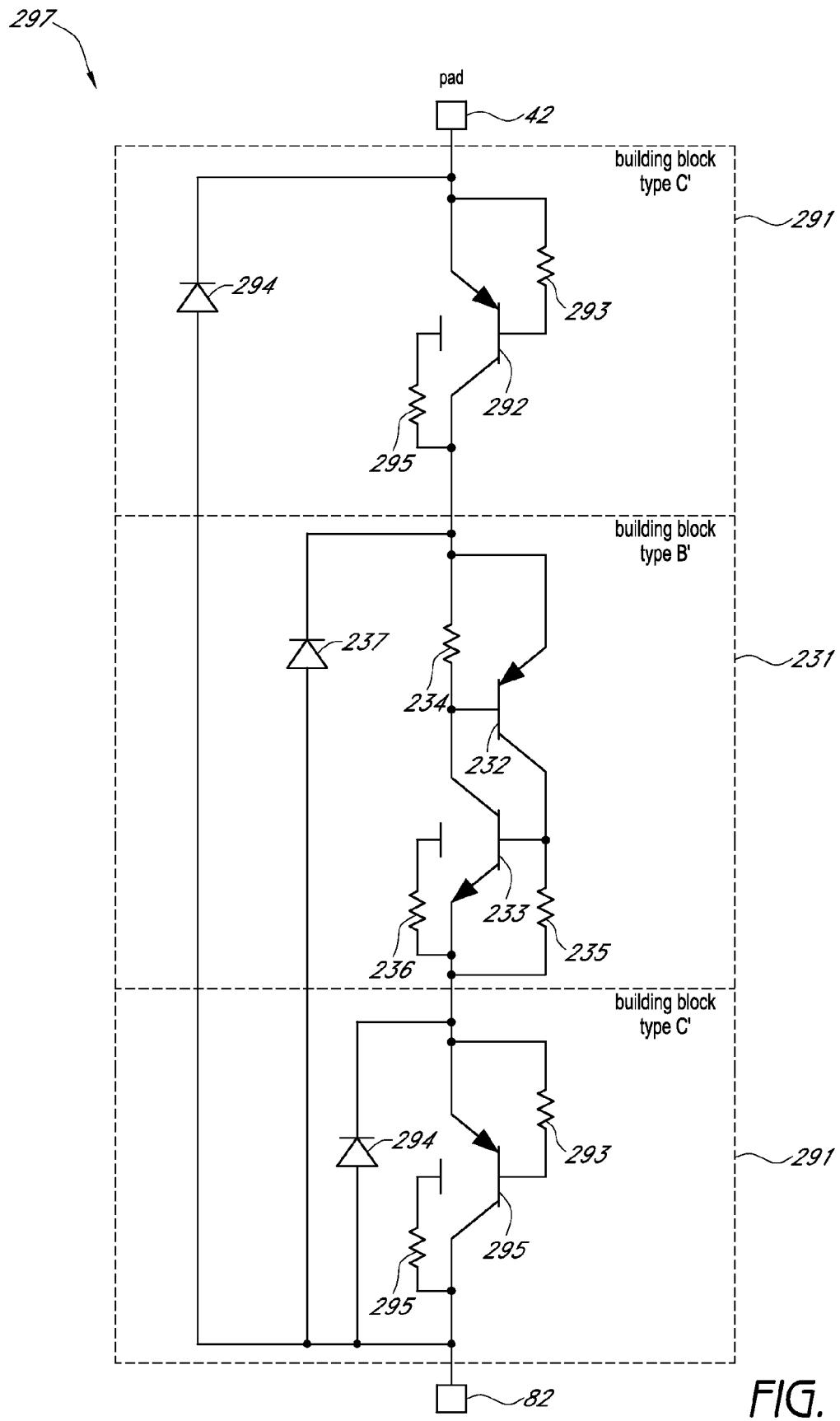
FIG. 16B is a circuit diagram of the pad circuit of FIG. 16A.

FIG. 16B is a circuit diagram of the pad circuit of FIG. 16A. The illustrated pad circuit 297 includes a Type C' building block 291, a Type B' building block 231, and a Type C' building block 291 connected in a cascade between the pad 42 and the node 82. Each Type C' building block 291 includes a first resistor 293, a second resistor 295, a diode 294, and a PNP bipolar transistor 292 having an emitter, a base, a collector, and a plate. Additional details of the Type C' building block 291 can be as described earlier with reference to FIG. 15. The Type B' building block 231 includes a PNP transistor 232, a NPN bipolar transistor 233, a first resistor 234, a second resistor 235, a third resistor 236, and a diode 237. The PNP transistor 232 includes an emitter, a base, and a collector, and the NPN bipolar transistor 233 includes an emitter, a base, a collector and a plate. Additional details of the Type B' building block 231 can be as described earlier with reference to FIG. 8A.

Figure 17A:
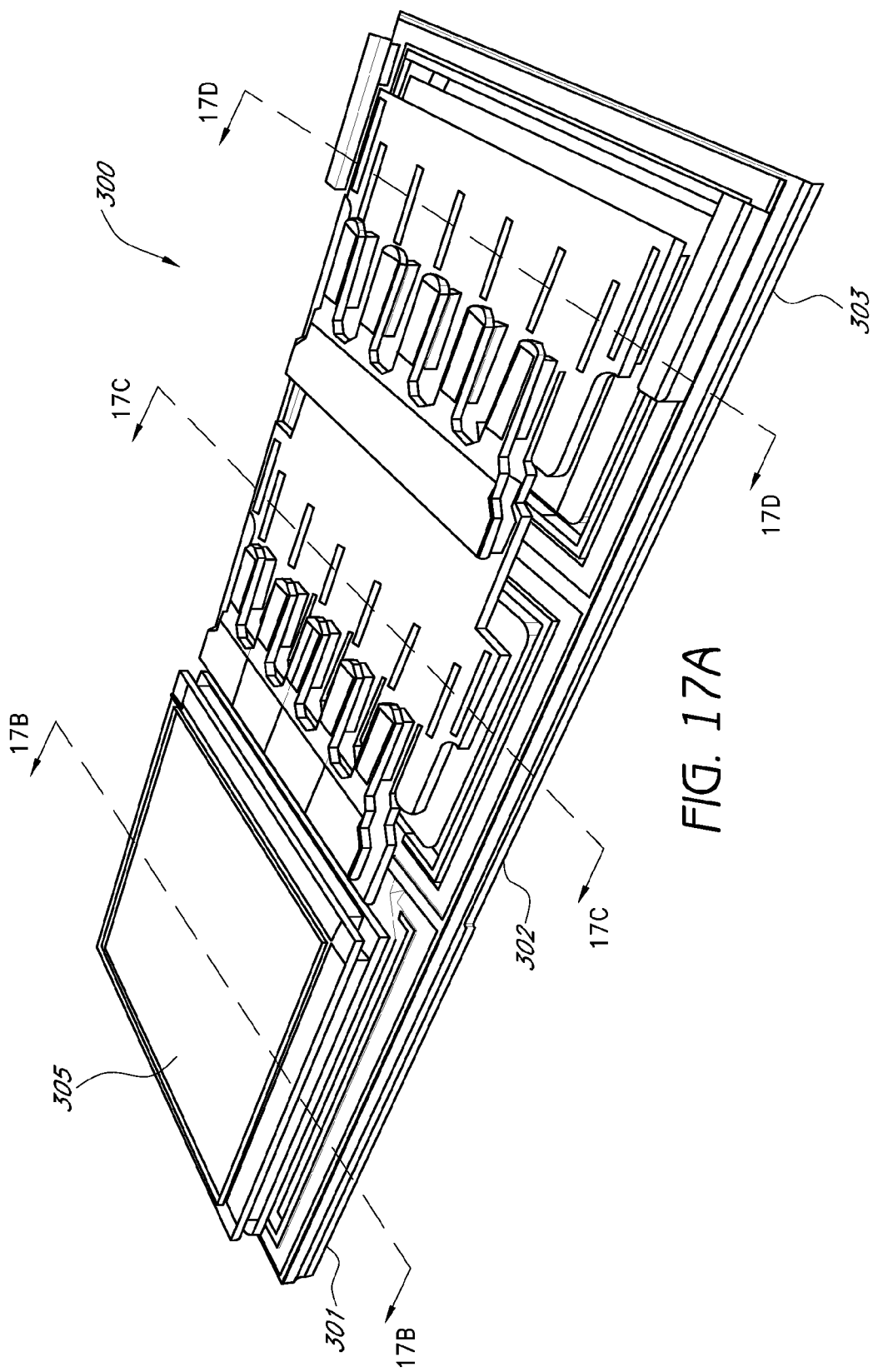
FIG. 17A is a perspective view of one implementation of the pad circuit of FIG. 12B.

FIG. 17A is a perspective view of one implementation of the pad circuit of FIG. 12B. The illustrated pad circuit 300 includes a bonding pad 305, a first Type A' building block 301, a second Type A' building block 302, and a third Type A' building block 303 connected in a cascade. The layout of the first Type A' building block 301 is configured such that the first Type A' building block 301 can fit below the bonding pad 305. The second and Type A' building blocks 302, 303 have layouts extending outside the bonding pad area.

During back-end fabrication (for example, fabrication of metal layers), building blocks can be included in a cascade configuration with the first Type A' building block. Thus, for example, the pad circuit 300 can be configured to have the configuration shown in FIG. 9B by changing the metal layers. Furthermore, additional building blocks, such as a Type B' building block can be placed adjacent to the pad 305, and can be included in the cascade by changing metal layers. Thus, an IC using the pad circuit 300, such as the power management IC 20, can be configured for a particular electronic system or application.

As will be described in further detail below with reference to FIGS. 17B-17I, the pad circuit 300 can advantageously be constructed with three metal layers, thereby permitting fabrication in processes with limited numbers of metal layers. Moreover, the pad circuit 300 can be implemented in a small circuit area, and a large portion of the pad circuit 300 can be positioned directly under the bonding pad 305.

Figure 17B:
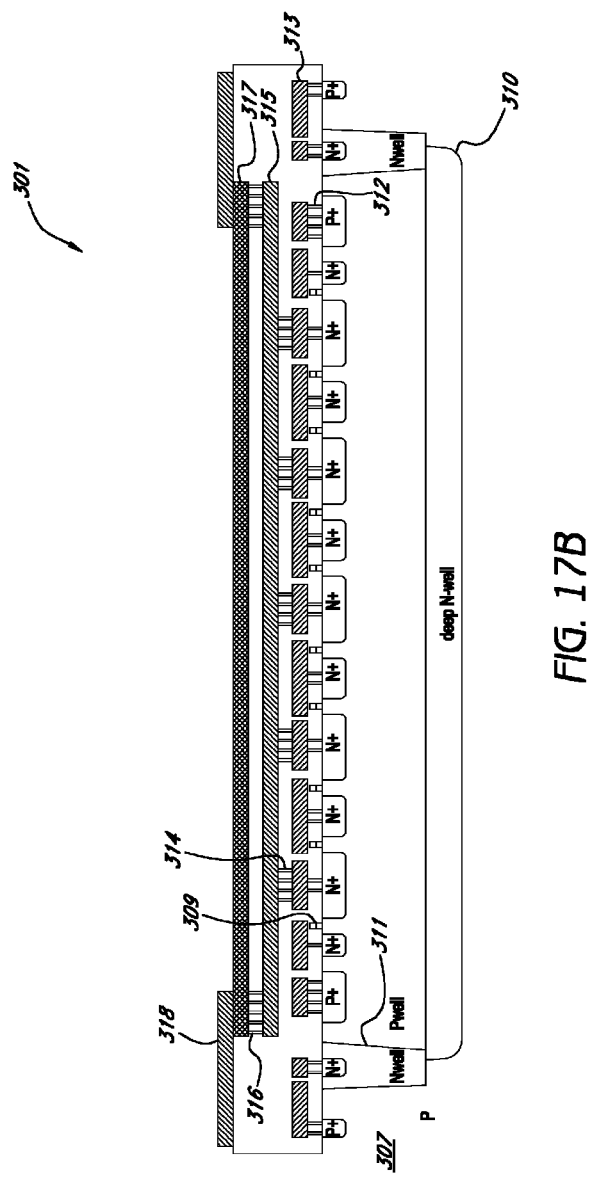
FIG. 17B is a cross section of the pad circuit of FIG. 17A taken along the line 17B-17B.

FIG. 17B is a cross section of the pad circuit 300 of FIG. 17A taken along the line 17B-17B. The first Type A' building block 301 includes a substrate 307, plates 309, a deep n-well 310, n-wells 311, contacts 312, a first metal layer 313, first vias 314, a second metal layer 315, second vias 316, a third metal layer 317, and passivation layer 318. In contrast to the Type A' building block 201 shown in FIG. 7B, the first Type A' building block 301 is illustrated with back end processing. The deep n-well 310 and n-wells 311 can electrically isolate the first Type A' building block 301 from other building blocks, such as the second and third Type A' building blocks 302, 303. Additional details of the base layers of the first Type A' building block can be similar to those described earlier with reference to FIG. 7B.

Figure 17C:
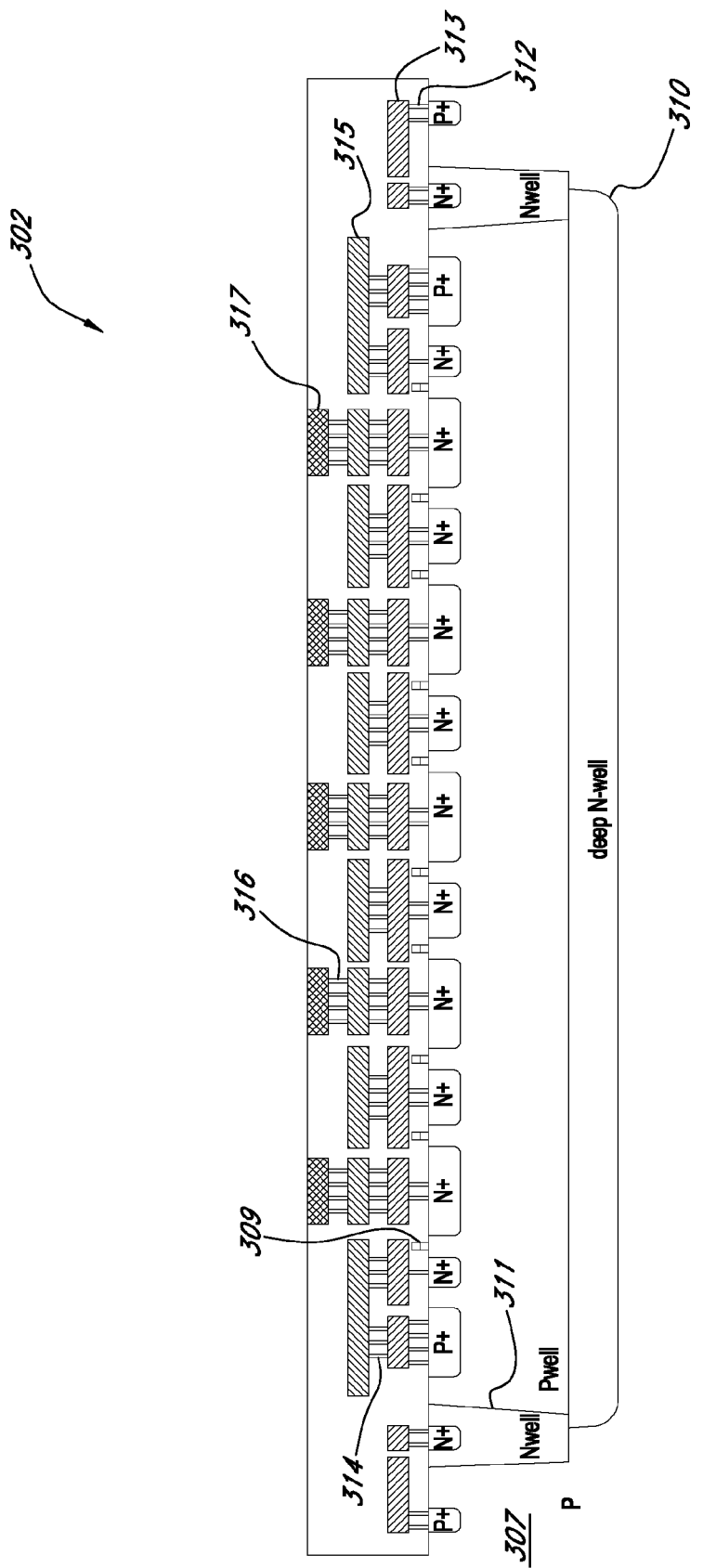
FIG. 17C is a cross section of the pad circuit of FIG. 17A taken along the line 17C-17C.

FIG. 17C is a cross section of the pad circuit of FIG. 17A taken along the line 17C-17C. The second Type A' building block 302 can be formed in the same substrate 307 as the first Type A' building block 301. The second Type A' building block 302 can include plates 309, a deep n-well 310, n-webs 311, contacts 312, a first metal layer 313, first vias 314, a second metal layer 315, second vias 316, and a third metal layer 317. Additional details of the base layers of the second Type A' building block 302 can be similar to those described earlier with reference to FIG. 7B. Skilled artisans will appreciate that the geometries of first Type A' building block 301 and the second Type B' building block 302 can be different. For example, the plates 309 of the first Type A' building block 301 can have different plate widths than the plates 309 of the second Type A' 302, as can been seen in FIG. 17E.

Figure 17D:
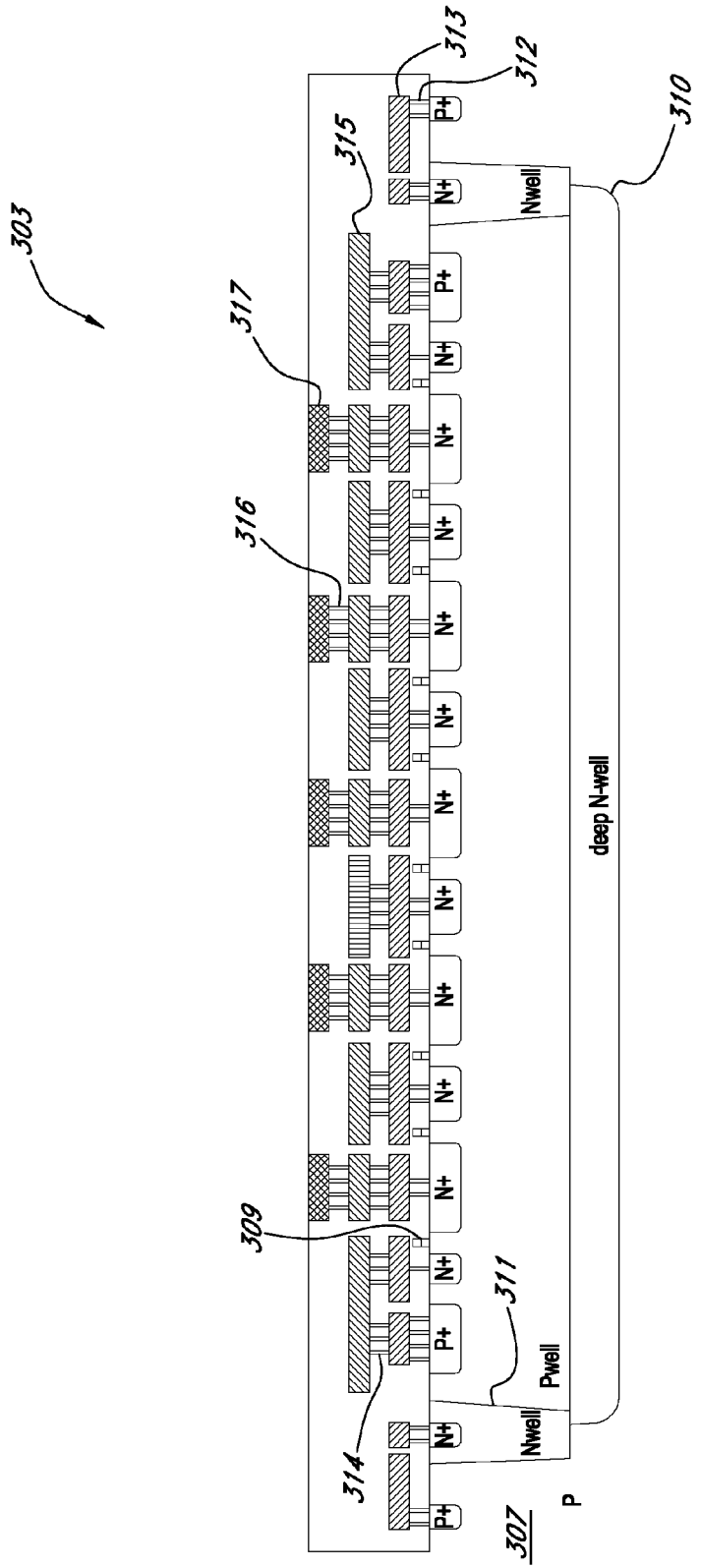
FIG. 17D is a cross section of the pad circuit of FIG. 17A taken along the line 17D-17D.

FIG. 17D is a cross section of the pad circuit of FIG. 17A taken along the line 17D-17D. The third Type A' building block 303 can be formed in the same substrate 307 as the first and second Type A' building blocks 301, 302. The third Type A' building block 303 can include plates 309, a deep n-well 310, n-wells 311, contacts 312, a first metal layer 313, first vias 314, a second metal layer 315, second vias 316, and a third metal layer 317. Additional details of the third Type A' building block 303 can be as described earlier in connection with FIG. 7B.

Figure 17E:
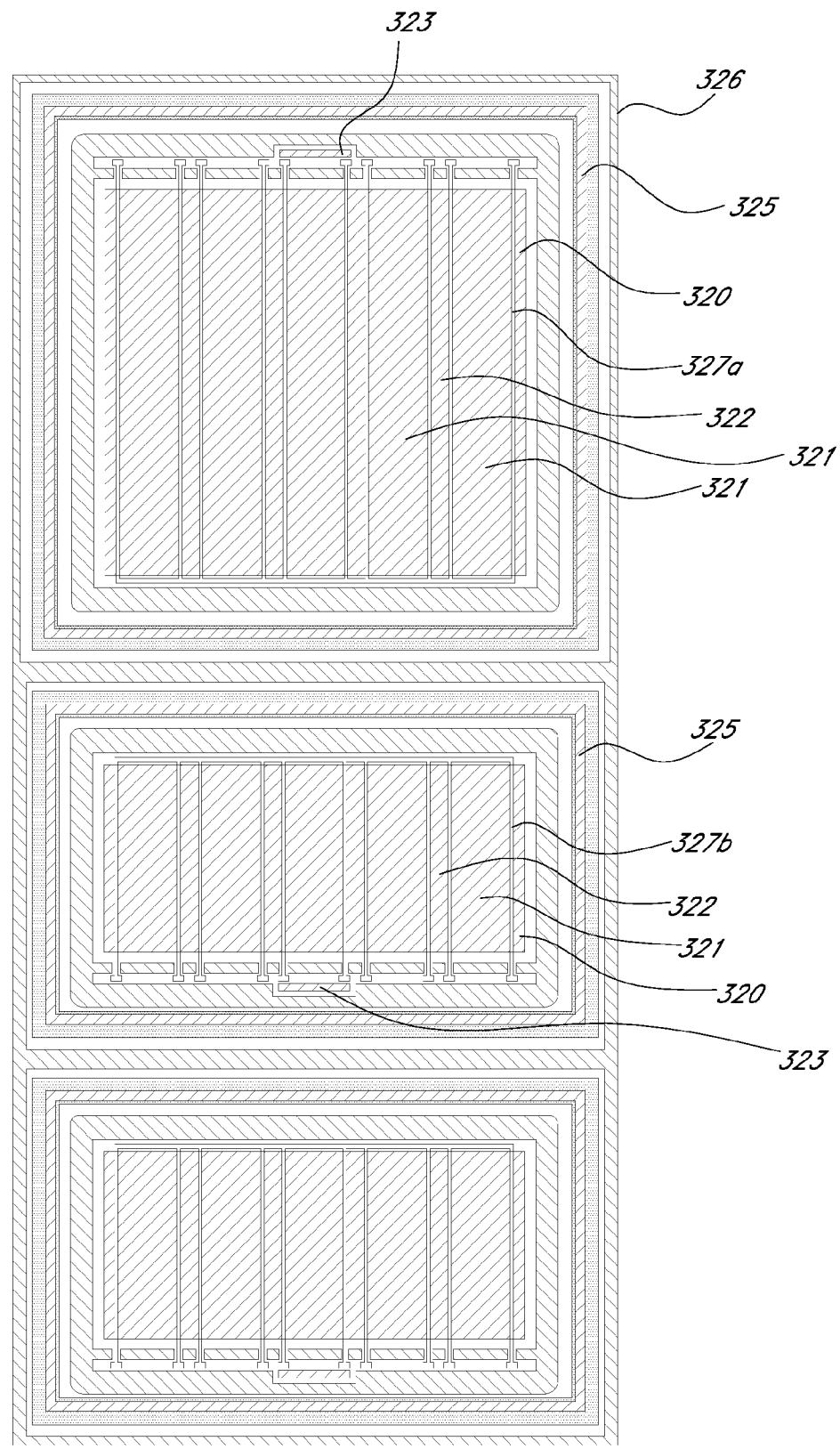
FIG. 17E is a top plan view of the active and polysilicon layers of the pad circuit of FIG. 17A.
Figure 17F:
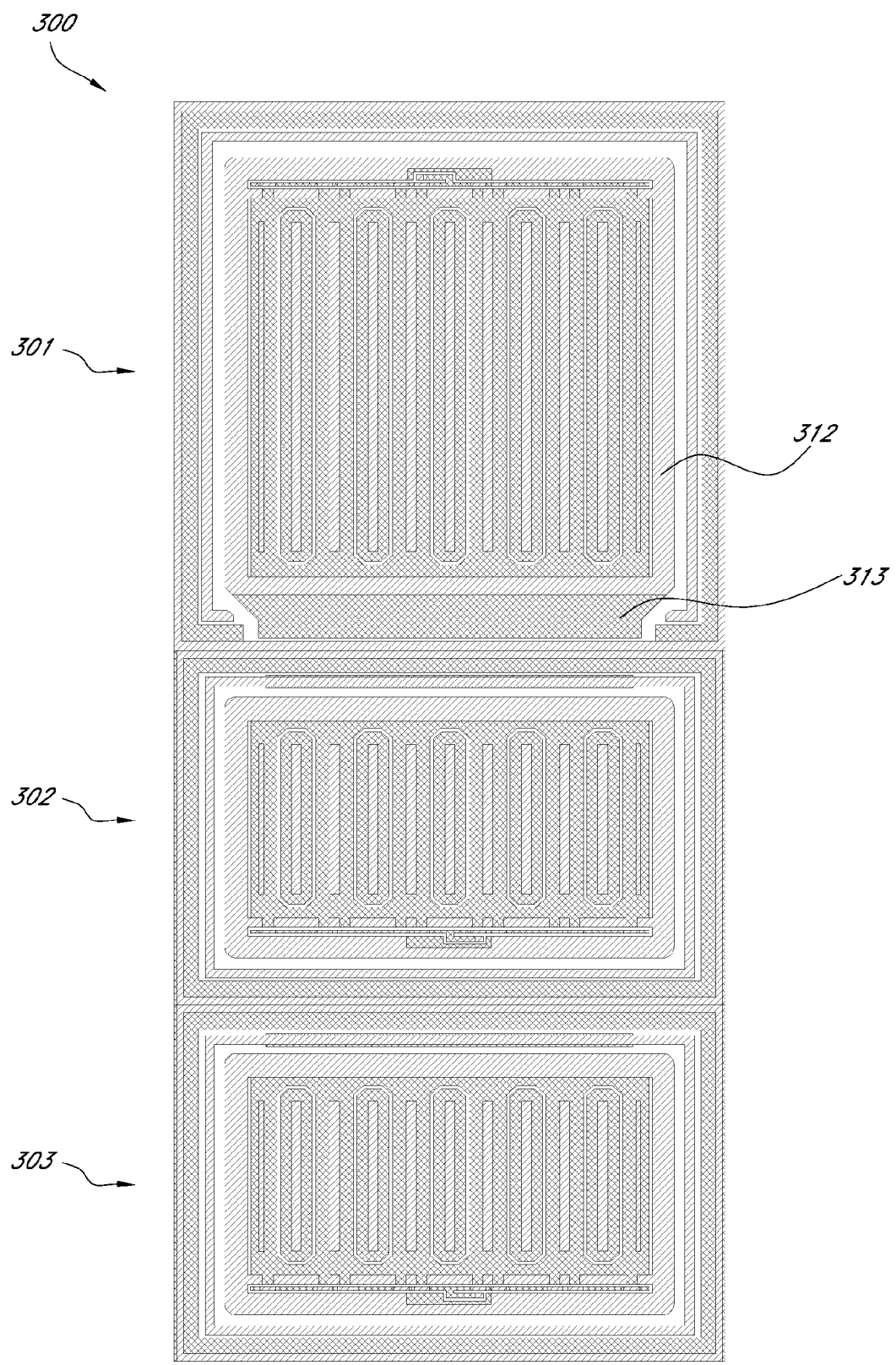
FIG. 17F is a top plan view of the contact and first metal layers of the pad circuit of FIG. 17A.

FIG. 17E is a top plan view of the active and polysilicon layers of the pad circuit of FIG. 17A. FIG. 17F is a top plan view of the contact and first metal layers of the pad circuit of FIG. 17A. As shown in FIG. 17E, each of the building blocks 301-303 includes a plurality of rows of emitters 320, 322 and a plurality of rows of collectors 321, when viewed from above. The rows of emitters 320, 322 and collectors 321 extend substantially parallel to one another. As shown in FIG. 17F, the emitters 320 on both of the peripheries of the pad circuit 300 can have a single row of contacts, while emitters 322 not on the peripheries of the pad circuit 300 and collectors 321 can have a double row of contacts.

Figure 17G:
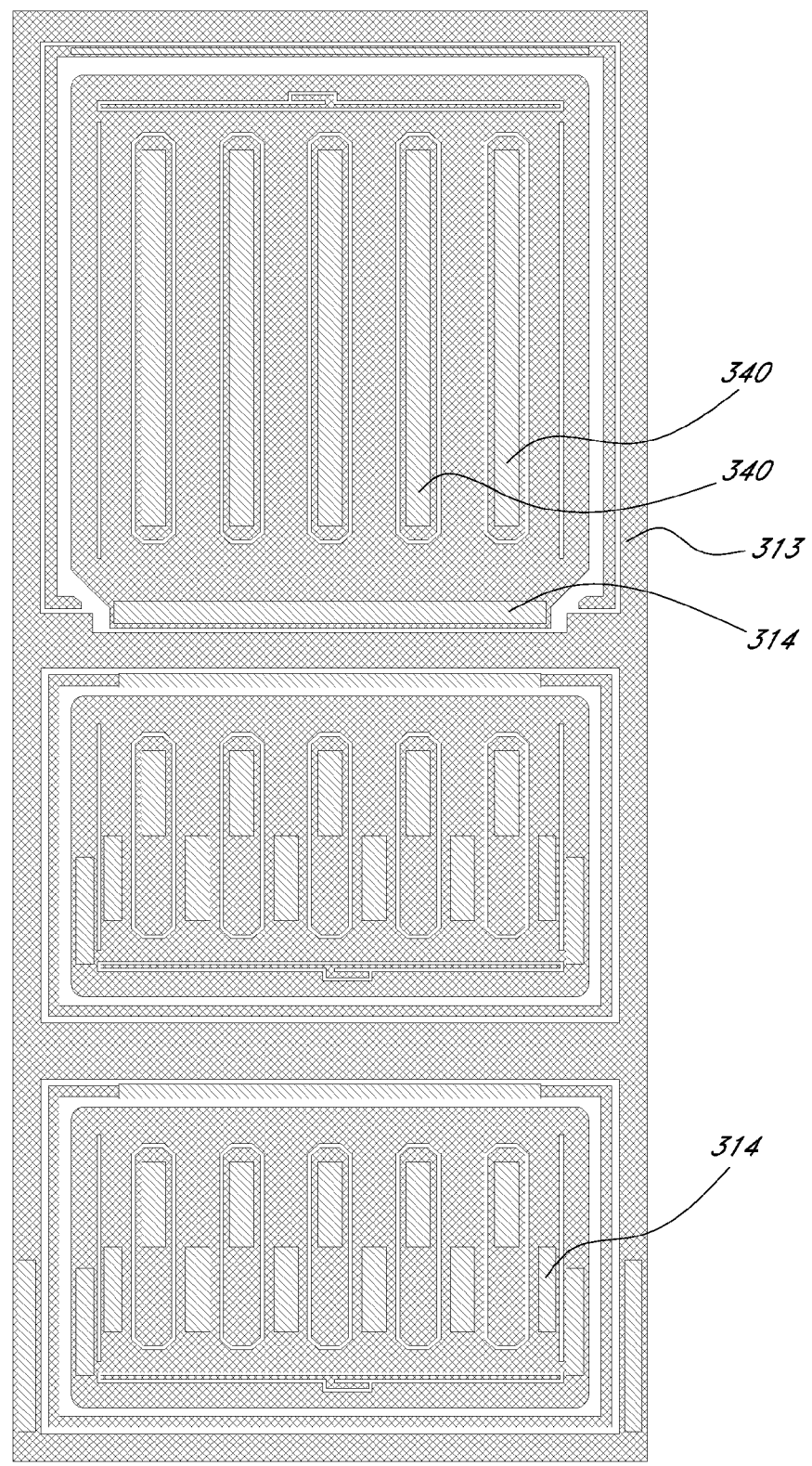
FIG. 17G is a top plan view of the first metal layer and first via layer of the pad circuit of FIG. 17A.
Figure 17H:
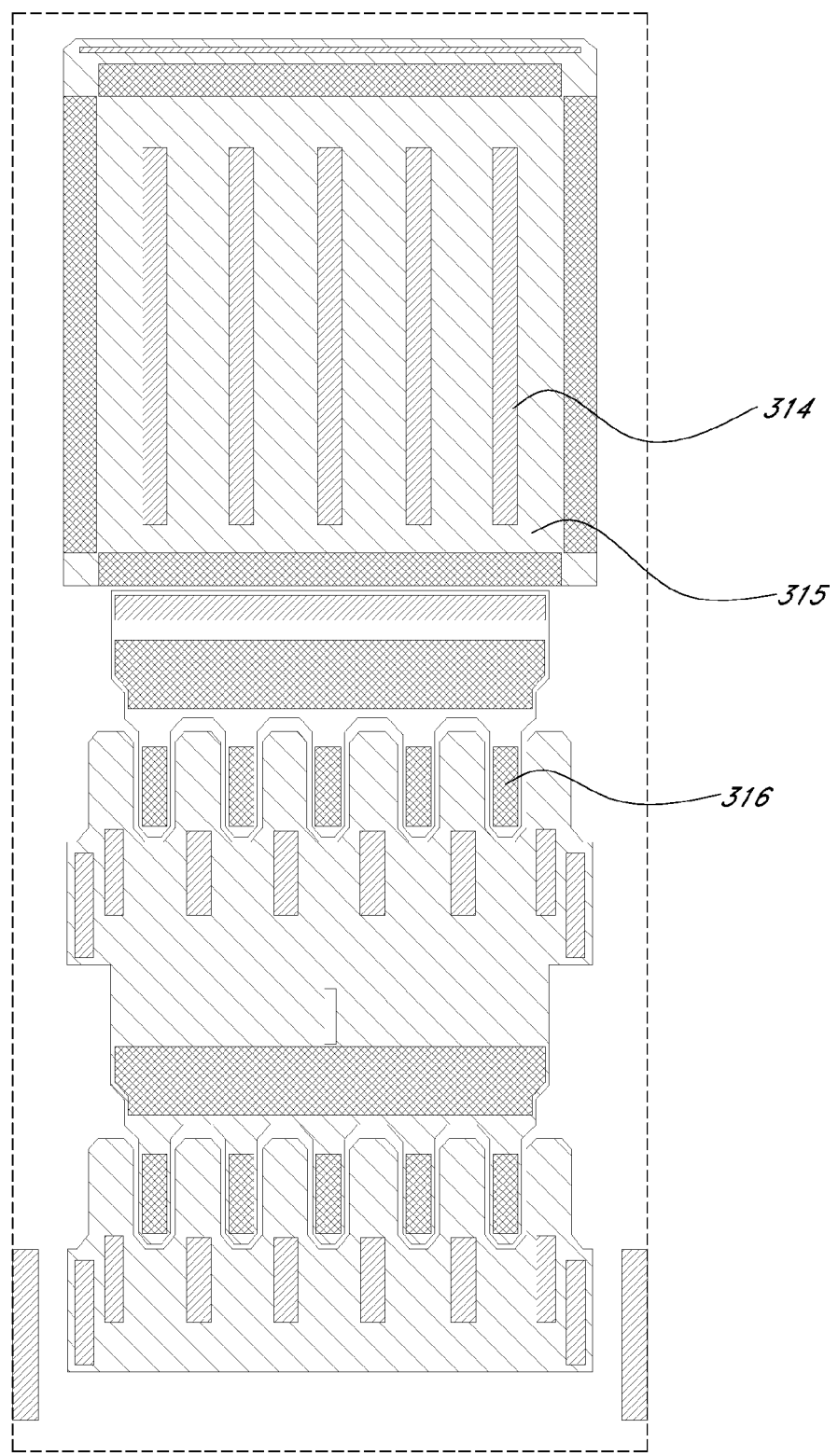
FIG. 17H is a top plan view of the second metal layer and second via layer of the pad circuit of FIG. 17A.

The contacts of the emitters 320, collectors 321 and emitters 322 can be spaced so as to permit first, and second vias to be stacked, as shown in FIGS. 17F-17H. The n-diffusion resistors 323 can have a resistance similar to that described above with reference to FIG. 7A. Each n-diffusion resistor 323 can have, for example, a width $W_R$ of 0.7 µm and a length $L_R$ of 9 µm.

As shown in FIGS. 17E-17F, a guard ring 325 can be connected through two rows of contacts. Additionally, a substrate guard ring 326 can be contacted with a double row of contacts. The plates 327a and plates 327b can each have ten fingers, and each plate can have a plate length of, for example, about 0.5 µm. The plates 327a can have a width of, for example, about 615 µm, and the plates 327b can have a width of, for example, about 300 µm. The contact to diffusion overlap can be, for example, about 2 µm.

Figure 17I:
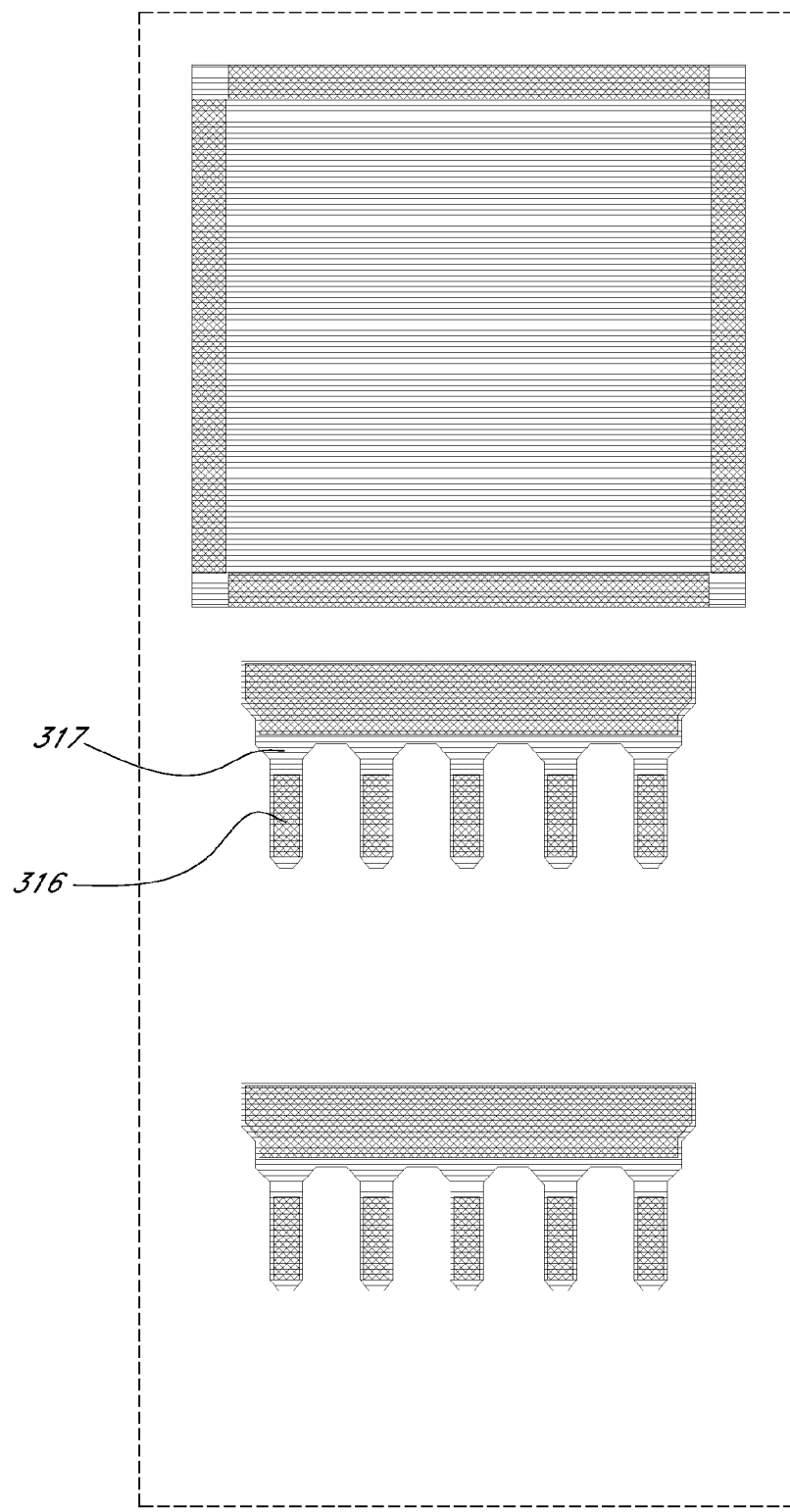
FIG. 17I is a top plan view of the third metal layer of the pad circuit of FIG. 17A.

FIG. 17G is a top plan view of the first metal layer 313 and first via layer 314 of the pad circuit of FIG. 17A. Four rows of vias 340 can be provided to contact the drains of NPN bipolar transistors. FIG. 17H is a top plan view of the first via layer 314, the second metal layer 315 and the second via layer 316 of the pad circuit of FIG. 17A. FIG. 17I is a top plan view of the third metal layer 317 and the second via layer 316 of the pad circuit of FIG. 17A.

Although FIGS. 17A-17I describe the construction and dimensions of one particular layout for a cascaded pad circuit, skilled artisans will appreciate that this example was for purposes of illustration. Pad circuit building blocks can be formed in a variety of ways, and can have different circuit layouts depending on a variety of factors, including, for example, fabrication process and application of the pad circuit.

Figure 18A:
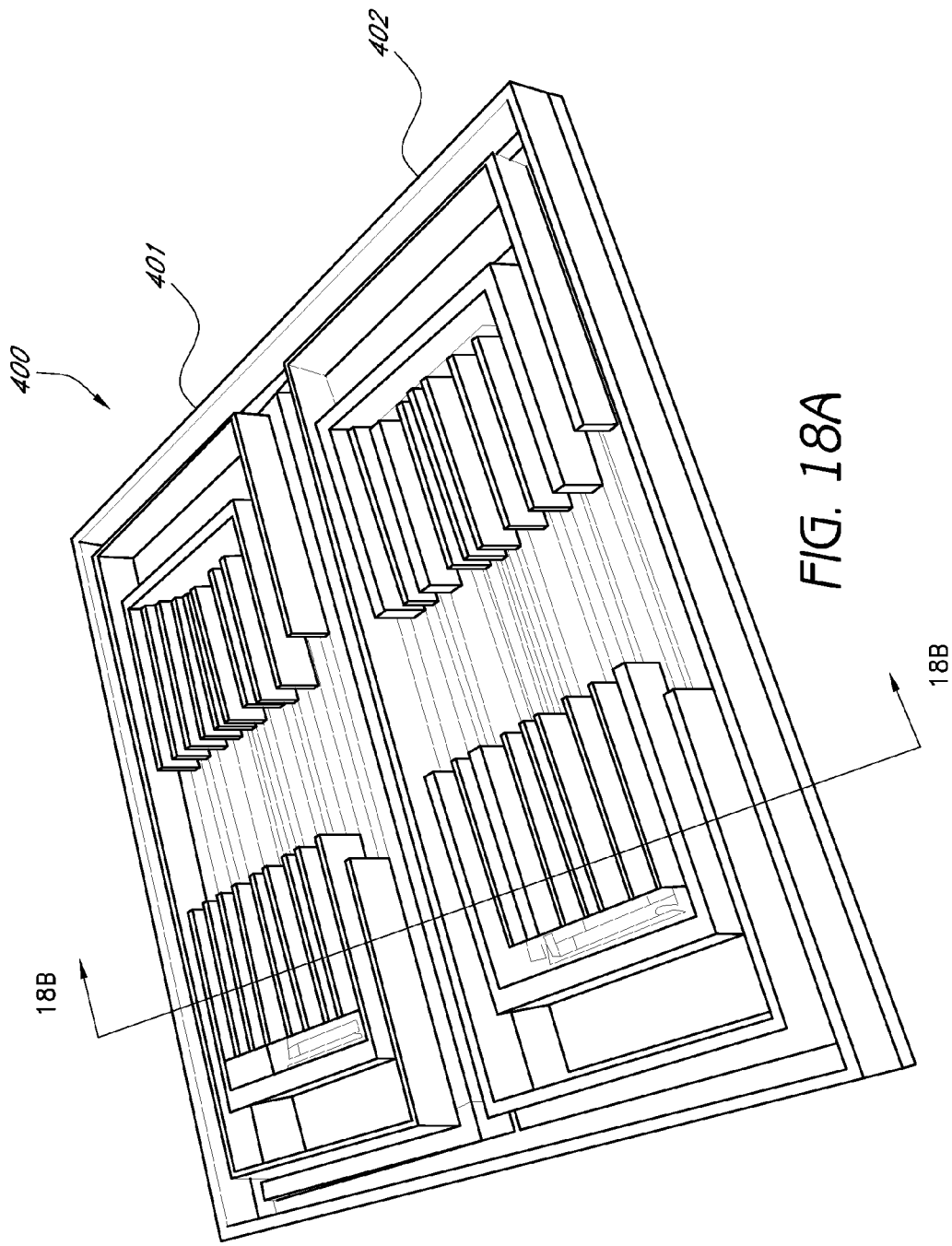
FIG. 18A is a perspective view of one implementation of the pad circuit of FIG. 11B.

FIG. 18A is a perspective view of one implementation of the pad circuit of FIG. 11B. The illustrated pad circuit 400 includes a first Type B' building block 401 and a second Type B' building block 402. The layout of the first and second Type B' building blocks 401, 402 is configured such that the both Type B' building blocks 401, 402 can fit below a bonding pad, which has been omitted from FIG. 18A for clarity. Additional building blocks, such as a Type A' building block, can be placed adjacent to the bonding pad, and can be included in the cascade, for example, by a change metal layers. Thus, an IC using the pad circuit 400, such as the power management IC 20, can be configured for a particular electronic system or application.

Figure 18B:
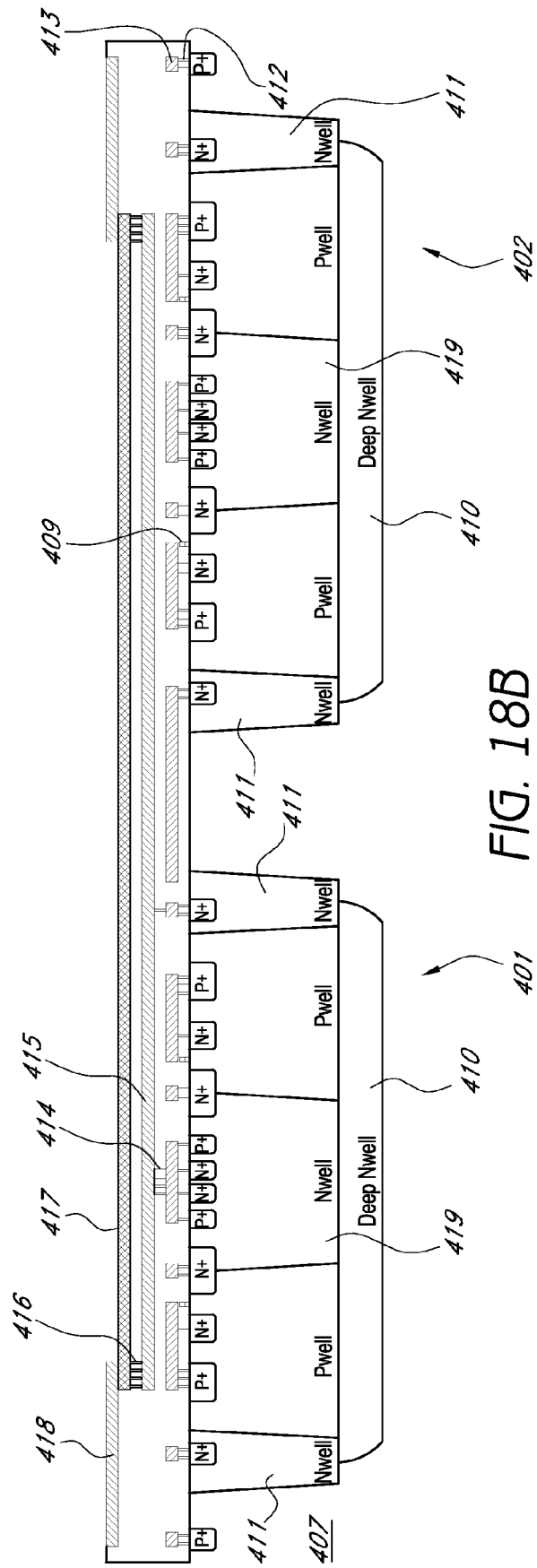
FIG. 18B is a cross section of the pad circuit of FIG. 18A taken along the line 18B-18B.

FIG. 18B is a cross section of the pad circuit of FIG. 18A taken along the line 18B-18B. The first Type B' building block 401 includes a substrate 407, plates 409, a deep n-wells 410, n-wells 411, contacts 412, a first metal layer 413, first vias 414, a second metal layer 415, second vias 416, a third metal layer 417, and passivation layer 418. In contrast to the Type B' building block 231 shown in FIG. 8B, the Type B' building blocks 401, 402 of FIG. 18B are illustrated with back end processing. The deep n-wells 410 and n-wells 411 can provide electrically isolation of building blocks, such as between first and second Type B' building blocks 401, 402, as well as electrical isolation of each building block from the substrate 407. Additional details of the base layers of the first Type B' building block can be similar to those described earlier in connection with FIG. 8B.

Overview of an Example of an Electronic System Including a Sensor Interface

In certain implementations, a pad protection circuit can be configured to provide protection to a plurality of pads that are electrically connected to an interface. The pad circuit can be configured to divert a current associated with a transient signal event received on a pad connected to the interface to other nodes or pads of the IC, thereby providing transient signal protection. When no transient signal event is present, the pad protection circuit can remain in a high-impedance/low-leakage state, thereby reducing or minimizing static power dissipation resulting from leakage current and improving the operation of leakage sensitive circuitry. The pad protection circuit can have a plurality of building blocks selected to achieve a desired protection performance. By using a pad protection circuit to provide protection to a multitude of pads, the pad protection circuit can provide relatively robust protection while using a relatively small amount of IC area. For example, a portion of the building blocks used to provide transient signal protection can be shared between pads, thereby reducing the area of the pad protection circuit relative to a scheme using a separate stack of building blocks for each pad. The pad protection circuit can be configured to maintain the voltage of each of the pads within a predefined safe range, as well as to maintain the voltage between each of the pads within acceptable limits.

Figure 19:
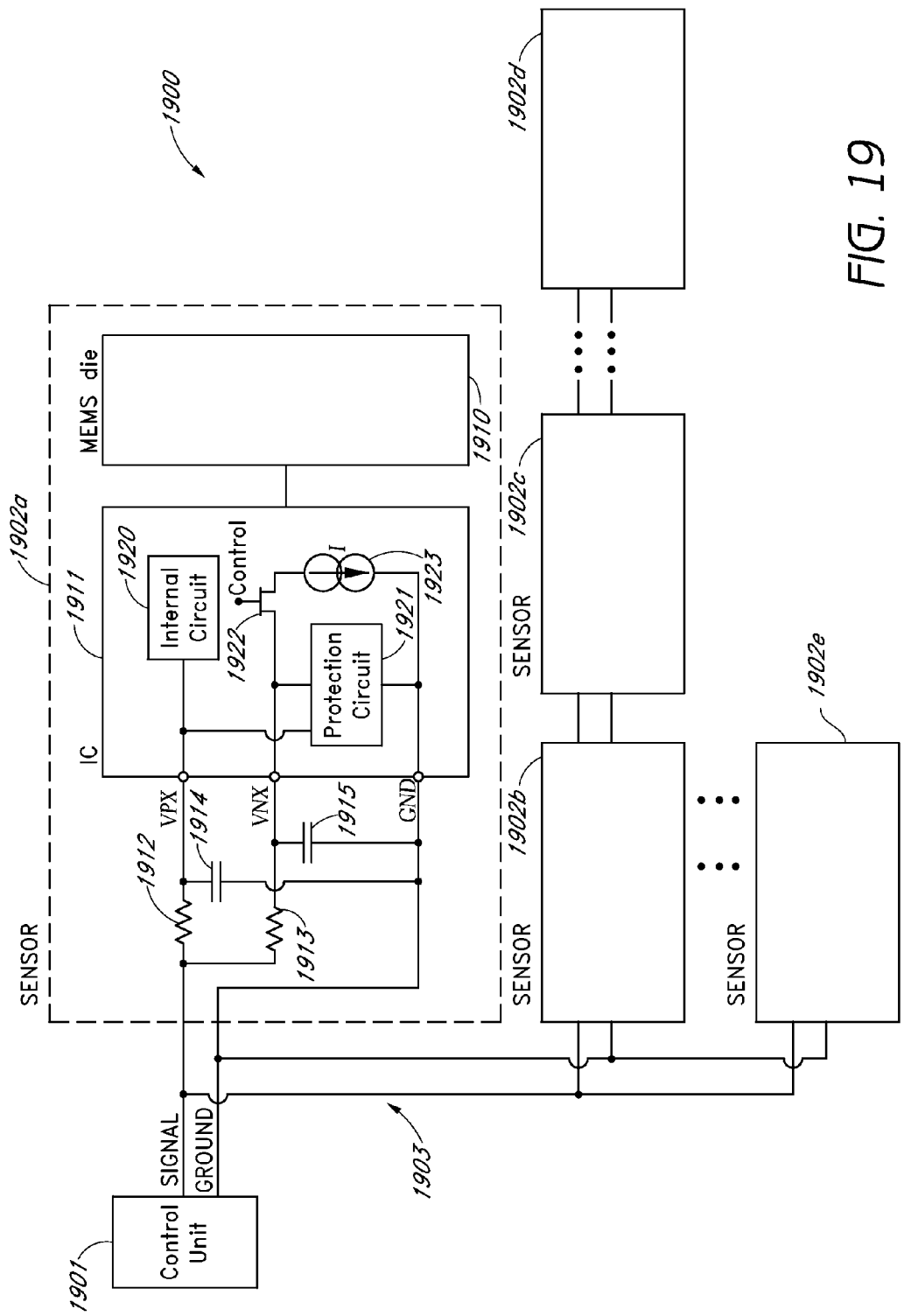
FIG. 19 is a schematic block diagram of another example of an electronic system.

FIG. 19 is a schematic block diagram of another example of an electronic system 1900, which can include one or more pad protection circuits according to various embodiments. The electronic system 1900 includes a control unit 1901, a plurality of sensors 1902a-1902e, and an interface 1903 electrically connecting the control unit 1901 to the plurality of sensors 1902a-1902e.

The illustrated electronic system 1900 can be, for example, a sensor interface system for automotive sensor applications. For instance, the electronic system 1900 can be a Peripheral Sensor Interface 5 (PSI5) system for providing high speed bidirectional data transfer for multi-sensor applications.

The interface 1903 can include a plurality of lines used for communicating data between the control unit 1901 and the plurality of sensors 1902a-1902e. For example, as illustrated in FIG. 19, the interface 1903 can include a signal line SIGNAL and a ground line GROUND. In certain implementations, the interface 1903 can be a two-wire current interface, and the devices connected to the interface can communicate over the interface by sending a current through an electrical loop that includes the SIGNAL and GROUND lines. For example, a current can be generated on the SIGNAL line by the control unit 1901 or any of the sensors 1902a-1902e, and can return to the communicating device on the ground line GROUND. A portion of the current can pass through a resistor to generate a voltage that can be sensed by the device. Although the interface can be a two-wire current interface, the interface 1903 can be any suitable sensor interface, including, for example, a differential voltage interface.

The control unit 1901 can communicate with the plurality of sensors 1902a-1902e using synchronous and/or asynchronous timing. However, in certain implementations, the control unit 1901 need not send data to the sensors 1902a-1902e. For example, the sensors 1902a-1902e can be configured to periodically send data unidirectionally to the control unit 1901.

In certain implementations, the control unit 1901 is electrically connected in parallel to the plurality of sensors over a bus, and each of the sensors on the bus can be assigned an address. In a bus configuration, the SIGNAL and GROUND lines can be electrically connected in parallel to the sensors in a manner similar to that shown for the sensors 1902a, 1902e. Although the sensors can be electrically connected to the control unit 1901 using a bus configuration, other implementations are possible. For example, in certain implementations, dedicated point-to-point interfaces are provided between the control unit 1901 and one or more of the sensors. Additionally, in some implementations, the control unit 1901 can be electrically connected to all or a portion of the sensors using a daisy chain configuration, in which a plurality of sensors are connected in a serial chain. For example, the sensors 1902b-1902d are disposed in a daisy chain. During initialization of the daisy chain, the first sensor in the chain can be assigned an address based on its position in the chain and thereafter the first sensor can provide the supply voltage to the second sensor in the chain. This process can be repeated until each sensor in the daisy chain is initialized. Although only one daisy chain has been illustrated in FIG. 19, the control unit 1901 can be electrically connected to a plurality of daisy chains in parallel. For example, one or more additional sensors can be connected in a daisy chain after the sensor 1902a and/or the sensor 1902e. Each daisy chain can have any suitable length, such as a chain including 2 or more sensors, for example, between about 2 and about 4 sensors.

The sensors 1902a-1902e can include a plurality of dies and/or other components. For example, the illustrated sensor 1902a includes a microelectromechanical systems (MEMS) die 1910, an integrated circuit (IC) 1911, a first resistor 1912, a second resistor 1913, a first capacitor 1914, and a second capacitor 1915. The MEMS die 1910 can include one or more mechanical sensors, such as accelerometers and/or gyros, that can be used to generate electrical signals corresponding to the sensor data obtained by the sensor. The MEMS die 1910 can be electrically coupled to the IC 1911, which can be, for example, an application specific integrated circuit (ASIC) used to process the signals received from the MEMS die 1910. Although one particular sensor configuration is illustrated in FIG. 19, other implementations are possible. Additionally, each of the sensors 1902a-1902e need not have the same implementation.

The illustrated IC 1911 includes a first pad VPX, a second pad VNX, a third pad GND, an internal circuit 1920, a protection circuit 1921, a switch 1922, and a current source 1923. The first resistor 1912 includes a first end electrically connected to the SIGNAL line of the interface 1903 and to a first end of the second resistor 1913, and a second end electrically connected to a first end of the first capacitor 1914 and to the first pad VPX of the IC 1911. The second resistor 1913 further includes a second end electrically connected to a first end of the second capacitor 1915 and to the second pad VNX of the IC 1911. The first capacitor 1914 further includes a second end electrically connected to a second end of the second capacitor 1915, to the GROUND line of the interface 1903, and to the third pad GND of the IC 1911. Electrically connecting the SIGNAL line to both the first and second pads VPX, VNX as shown in FIG. 19 can aid in improving damping performance of the interface 1903 relative to a scheme in which the SIGNAL line is electrically connected to a single pad of the IC 1911.

The switch 1922 and the current source 1923 are electrically connected in series between the second pad VNX and the third pad GND. The internal circuit 1920 is electrically connected to the first pad VPX, and can be used to sense the signal level on the second pad VPX. The internal circuit 1920 can use the measured signal level to, for example, control the amplitude of the current source 1923 and/or to control the state of the switch 1922.

To aid in providing protection to the sensor 1902a, the protection circuit 1921 can be electrically connected to the first and second pads VPX, VNX and to the third pad GND. As will be described in detail below, the protection circuit 1921 can be used to control the potential between multiple pads. For example, the protection circuit 1921 can control the potential between the first pad VPX and the second pad VNX, between the first pad VPX and the third pad GND, and between the second pad VNX and the third pad GND. By providing protection in this manner, the protection circuit 1921 can be used to provide differential protection between the first and second pads VPX, VNX as well as common-mode protection between the first and second pads VPX, VNX and a reference third pad GND. The protection circuit 1921 can include a plurality of building blocks selected to achieve a desired protection characteristic of the first and second pads VPX, VNX. Additionally, a portion of the building blocks used in the breakdown path between the first pad VPX and the third pad GND can be shared with those used in the breakdown path between the second pad VNX and the third pad GND, and thus the pad protection circuit 1921 can have an area that is smaller relative a design employing independent stacks of building blocks for each of the first and second pads VPX, VNX.

Although the pad protection circuit 1921 has been illustrated in the context of a sensor interface, the pad protection circuit 1921 can be employed in a wide range of ICs and other electronics. For example, the pad protection circuit 1921 can be employed in any other suitable electronic system, including, for example, a power management IC such as the power management IC 20 of FIG. 2.

Figure 20A:
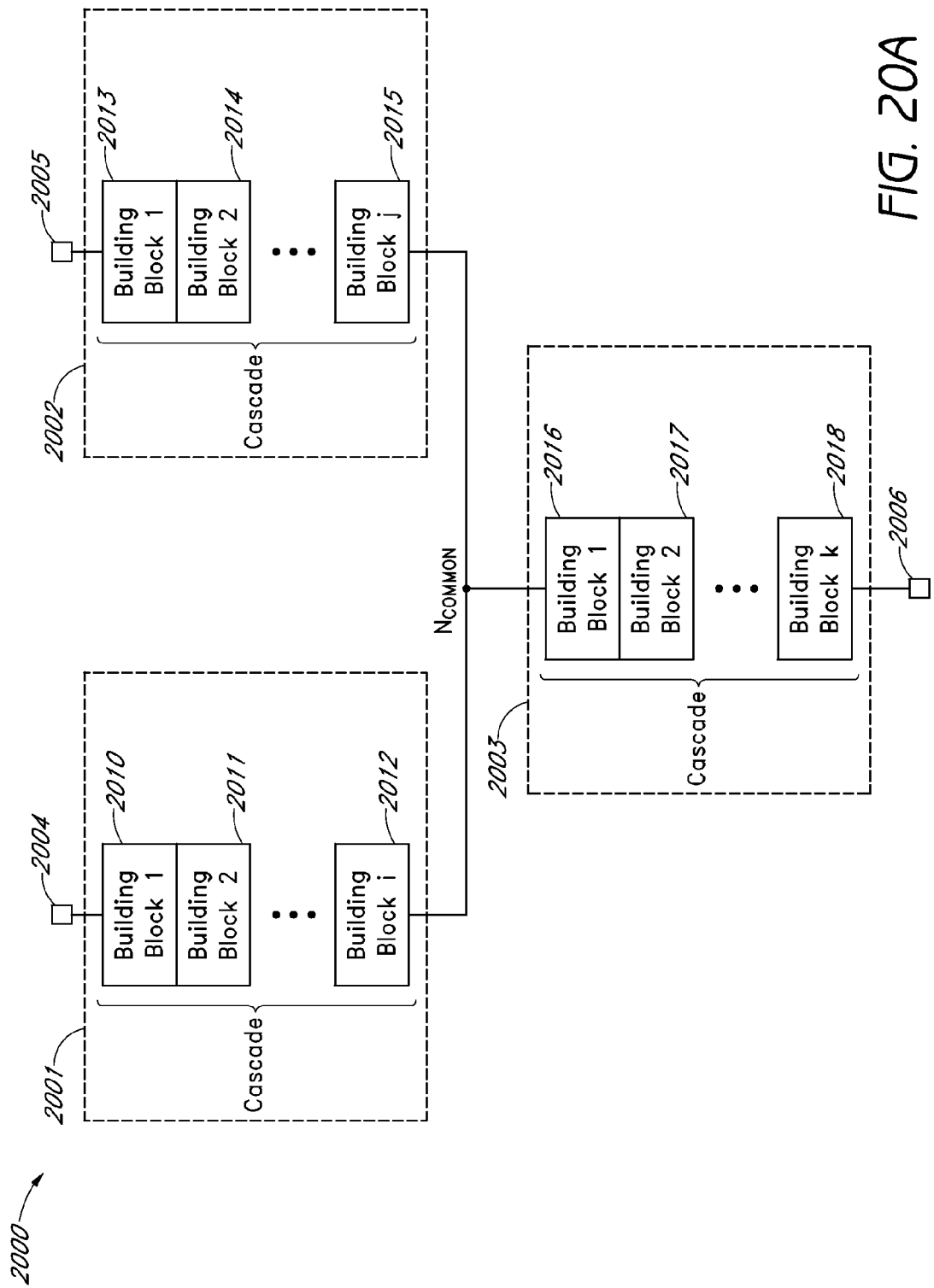
FIG. 20A is a schematic block diagram of a pad protection circuit according to one embodiment.

FIG. 20A is a schematic block diagram of a pad protection circuit 2000 according to one embodiment. The illustrated pad protection circuit 2000 includes a first protection subcircuit 2001, a second protection subcircuit 2002, and a third protection subcircuit 2003. The pad protection circuit 2000 is electrically connected to a first pad 2004, to a second pad 2005 and to a third pad 2006. In one embodiment, the pad protection circuit 2000 is embodied in a monolithic integrated circuit.

The first protection subcircuit 2001 includes a first end electrically connected to the first pad 2004 and a second end electrically connected to a node $N_{COMMON}$. The second protection subcircuit 2002 includes a first end electrically connected to the second pad 2005 and a second end electrically connected to the node $N_{COMMON}$. The third protection subcircuit 2003 includes a first end electrically connected to the node $N_{COMMON}$ and a second end electrically connected to the third pad 2006.

The first, second, and third protection subcircuits 2001-2003 can each include one or more building blocks electrically connected in a cascade to achieve the desired reliability and/or performance parameters of the pad protection circuit. The first protection subcircuit 2001 includes a first building block 2010, a second building block 2011 and a third building block 2012 disposed in a cascade between the first pad 2004 and the node $N_{COMMON}$. The second protection subcircuit 2002 includes a first building block 2013, a second building block 2014, and a third building block 2015 disposed in a cascade between the second pad 2005 and the node $N_{COMMON}$. The third protection subcircuit 2003 includes a first building block 2016, a second building block 2017, and a third building block 2018 disposed in a cascade between the node $N_{COMMON}$ and the third pad 2006. The pad protection circuit 2000 can be, for example, the pad protection circuit 1921 of FIG. 19.

The first and second pads 2004, 2005 can be, for example, pads connected to an interface, such as the first and second pads VPX, VNX of FIG. 19. The third pad 2006 can be, for example, a low impedance pad of the electronic system configured to handle a relatively large shunted current, such as a ground or supply pad. Although FIG. 20A illustrates a configuration in which the second end of the third subcircuit 2003 is electrically connected to the third pad 2006, in certain implementations, the second end of the third subcircuit 2003 can be electrically connected to any suitable low impedance node of an IC.

The first, second, and third protection subcircuits 2001-2003 can include building blocks selected to achieve the desired pad protection characteristic. For instance, the building blocks 2010-2012 of the first protection subcircuit 2001 and the building blocks 2016-2018 of the third protection subcircuit 2003 can define the protection characteristic between the first pad 2004 and the third pad 2006. Additionally, the building blocks 2013-2015 of the second protection subcircuit 2002 and the building blocks 2016-2018 of the third protection subcircuit 2003 can determine the protection characteristic between the second pad 2005 and the third pad 2006. Furthermore, the building blocks 2010-2012 of the first protection subcircuit 2001 and the building blocks 2013-2015 of the second protection subcircuit 2002 can define the protection characteristic between the first and second pads 2004, 2005. By selecting the type and number of building blocks for each protection subcircuit, the protection characteristic of the electronic system can be determined.

Although the first, second, and third protection subcircuits 2001-2003 are illustrated as each including a cascade of three building blocks, each of the first, second, and third subcircuits 2001-2003 can include more or fewer building blocks of the same or of different types. In certain implementations, the first, second and/or third protection subcircuits 2001-2003 can include a single building block.

The illustrated node $N_{COMMON}$ is not directly associated with the first pad 2004, the second pad 2005, or the third pad 2006. For example, the first, second and third protection subcircuit 2001-2003 are electrically coupled between the node $N_{COMMON}$ and the first, second and third pads 2004-2006, respectively, and the protection circuits 2001-2003 have a relatively high impedance when a transient electrical event is not present. In certain implementations, the node $N_{COMMON}$ is an internal node of an integrated circuit, and is not externally accessible. For example, the node $N_{COMMON}$ need not be directly connected to a pad of an IC.

In one embodiment, the first pad 2004 is a first signal pad, the second pad 2005 is a second signal pad, and the third pad 2006 is a ground pad, and the pad protection circuit 2000 is used to provide transient electrical event protection to the first and second signal pads. When a transient electrical event is received on the first signal pad, the building blocks of the first and third protection subcircuits 2001, 2003 can reach a breakdown condition in which a low impedance path is provided to the ground pad through the first and third protection subcircuits 2001, 2003. Likewise, when a transient electrical event is received on the second signal pad, the building blocks of the second and third protection subcircuits 2002, 2003 can reach a breakdown condition and a low impedance path can be provided to the ground pad through the second and third protection subcircuits 2002, 2003. The protection circuit 2000 can also provide protection against a differential transient electrical event that develops a voltage difference between the first and second signal pads, thereby maintaining the voltage between the signal pads within a predefined safe range and protecting circuitry that is sensitive to a voltage difference between the signal pads. For example, when a transient electrical event causes a voltage difference to develop between the first and second signal pads, the building blocks in the first and second protection subcircuits 2001, 2002 can reach a breakdown condition in which a low impedance path is provided between the first and second signal pads.

Figure 20B:
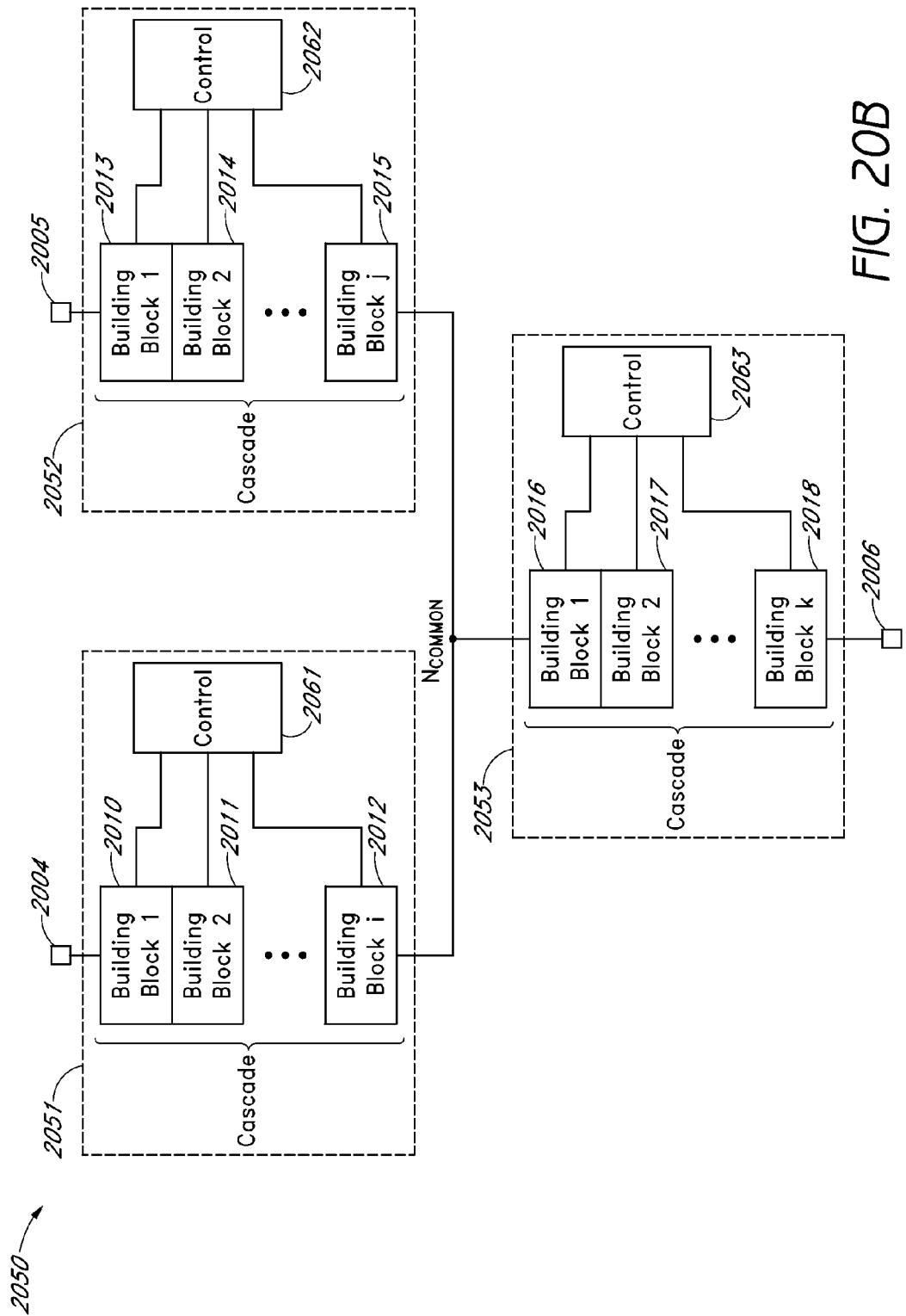
FIG. 20B is a schematic block diagram of a pad protection circuit according to another embodiment.

FIG. 20B is a schematic block diagram of a pad protection circuit 2050 according to another embodiment. The illustrated pad protection circuit 2050 includes a first protection subcircuit 2051, a second protection subcircuit 2052, and a third protection subcircuit 2053. The pad protection circuit 2050 is electrically connected to the first pad 2004, to the second pad 2005, and to the third pad 2006.

The pad protection circuit 2050 of FIG. 20B is similar to the pad protection circuit 2000 of FIG. 20A. However, in contrast to the pad protection subcircuits 2001-2003 of FIG. 20A, the pad protection subcircuits 2051-2053 of FIG. 20B further include the first, second, and third control blocks 2061-2063, respectively, which can be used to control the breakdown characteristics of the first, second, and third protection subcircuits 2051-2053. For instance, in implementations in which a building block used in the pad protection subcircuits 2051-2053 includes gated bipolar transistors, such as the gated bipolar transistors shown in the Type A' and Type B' building blocks of FIGS. 7A-8B, the control blocks 2061-2063 can be used for transient signal detection and to control the potential of the gates of the MOS devices so as to control a turn-on characteristic of the building block. For example, a control block can be used to generate a bias voltage for the gate of a gated bipolar transistor in a building block so as to control at least a trigger voltage of the building block. Two example configurations of control blocks are described in detail below with respect of FIGS. 28A and 28B.

Although the control blocks 2061-2063 are illustrated as being electrically connected to each building block within the pad protection subcircuits 2051-2053, respectively, the control blocks 2061-2063 can be configured to provide one or more control signals to only a portion of the building blocks of the protection subcircuits for selection of protection characteristics. Additionally, to the control blocks 2061-2063 can include additional connections in addition to those illustrated, such as connections to other nodes of a building block to aid in sensing the signaling conditions of the building block.

The pad protection circuits 2000, 2050 of FIGS. 20A-20B can employ any suitable combination of building blocks described herein, including, for example, the Type A building block of FIG. 5A, the Type B building block of FIG. 5B, the type C building block of FIG. 5C, the Type A' building block of FIG. 7A, the Type B' building block of FIG. 8A, and/or any of the building blocks described below.

Figure 21A:
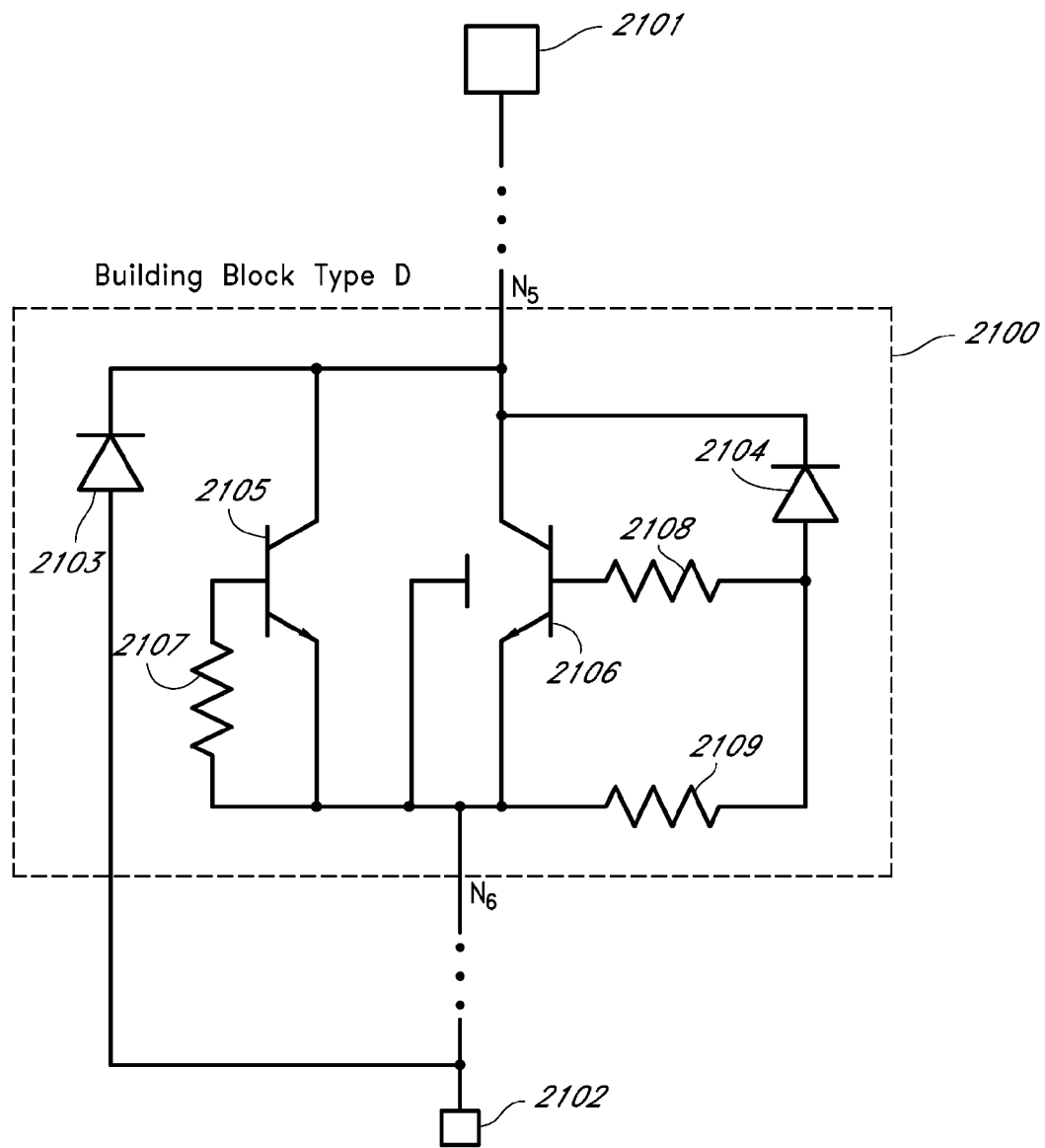
FIG. 21A is a circuit diagram illustrating a pad circuit building block in accordance with yet another embodiment.
Figure 21B:
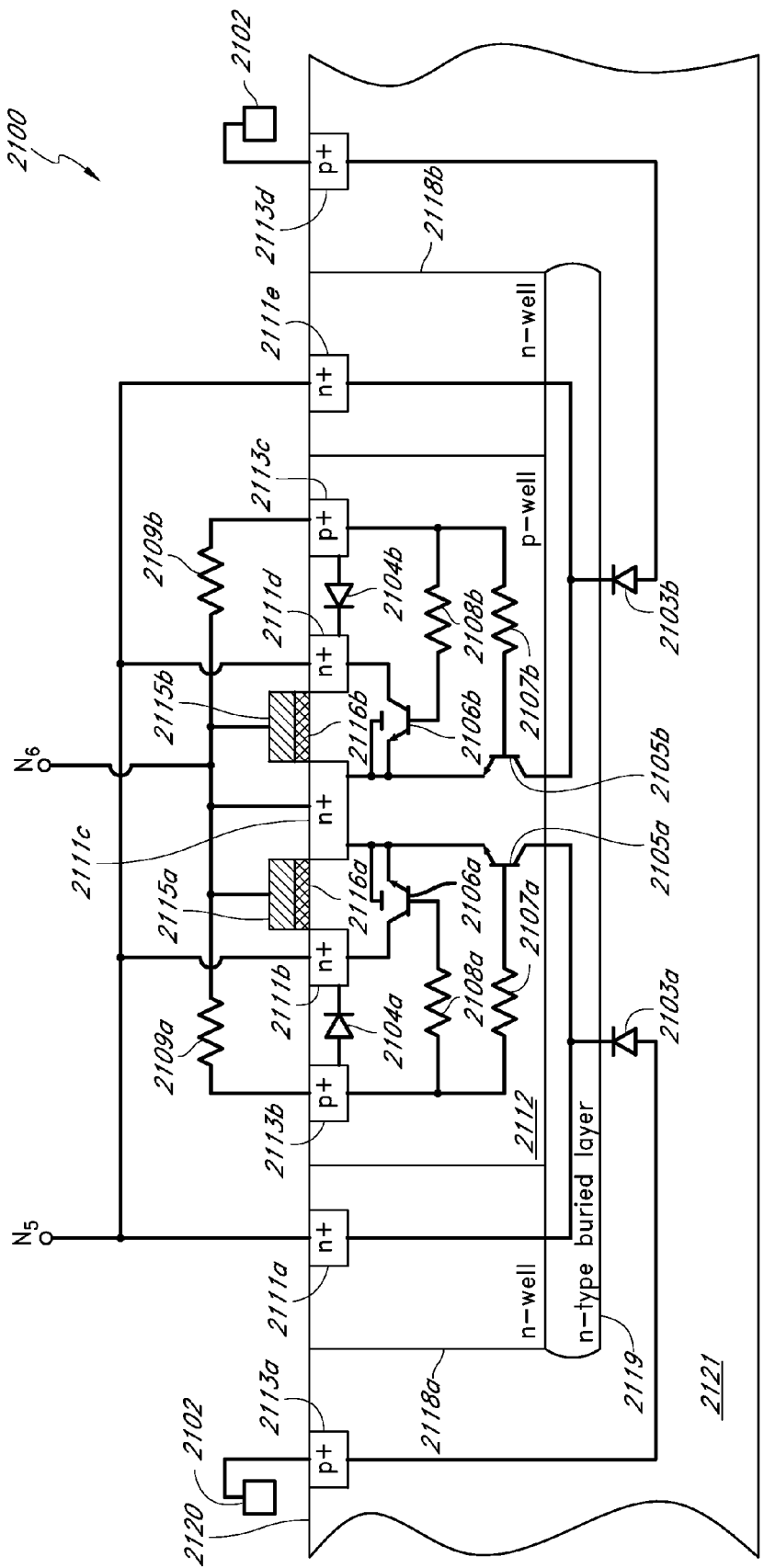
FIG. 21B illustrates an annotated cross section of one implementation of the pad protection circuit building block of FIG. 21A.

FIGS. 21A-21B show one embodiment of a building block type that can be used in the pad protection circuits of FIGS. 20A and 20B, as well as in other pad circuits described herein, including, for example, the pad circuits described earlier in connection with FIGS. 4A and 4B.

FIG. 21A is a circuit diagram illustrating a pad circuit building block in accordance with yet another embodiment. The illustrated Type D building block 2100 can be connected in a cascade between a first pad 2101 and a second pad 2102, and includes a first diode 2103, a second diode 2104, an NPN bipolar transistor 2105, a gated NPN bipolar transistor 2106, a first resistor 2107, a second resistor 2108, and a third resistor 2109. The gated NPN bipolar transistor 2106 can have a structure similar to that described earlier in connection with FIG. 6B. The first pad 2101 can be, for example, the first or second pads 2004, 2005 of FIGS. 20A-20B, and the second pad 2102 can be, for example, the third pad 2006 of FIGS. 20A-20B.

The first diode 2103 includes an anode electrically connected to the second pad 2102, and a cathode electrically connected to the collector of the NPN bipolar transistor 2105, to the collector of the gated NPN bipolar transistor 2106, and to the cathode of the second diode 2104 at a node $N_5$. The node $N_5$ can be electrically connected to another building block in a cascade, such as to any of the cascades illustrated in FIGS. 20A-20B, to a node connected to a different cascade of building blocks, such as the node $N_{COMMON}$ of FIGS. 20A-20B, or to the first pad 2101. The first resistor 2107 includes a first end electrically connected to the base of the NPN bipolar transistor 2105, and a second end electrically connected to the emitter of the NPN bipolar transistor 2105, to the emitter and the gate of the gated NPN bipolar transistor 2106, and to a first end of the third resistor 2109 at a node $N_6$. The node $N_6$ can be electrically connected to another building block in a cascade, to a node connected to a different cascade of building blocks, such as the node $N_{COMMON}$ of FIGS. 20A-20B, or to the second pad 2102. The second resistor 2108 includes a first end electrically connected to the base of the gated NPN bipolar transistor 2106, and a second end electrically connected to the anode of the second diode 2104 and to a second end of the third resistor 2109.

The first resistor 2107 can have any suitable resistance, including, for example, a resistance ranging between about 0.1Ω and about 10Ω, for example about 1.5Ω. The second resistor 2108 can have, for example, a resistance ranging between about 0.1Ω and about 10Ω, for example about 0.8Ω. Applicable amounts of resistance will be readily determined by one of ordinary skill in the art. The first and second resistors 2107, 2108 can be formed in any suitable way, including, for example, from well resistance, as will be described below with respect to FIG. 21B. The third resistor 2109 can have, for example, a resistance ranging between about 50Ω and about 500 kΩ, for example, about 500Ω. Applicable amounts of resistance will be readily determined by one of ordinary skill in the art. In certain implementations, the third resistor 2109 is formed using polysilicon having a length and width selected to achieve the target resistance. In certain implementations, such as the configuration shown in FIG. 21C discussed below, the third resistor 2109 can be omitted in favor of directly connecting the gate and emitter of the gated NPN bipolar transistor 2106 to the anode of the second diode 2104.

The building block 2100 can be disposed alone or in combination with other building blocks in any of the pad protection subcircuits shown in FIGS. 20A-20B. The second pad 2102 can be, for example, a low impedance pad configured to handle a relatively large shunted current. A transient signal event can be received at the first pad 2101. If the transient signal event has a voltage that is negative with respect to the first pad 2101, the first diode 2103 can become forward-biased and provide a current that can protect circuitry connected to the first pad 2101, such as an internal circuit of a sensor interface. Additionally, in certain implementations, the second diode 2104 can aid in providing additional protection against negative transient electrical events that cause the voltage of the first pad 2101 to decrease.

If the transient signal event received at the first pad 2101 has a voltage that is positive with respect to the first pad 2101, the gated NPN bipolar transistor 2106 can aid in providing transient signal protection. For example, the trigger voltage $V_{T\_D}$ of the Type D building block can be based on the collector-emitter breakdown voltage of the gated NPN bipolar transistor 2106. In some configurations, the NPN bipolar transistor 2105 can also aid in providing transient signal protection by providing an additional path for current flow during a positive transient electrical event.

The gate and the collector of the gated NPN bipolar transistor 2106 can function to form a capacitor, which can enhance how the gated NPN bipolar transistor 2106 performs when a transient signal event having a positive voltage is received on the first pad 2101 by increasing the displacement current. For example, if the transient signal event received on the first pad 2101 causes the node $N_5$ to have a rate of change $dV_{N5}/dt$ and the capacitance between the gate and the collector of the gated NPN bipolar transistor 2106 has a value of $C_{2106}$, a displacement current can be injected by the capacitor equal to about $C_{2106}*dV_{N5}/dt$. A portion of this current can be injected into the base of the gated NPN bipolar transistor 2106, which can increase the speed at which the Type D building block 2100 enters the low-impedance breakdown state associated with transient signal protection. Additionally, in implementations in which the NPN bipolar transistor 2105 is also configured to breakdown during a positive transient electrical event, a portion of the displacement current can be injected into the base of the NPN bipolar transistor 2105. Since a transient signal event can be associated with relatively fast rise and fall times (for example, from about 0.1 ns to about 1.0 µs) relative to the range of normal signal operating conditions, the rate of change of the node $N_5$ during a transient electrical event can be relatively fast, and thus the displacement current can be relatively large.

During normal operation, the gated NPN bipolar transistor 2106 can have a relatively low leakage. For example, the gated NPN bipolar transistor 2106 can be implemented using the configuration shown in FIG. 6B, and the absence of a lightly doped drain (LDD) for the gated NPN bipolar transistor 2106 can make the leakage of the gated NPN bipolar transistor 2106 relatively low, even over a relatively wide range of temperatures, for instance, between about −40° C. and about 140° C.

FIG. 21B illustrates an annotated cross section of one implementation of the pad protection circuit building block of FIG. 21A. The illustrated Type D building block 2100 includes a p-type substrate 2121, n-type active areas 2111a-2111e, p-type active areas 2113a-2113d, n-wells 2118a, 2118b, p-well 2112, n-type buried layer 2119, gates 2115a, 2115b, and gate oxides 2116a, 2116b. The cross section has been annotated to illustrate examples of circuit devices formed, such as gated NPN bipolar transistors 2106a, 2106b, NPN bipolar transistors 2105a, 2105b, first resistors 2107a, 2107b, second resistors 2108a, 2108b, first diodes 2103a, 2103b, and second diodes 2104a, 2104b. The diagram is also annotated to show the third resistors 2109a, 2109b, which can be included in certain implementations, and which can be formed by using, for example, n-diffusion and/or poly.

As illustrated in FIG. 21B, the p-well 2112 is disposed on a surface 2120 of the substrate 2121. The n-wells 2118a, 2118b are disposed on the surface 2120 of the substrate 2121 adjacent the p-well 2112 on opposite sides of the p-well 2112. In certain implementations, the n-wells 2118a, 2118b form part of a ring that surrounds the p-well 2112 when the p-well 2112 is viewed from above the substrate 2121. The n-type buried layer 2119 is disposed beneath the n-wells 2118a, 2118b and the p-well 2112. The p-type active area 2113a is disposed on the surface 2120 of the substrate 2121 on a side of the n-well 2118a opposite the p-well 2112. Similarly, the p-type active area 2113d is disposed on the surface 2120 of the substrate 2121 on a side of the n-well 2118b opposite the p-well 2112. The p-type active areas 2113a, 2113d are electrically connected to the pad 2102. The n-type active area 2111a is disposed in the n-well 2118a on the surface 2120 of the substrate 2121. Similarly the n-type active area 2111e is disposed in the n-well 2118b on the surface 2120 of the substrate 2121. The n-type active areas 2111a, 2111e are electrically connected to the node $N_5$.

The gate oxides 2116a, 2116b are disposed over the surface 2120 of the substrate 2121 above the p-well 2112, and the gates 2115a, 2115b are disposed over the gate oxides 2116a, 2116b, respectively. The p-type active areas 2113b, 2113c and the n-type active areas 2111b-2111d are disposed in the p-well 2112 on the surface 2120 of the substrate 2121. For example, the n-type active areas 2111b, 2111c are disposed in the p-well 2112 on opposite sides of the gate 2115a, and the n-type active areas 2111c, 2111d are disposed in the p-well 2112 on opposite sides of the gate 2115b. Additionally, the p-type active area 2113b is disposed in the p-well 2112 on a side of the n-type active area 2111b opposite the n-type active area 2111c, and the p-type active area 2113c is disposed in the p-well 2112 on a side of the n-type active area 2111d opposite the n-type active area 2111c. The p-type active areas 2113b, 2113c are electrically connected to the node $N_6$ through the third resistors 2109a, 2109b, respectively. The gates 2115a, 2115b and the n-type active area 2111c are electrically connected to the node $N_6$, and the n-type active areas 2111b, 2111d are electrically connected to the node $N_5$. In certain implementations, the gates 2115a, 2115b are electrically connected to a control node of a control block rather than to the node $N_6$. For example, the illustrated building block 2100 can be included in any of the protection subcircuits illustrated in FIG. 20B, and the gates 2115a, 2115b can be biased using one of the control blocks 2061-2063 of FIG. 20B.

The NPN bipolar transistors 2105a, 2105b can be formed from the p-well 2112, the n-type buried layer 2119 and the n-type active area 2111c, and can be vertical parasitic NPN devices. For example, the NPN bipolar transistors 2105a, 2105b can each have an emitter formed from the n-type active area 2111c, a base formed from the p-well 2112, and a collector formed from the n-type buried layer 2119. The gated NPN bipolar transistors 2106a, 2106b can be formed from the p-well 2112, the n-type active areas 2111b-2111d, and the gates 2115a, 2115b and can be lateral parasitic gated NPN devices. For example, the gated NPN bipolar transistor 2106a can have an emitter formed from the n-type active area 2111c, a base formed from the p-well 2112, a collector formed from the n-type active area 2111b, and a gate formed from the gate 2115a. Similarly, the gated NPN bipolar transistor 2106b can have an emitter formed from the n-type active area 2111c, a base formed from the p-well 2112, a collector formed from the n-type active area 2111d, and a gate formed from the gate 2115b. In certain implementations, the gated NPN bipolar transistors 2106a, 2106b do not include lightly doped drain (LDD) regions, and thus can have a structure similar to that shown and described above with respect to FIG. 6B.

The first diodes 2103a, 2103b can be formed from the p-type substrate 2121, the n-type buried layer 2119, and the n-wells 2118a, 2118b. For example, the first diode 2103a can have an anode formed from the p-type substrate 2121 and a cathode formed from the n-type buried layer 2119 and the n-well 2118a. Additionally, the first diode 2103b can have an anode formed from the p-type substrate 2121 and a cathode formed from the n-type buried layer 2119 and the n-well 2118b. The second diodes 2104a, 2104b can be formed from the p-well 2112, the p-type active areas 2113b, 2113d, and the n-type active areas 2111b, 2111d. For example, the second diode 2104a can have an anode formed from the p-well 2112 and the p-type active area 2113b and a cathode formed from the n-type active areas 2111b. Additionally, the second diode 2104b can have an anode formed from the p-well 2112 and the p-type active area 2113d and a cathode formed from the n-type active areas 2111d.

The first resistors 2107a, 2107b can be formed from the resistance of the p-well 2112 between the p-type active areas 2113b, 2113d and the bases of the NPN bipolar transistors 2105a, 2105b, respectively. Additionally, the second resistors 2108a, 2108b can be formed from the resistance of the p-well 2112 between the p-type active areas 2113b, 2113d and the bases of the gated NPN bipolar transistors 2106a, 2106b, respectively. The third resistors 2109a, 2109b can be included in certain implementations, and can represent the resistance of the polysilicon, diffusion, and/or other material from which the third resistors 2109a, 2109b are formed. However, the third resistors 2109a, 2109b can be omitted in favor of forming a building block such as that illustrated in FIG. 21C, as will be described below.

The n-wells 2118a, 2118b and the n-type buried layer 2119 can aid in electrically isolating the p-well 2112 from the p-type substrate 2121, thereby enhancing the flexibility of the illustrated building block by permitting the p-type substrate 2121 and the p-well 2112 to operate at different electrical potentials. As used herein, and as will be understood by one of skill in the art, the term "n-type buried layer" refers to any suitable n-type buried layer, including, for example, those used in silicon-on-insulator (SOI) technologies or in deep n-well technologies.

Although one implementation of the Type D building block 2100 of FIG. 21A is shown in FIG. 21B, other implementations are possible. Additionally, certain details have been omitted from FIG. 21B for clarity. For example, the Type D building block 2100 can undergo back end processing to form contacts and metallization, which can be used to form the illustrated connections. Additionally, the Type D building block 2100 can include isolation regions, such as shallow trench regions, deep trench regions or local oxidation of silicon (LOCOS) regions between active areas connected to different electrical nodes. Formation of the isolation regions can involve etching trenches in the substrate 2121, filling the trenches with a dielectric, such as silicon dioxide, and removing the excess dielectric using any suitable method, such as chemical-mechanical planarization.

Persons having ordinary skill in the art will appreciate that the cross section shown in FIG. 21B can correspond to the equivalent circuit shown in FIG. 21A. For example, the NPN bipolar transistors 2105a, 2105b can be represented by the NPN bipolar transistor 2105, the gated NPN bipolar transistors 2106a, 2106b can be represented by the gated NPN bipolar transistor 2106, the first diodes 2103a, 2103b can be represented by the first diode 2103, the second diodes 2104a, 2104b can be represented by the second diode 2104, the first resistors 2107a, 2107b can be represented by the first resistor 2107, the second resistors 2108a, 2108b can be represented by the second resistor 2108, and the third resistors 2109a, 2109b can be represented by the third resistor 2109.

Figure 21C:
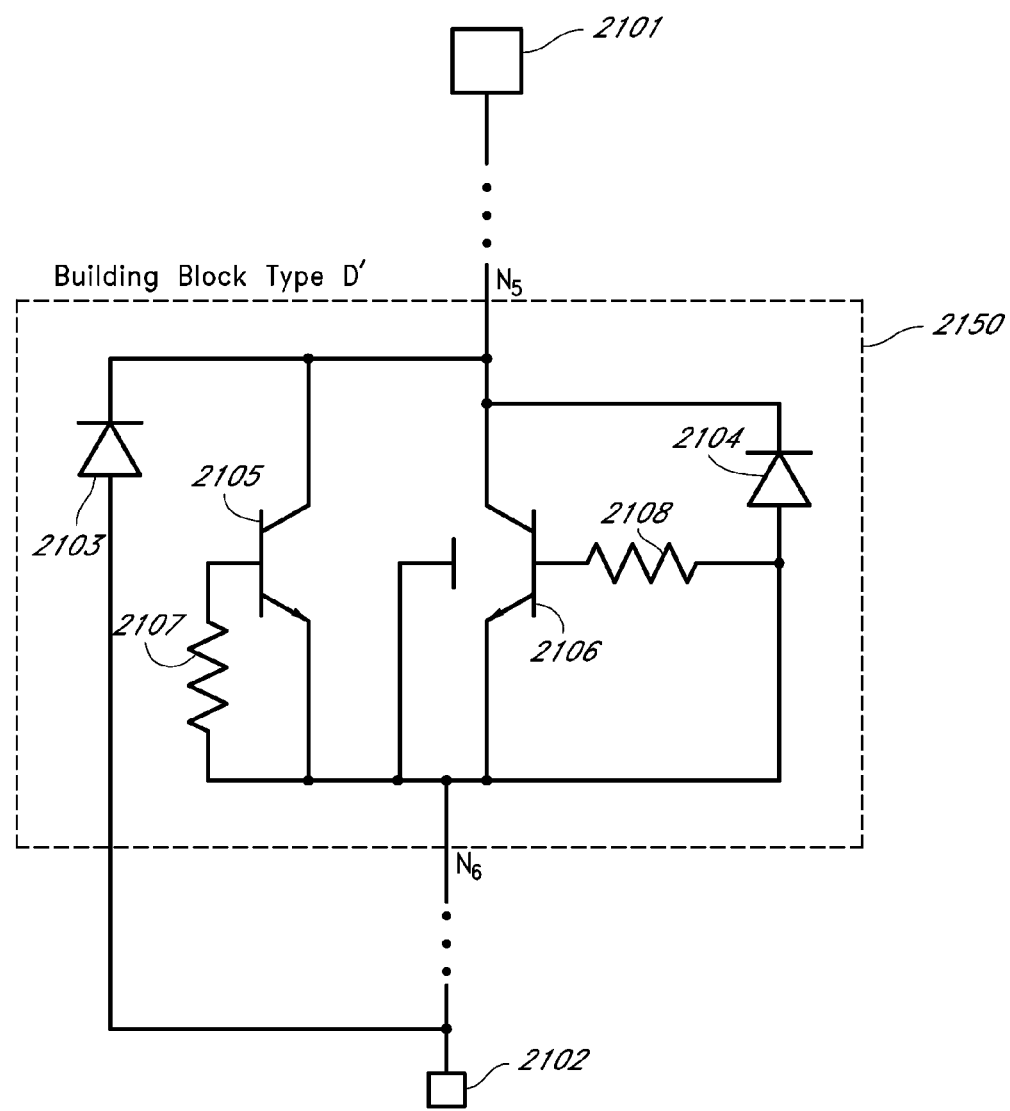
FIG. 21C is a circuit diagram illustrating a pad circuit building block in accordance with yet another embodiment.

FIG. 21C is a circuit diagram illustrating a pad circuit building block in accordance with yet another embodiment. The building block type can be used in the pad protection circuits of FIGS. 20A and 20B, as well as in other pad circuits described herein, including, for example, the pad circuits of FIGS. 4A and 4B described earlier. The illustrated Type D' building block 2150 can be connected in a cascade between the first pad 2101 and the second pad 2102, and includes the first diode 2103, the second diode 2104, the NPN bipolar transistor 2105, the gated NPN bipolar transistor 2106, the first resistor 2107, and the second resistor 2108.

The illustrated Type D' building block 2150 of FIG. 21C is similar to the Type D building block 2100 of FIG. 21A. However, in contrast to the Type D building block 2100 of FIG. 21A, the Type D' building block 2150 of FIG. 21C does not include the third resistor 2109. Omitting the third resistor 2109 can aid in improving performance of the Type D' building block against negative transient electrical events by reducing the resistance from the second pad 2102 to the first pad 2101 through the second diode 2104. However, removal of the third resistor 2109 of FIG. 21A can also degrade the turn-on response of the building block against positive transient electrical events, since removing the resistor reduces the resistance between the base and emitter of the gated NPN bipolar transistor 2106 and thus can decrease the speed at which the base-emitter junction becomes forward biased during a positive transient electrical event. Accordingly, Type D building blocks and/or Type D' building blocks can be selectively used as building blocks in a protection circuit depending on a variety of factors and operating conditions, such as the application the protection circuit is being used for.

Figure 22:
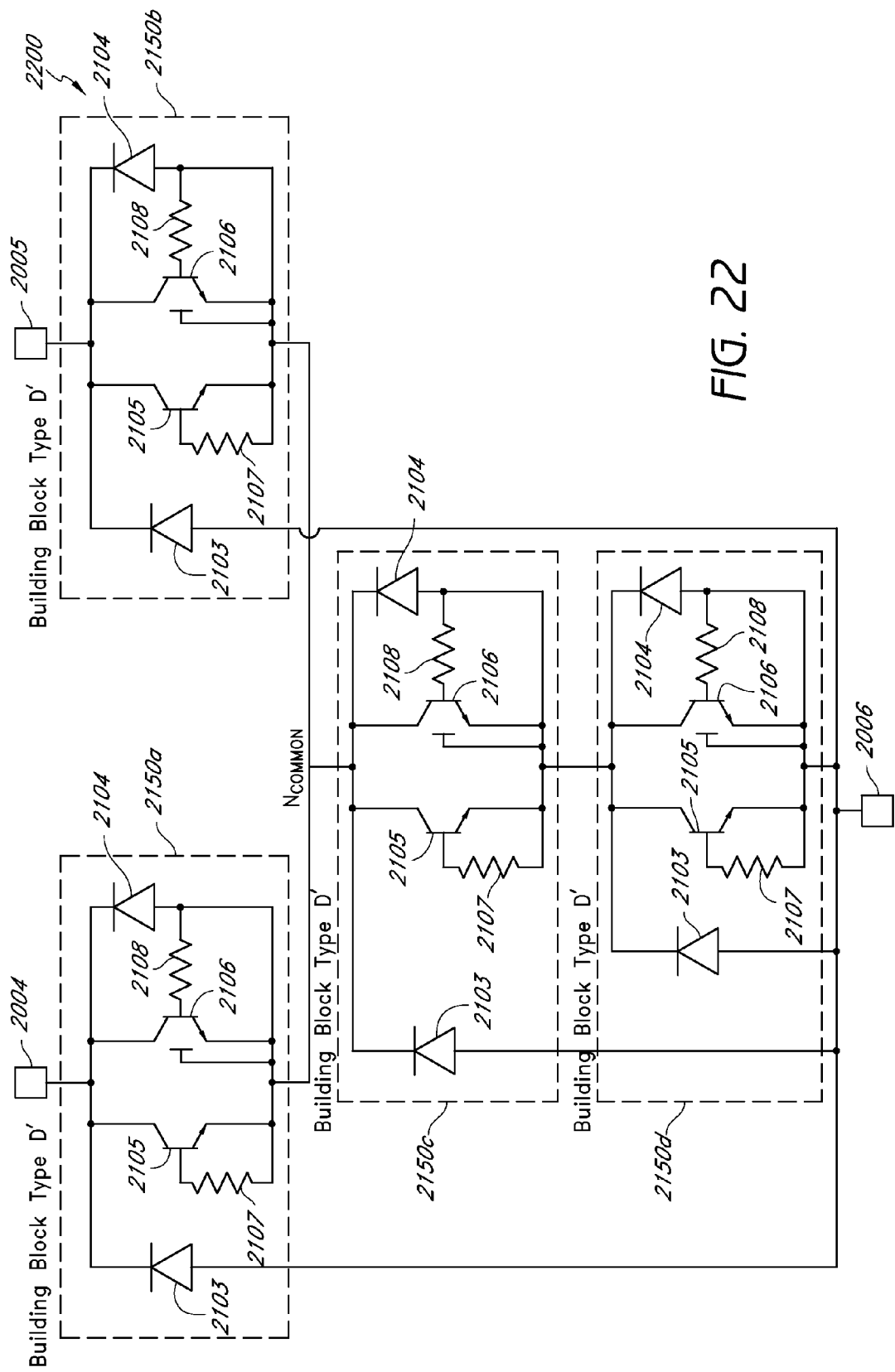
FIG. 22 is a circuit diagram of a pad protection circuit according to another embodiment.

FIG. 22 is a circuit diagram of a pad protection circuit according to another embodiment. The illustrated pad protection circuit 2200 includes a first Type D' building block 2150a, a second Type D' building block 2150b, a third Type D' building block 2150c, and a fourth Type D' building block 2150d. The pad protection circuit 2200 is electrically connected to the first pad 2004, the second pad 2005 and the third pad 2006, which were described above with respect to FIGS. 20A-20B.

The first Type D' building block 2150a includes a first end electrically connected to the first pad 2004 and a second end electrically connected to the node $N_{COMMON}$. The second Type D' building block 2150b includes a first end electrically connected to the second pad 2005 and a second end electrically connected to the node $N_{COMMON}$. The third and fourth Type D' building blocks 2150c, 2150d are electrically connected in a cascade between the node $N_{COMMON}$ and the third pad 2006. For example, the third Type D' building block 2150c includes a first end electrically connected to the node $N_{COMMON}$ and a second end electrically connected to a first end of the fourth Type D' building block 2150d. The fourth Type D' building block 2150d further includes a second end electrically connected to the third pad 2006.

The first, second, third and fourth Type D' building blocks 2150a-2150d each include the first diode 2103, the second diode 2104, the NPN bipolar transistor 2105, the gated NPN bipolar transistor 2106, the first resistor 2107, and the second resistor 2108, which can be as described above with respect to FIG. 21C. As was described earlier, the Type D' building block 2150 lacks the third resistor 2109 of the Type D building block 2100 of FIG. 21A, and thus has a relatively low impedance between the anode of the second diode 2104 and the gate and emitter of the gated NPN bipolar transistor 2106. Using Type D' building blocks 2150a-2150d in the configuration illustrated in FIG. 22 can aid in improving protection against a negative transient electrical event received on the first pad 2004 and/or the second pad 2005. For example, during a negative transient electrical event received on the first pad 2004, the Type D' building block 2150a can have a relatively low impedance between the node $N_{COMMON}$ and the first pad 2004 through the second diode 2104, which can aid in shunting charge associated with the negative transient electrical event.

The first, second, third and fourth Type D' building blocks 2150a-2150d can determine the protection characteristic of the pad protection circuit 2200. For example, when the first, second, third and fourth Type D' building blocks 2150a-2150d each have a holding voltage of about $V_{H\_D'}$ and a trigger voltage of about $V_{T\_D'}$, the pad protection circuit 2200 can have a trigger voltage between the first and third pads 2004, 2006 that is equal to about $3*V_{T\_D'}$, and a holding voltage between the first and third pads that is equal to about $3*V_{H\_D'}$. Similarly, the pad protection circuit 2200 can have a trigger voltage between the second and third pads 2005, 2006 that is equal to about $3*V_{T\_D'}$, and a holding voltage between the second and third pads 2005, 2006 that is equal to about $3*V_{H\_D'}$. In addition, the pad protection circuit 2200 can aid in controlling a potential difference between the first and second pads 2004, 2005, thereby protecting circuitry, such as differential circuitry that may be sensitive to voltage differences between the first and second pads 2004, 2005. For example, the pad protection circuit 2200 can have a forward and reverse trigger voltage between the first and second pads 2004, 2005 that is equal to about $V_{T\_D'}$ and a forward and reverse holding voltage between the first and second pads 2004, 2005 that is equal to about $V_{H\_D'}$.

The illustrated pad protection circuit 2200 can be used to provide protection to a pair of pads that have a relatively small voltage difference between them during operation. For example, the first and second pads 2004, 2005 can be high voltage signal pads electrically connected to a two-wire current interface. The signals pads can have a voltage difference of less than about 5 V between them during normal operation, and the holding voltage $V_{H\_D'}$ and the trigger voltage $V_{T\_D'}$ of the Type D' building block can be selected to be greater than about 6.5 V and about 9.5 V, respectively. In this manner, breakdown between the first and second pads 2004, 2005 through the first and second Type D' building blocks 2150a, 2150b is prevented during normal operation. However, when a transient electrical event causes the difference between the first and second pads 2004, 2005 to increase, the first and second Type D' building blocks 2150a, 2150b can provide a low impedance path between the pads that can be used to shunt a portion of the current associated with the transient electrical event.

Additionally, the cascade of building clocks disposed between the node $N_{COMMON}$ and the third pad 2006 can aid in shunting current when a transient electrical event increases the common mode voltage of the first and second pads 2004, 2005 relative to the voltage of the third pad 2006. For example, the number and type of building blocks disposed between the node $N_{COMMON}$ and the third pad 2006 can be selected to determine a desired trigger voltage and holding voltage of the cell between the first pad 2004 and the third pad 2006 and between the second pad 2005 and the third pad 2006. For instance, a normal operating voltage may range between about 5 V and about 11 V with a maximum operating voltage of about 18 V, and the trigger voltage of the cell can be selected to be in the range about 25 V to about 32 V and the holding voltage of the cell can be selected to be in the range of about 18 V to about 21 V. When a transient electrical event is received on the first pad 2004 that causes the pad voltage to exceed the trigger voltage, a low impedance path can be provided between the first pad 2004 and the third pad 2006 through the first, third and fourth Type D' building blocks 2150a, 2150c, 2150d. Similarly, when a transient electrical event is received on the second pad 2005, a low impedance path can be provided between the second pad 2005 and the third pad 2006 through the second, third and fourth Type D' building blocks 2150b-2150d.

Figure 23A:
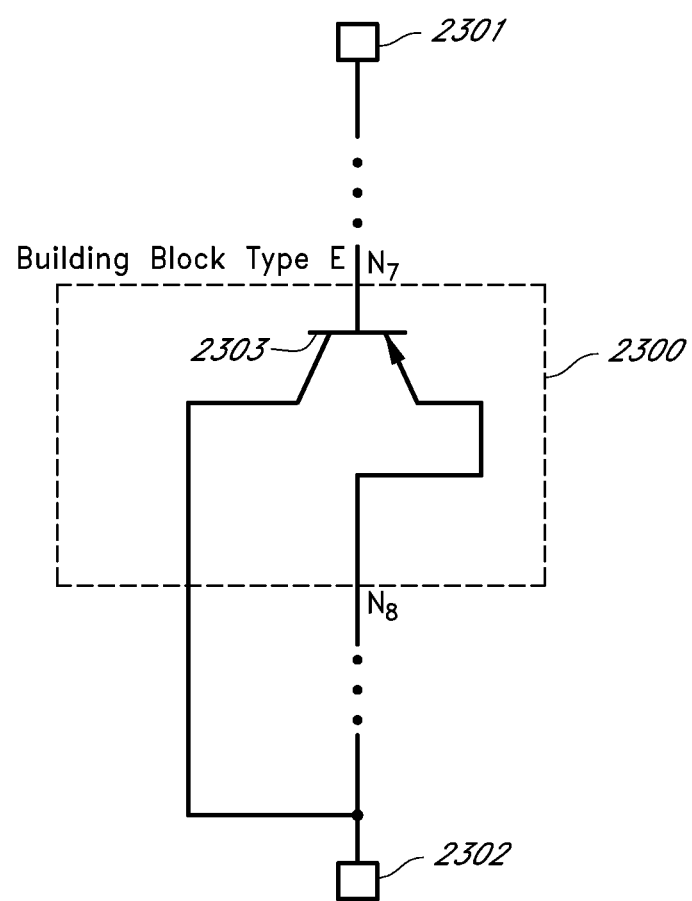
FIG. 23A is a circuit diagram illustrating a pad circuit building block in accordance with yet another embodiment.
Figure 23B:
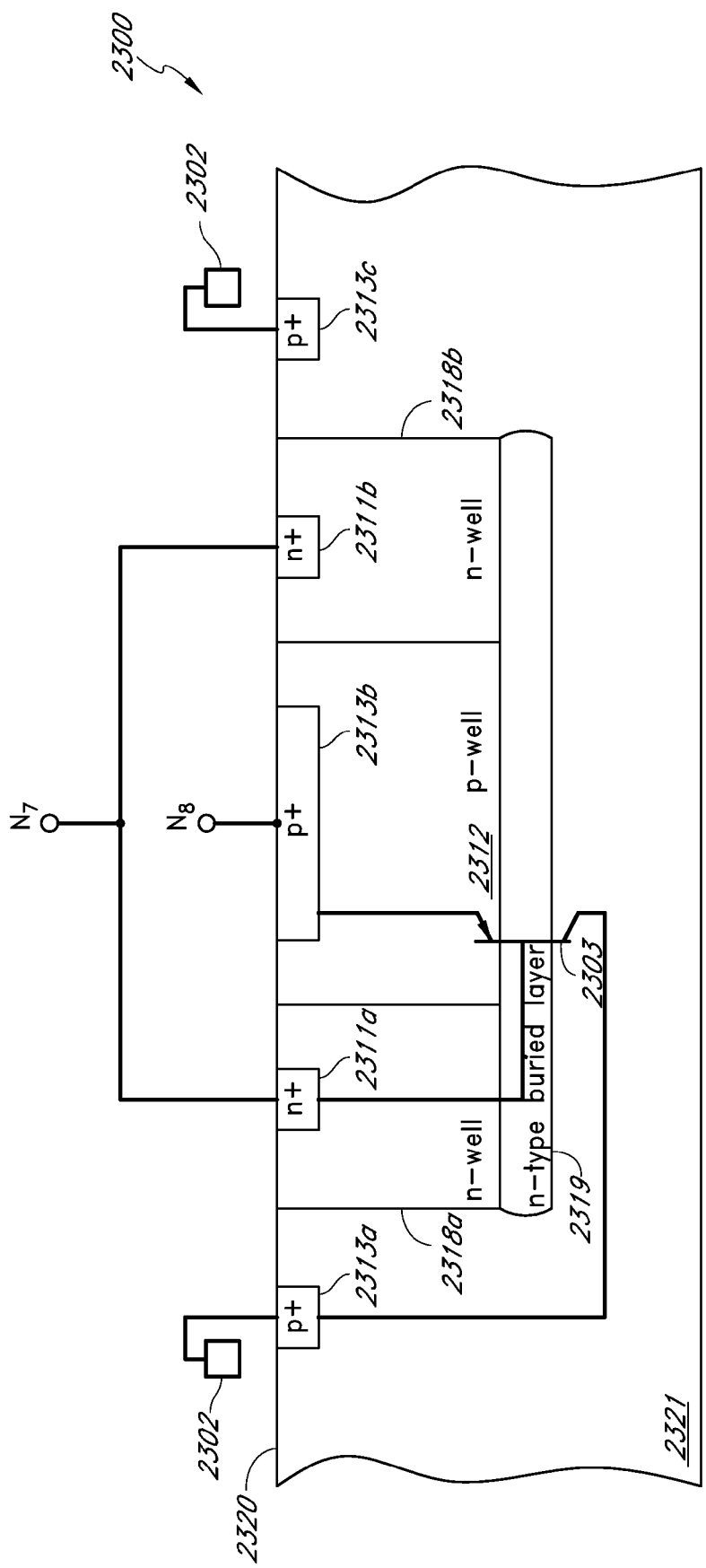
FIG. 23B illustrates an annotated cross section of one implementation of the pad protection circuit building block of FIG. 23A.

FIGS. 23A-23B show another embodiment of a building block type that can be used in the pad protection circuits of FIGS. 20A and 20B, as well as in other pad circuits described herein, including, for example, the pad circuits of FIGS. 4A and 4B described earlier.

FIG. 23A is a circuit diagram illustrating a pad circuit building block in accordance with yet another embodiment. The illustrated Type E building block 2300 includes a PNP bipolar transistor 2303, and can be connected in a cascade between a first pad 2301 and a second pad 2302.

The PNP bipolar transistor 2303 includes a base electrically connected to a node $N_7$, which can be electrically connected to, for example, the first pad 2301 or to a node common to another cascade of building blocks. The PNP bipolar transistor 2303 further includes a collector electrically connected to the second pad 2302, and an emitter electrically connected to the node $N_8$. The node $N_8$ also can be electrically connected to, for example, the second pad 2302. In certain implementations, the PNP bipolar transistor 2303 can provide effective protection between the second pad 2302 to the first pad 2301 during a negative transient electrical event by operating as a forward-biased diode. Additionally, the PNP bipolar transistor 2303 can provide a relatively high blocking voltage between the first pad 2301 and the second pad 2302, and thus can be used, for example, in implementations in which protection against positive transient electrical events is provided by a different cascade of building blocks.

The building block 2300 can be disposed alone or in combination with other building blocks. For example, the building block 2300 can be electrically connected in parallel with a cascade of other building blocks. The second pad 2302 can be, for example, a low impedance pad, such as a ground pad configured to handle a relatively large shunted current. A transient signal event can be received at the first pad 2301. If the transient signal event has a voltage that is negative with respect to the first pad 2301, both the collector-base and the emitter-base junctions of the PNP bipolar transistor 2303 can become forward biased and provide currents which can protect circuitry electrically connected to the first pad 2301, such as an internal circuit of a sensor interface. In certain implementations, the building block 2300 is optimized in the forward direction to provide enhanced diode-type performance.

In certain implementations, the Type E building block 2300 is electrically connected in parallel with other building blocks that provide positive transient electrical event protection, and the Type E building block 2300 is used only for protection against negative transient electrical events that would decrease the voltage of the first pad 2301 below that of the second pad 2302.

FIG. 23B illustrates an annotated cross section of one implementation of the pad protection circuit building block of FIG. 23A. The illustrated Type E building block 2300 includes a p-type substrate 2321, n-type active areas 2311a, 2311b, p-type active areas 2313a-2313c, n-wells 2318a, 2318b, p-well 2312, and an n-type buried layer 2319. The cross section has been annotated to illustrate examples of circuit devices formed, such as the PNP bipolar transistor 2303.

As illustrated in FIG. 23B, the p-well 2312 is disposed on a surface 2320 of the substrate 2321. The n-wells 2318a, 2318b are disposed on the surface 2320 of the substrate 2321 adjacent the p-well 2312 on opposite sides of the p-well 2312. In certain implementations, the n-wells 2318a, 2318b form part of a ring that surrounds the p-well 2312 when the p-well 2312 is viewed from above the substrate 2321. The n-type buried layer 2319 is disposed beneath the n-wells 2318a, 2318b and the p-well 2312. The p-type active area 2313a is disposed on the surface 2320 of the substrate 2321 on a side of the n-well 2318a opposite the p-well 2312. Similarly the p-type active area 2313c is disposed on a surface of the substrate 2321 on a side of the n-well 2318b opposite the p-well 2312. The p-type active areas 2313a, 2313c are electrically connected to the pad 2302. The n-type active area 2311a is disposed in the n-well 2318a on the surface 2320 of the substrate 2321. Similarly the n-type active area 2311b is disposed in the n-well 2318b on the surface 2320 of the substrate 2321. The n-type active areas 2311a, 2311b are electrically connected to the node $N_7$. The p-type active area 2313b is disposed in the p-well 2312 on the surface 2320 of the substrate 2321 and is electrically connected to the node $N_8$.

The PNP bipolar transistor 2303 can be formed from the p-well 2312, the p-type substrate 2321, the n-type buried layer 2319, and the n-wells 2318a, 2318b. For example, the PNP bipolar transistor 2303 can have an emitter formed from the p-well 2312, a base formed from the n-type buried layer 2319 and the n-wells 2318a, 2318b, and a collector formed from the p-type substrate 2321.

The n-wells 2318a, 2318b and the n-type buried layer 2319 can aid in electrically isolating the p-well 2312 from the p-type substrate 2321, thereby permitting the p-well 2312 to operate as the emitter of the PNP bipolar transistor 2303. The n-type buried layer can be any suitable isolation layer, including, for example, a deep n-well layer.

Persons having ordinary skill in the art will appreciate that the cross section shown in FIG. 23B can correspond to the equivalent circuit shown in FIG. 23A. For example, the PNP bipolar transistor 2303 of FIG. 23B can correspond to the PNP bipolar transistor 2303 of FIG. 23A. However, other implementations of the Type E building block 2300 of FIG. 23A are possible in addition to the implementation illustrated in FIG. 23B.

Figure 24:
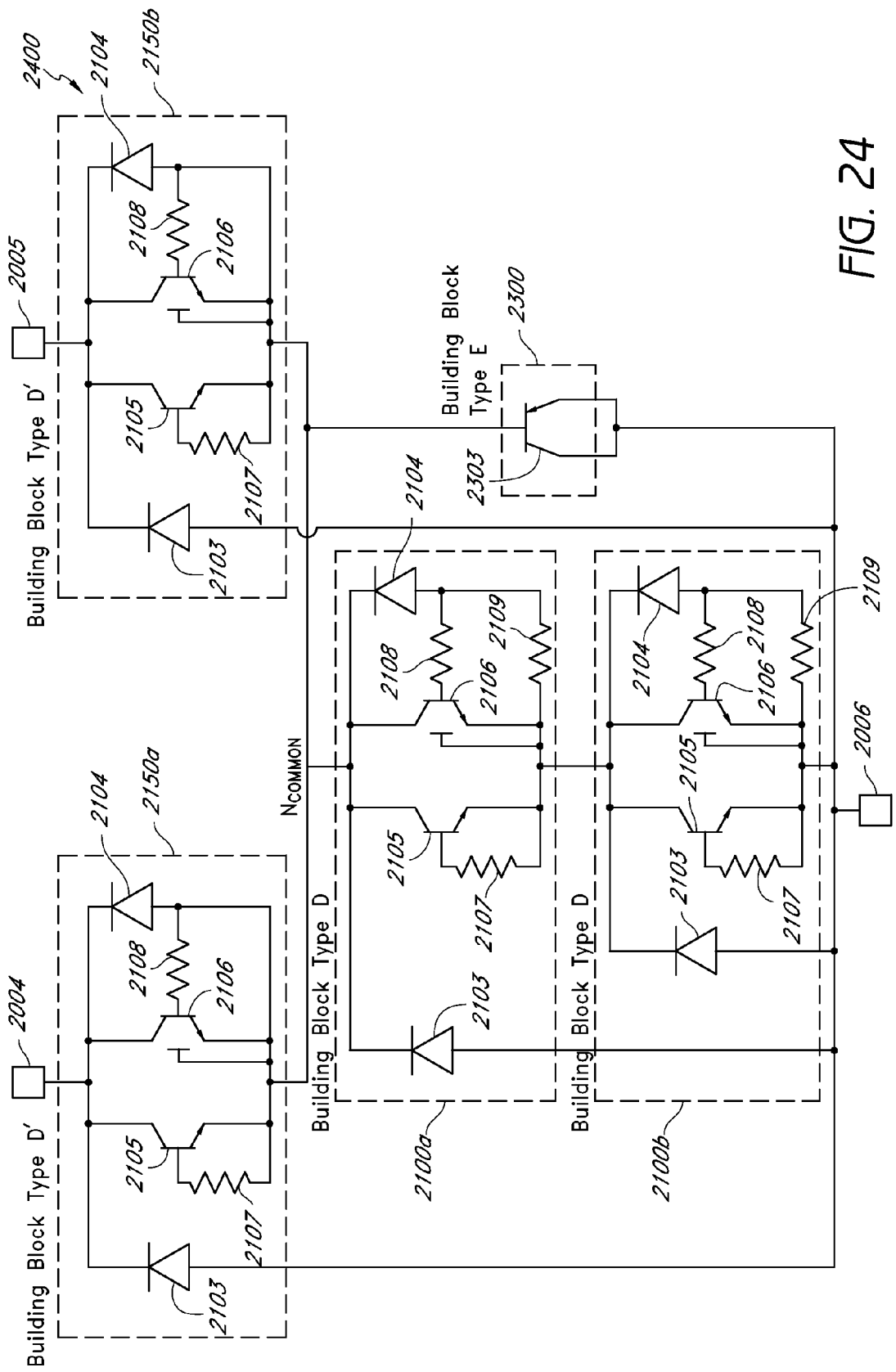
FIG. 24 is a circuit diagram of a pad protection circuit according to another embodiment.

FIG. 24 is a circuit diagram of a pad protection circuit according to another embodiment. The illustrated pad protection circuit 2400 includes a first Type D building block 2100a, a second Type D building block 2100b, a first Type D' building block 2150a, a second Type D' building block 2150b, and a Type E building block 2300. The pad protection circuit 2400 is electrically connected to the first pad 2004, to the second pad 2005 and to the third pad 2006, which were described above with respect to FIGS. 20A-20B.

The first Type D' building block 2150a includes a first end electrically connected to the first pad 2004 and a second end electrically connected to the node $N_{COMMON}$. The second Type D' building block 2150b includes a first end electrically connected to the second pad 2005 and a second end electrically connected to the node $N_{COMMON}$. The first and second Type D building blocks 2100a, 2100b are electrically connected in a cascade between the node $N_{COMMON}$ and the third pad 2006. For example, the first Type D building block 2100a includes a first end electrically connected to the node $N_{COMMON}$ and a second end electrically connected to a first end of the second Type D building block 2100b. The second Type D building block 2100b further includes a second end electrically connected to the third pad 2006. The Type E building block 2300 includes a first end electrically connected to the node $N_{COMMON}$ and a second end electrically connected to the third pad 2006.

The first and second Type D' building blocks 2150a, 2150b each include the first diode 2103, the second diode 2104, the NPN bipolar transistor 2105, the gated NPN bipolar transistor 2106, the first resistor 2107, and the second resistor 2108, and can be as described above with respect to FIG. 21C.

The first and second Type D building blocks 2100a, 2100b each include the first diode 2103, the second diode 2104, the NPN bipolar transistor 2105, the gated NPN bipolar transistor 2106, the first resistor 2107, the second resistor 2108, and the third resistor 2109. In contrast to the first and second Type D' building blocks 2150a, 2150b, the first and second Type D building blocks 2100a, 2100b include the third resistor 2109. Including the third resistor 2109 can aid in enhancing the performance of the gated NPN bipolar transistor 2106 so as to achieve, for example, faster turn-on and/or enhanced trigger control of a target clamping response during positive transient electrical events. For example, inclusion of the third resistor 2109 can enhance the clamping characteristics of the gated NPN bipolar transistor 2106, since a base current generated during a positive transient electrical event can travel through the third resistor 2109 and generate a voltage across the resistor that can increase the base-emitter voltage of the gated NPN bipolar transistor 2106. Since increasing the base-emitter voltage of the gated NPN bipolar transistor 2106 can stimulate current flow, the clamping characteristic of the gated NPN bipolar transistor 2106 against positive transient electrical events can be enhanced by including the third resistor 2109. However, the third resistor 2109 can also increase the resistance from the first end to the second end of the Type D building block through the second diode 2104, thereby impacting the performance of the Type D building block against negative transient electrical events.

To aid in improving protection of the pad protection circuit 2400 against negative transient electrical events, the pad protection circuit 2400 includes a Type E building block disposed between the node $N_{COMMON}$ and the third pad 2006. For example, the Type E building block 2300 includes a first end electrically connected to the node $N_{COMMON}$ and a second end electrically connected to the third pad 2006. By providing both the Type E building block and the cascade of the first and second Type D building blocks 2100a, 2100b between the node $N_{COMMON}$ and the third pad 2006, protection against positive and negative transient electrical events can be separately optimized to achieve a design target, such as a minimum area footprint. For example, the first and second Type D building blocks 2100a, 2100b can be tuned to achieve the desired protection against positive transient electrical events, while the Type E building block 2300 can be tuned to achieve the desired protection against negative transient electrical events.

Figure 25A:
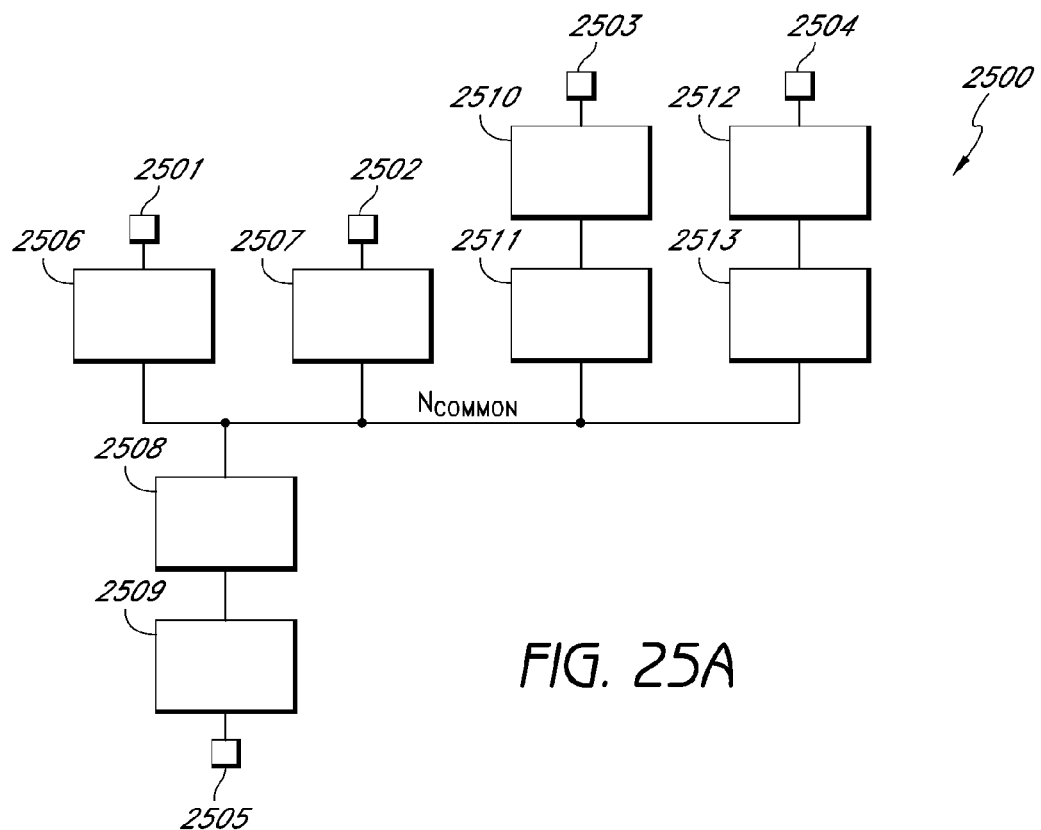
FIG. 25A is a schematic block diagram of a pad protection circuit according to another embodiment.

FIG. 25A is a schematic block diagram of a pad protection circuit 2500 according to another embodiment. The illustrated pad protection circuit 2500 includes first, second, third, fourth, fifth, sixth, seventh and eighth protection building blocks 2506-2513 and is electrically connected to first, second, third, fourth and fifth pads 2501-2505.

The first building block 2506 includes a first end electrically connected to the first pad 2501 and a second end electrically connected to the node $N_{COMMON}$. The second building block 2507 includes a first end electrically connected to the second pad 2502 and a second end electrically connected to the node $N_{COMMON}$. The third building block 2508 includes a first end electrically connected to the node $N_{COMMON}$ and a second end electrically connected to a first end of the fourth building block 2509. The fourth building block 2509 further includes a second end electrically connected to the fifth pad 2505. The fifth building block 2510 includes a first end electrically connected to the third pad 2503 and a second end electrically connected to a first end of the sixth building block 2511. The sixth building block 2511 further includes a second end electrically connected to the node $N_{COMMON}$. The seventh building block 2512 includes a first end electrically connected to the fourth pad 2504 and a second end electrically connected to a first end of the eighth building block 2513. The eighth building block 2513 further includes a second end electrically connected to the node $N_{COMMON}$.

The protection circuit of FIG. 2500 provides protection to a plurality of pads, which can be, for example, a plurality of pads associated with multiple two wire current interfaces in a sensor interface implementation and/or different operating voltage levels. For example, the first and second pads 2501, 2502 can be associated with a first two-wire sensor interface and the third and fourth pads 2503, 2504 can be associated with a second two-wire sensor interface. Additionally, the fifth pad 2505 can be a low impedance pad, such as a ground pad, and can be used to shunt a current associated with a transient electrical event. For example, the first, third and fourth building blocks 2506, 2508, 2509 can be configured to provide a low impedance path between the first pad 2501 and the fifth pad 2505 when a transient electrical event is received on the first pad 2501. Similarly, the second, third and fourth building blocks 2507-2509 can be configured to provide a low impedance path between the second pad 2502 and the fifth pad 2505 when a transient electrical event is received on the second pad 2502. Additionally, the third through sixth building blocks 2508-2511 can provide a low impedance path between the third pad 2503 and the fifth pad 2505 during a transient electrical event received on the third pad 2503. Similarly, the third, fourth, seventh and eighth building blocks 2508, 2509, 2512, 2513 can provide a low impedance path between the fourth pad 2504 and the fifth pad 2505 during a transient electrical event received on the fourth pad 2504.

The protection circuit 2500 can also aid in keeping the voltage between the first through fourth pads 2501-2504 within a safe range associated with normal operation of the pads. For example, when a transient electrical event causes the voltage between the first and second pads 2501, 2502 to increase, the protection circuit 2500 can provide a low impedance path from the first pad 2501 to the second pad 2502 through the first and second protection building blocks 2506, 2507. Similarly, when a transient electrical event causes the voltage between the third and fourth pads 2503, 2504 to increase, the protection circuit 2500 can provide a low impedance path from the third pad 2503 to the fourth pad 2504 through the fifth through eight protection building blocks 2510-2513.

Figure 25B:
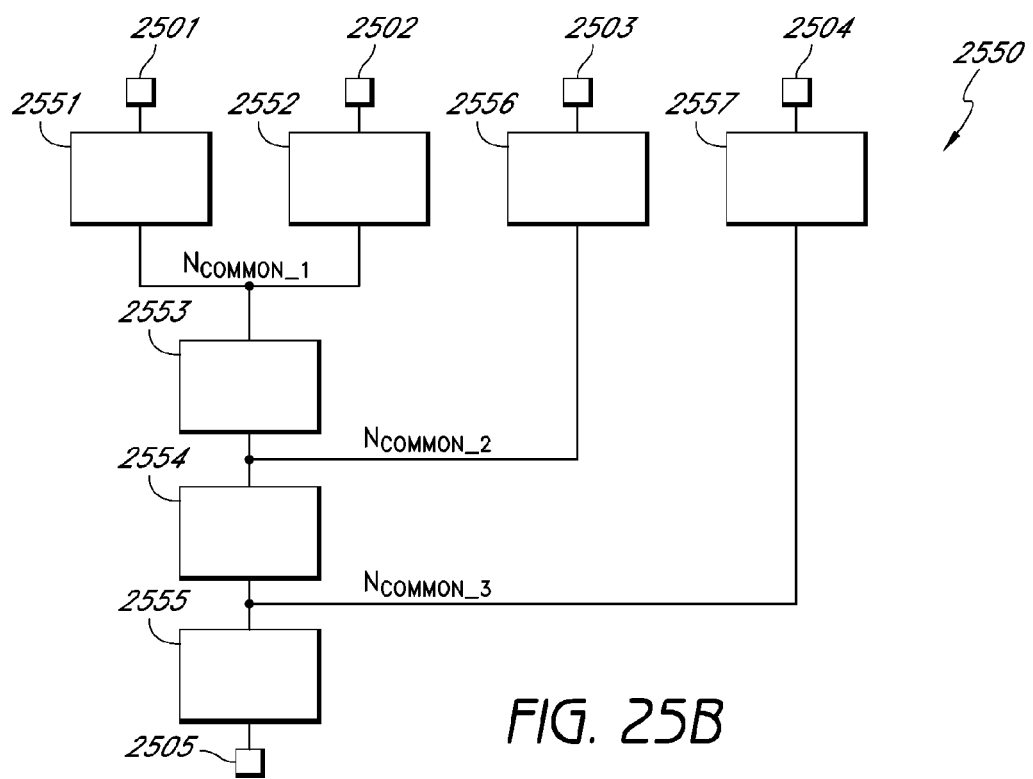
FIG. 25B is a schematic block diagram of a pad protection circuit according to yet another embodiment.

FIG. 25B is a schematic block diagram of a pad protection circuit 2550 according to yet another embodiment. The illustrated pad protection circuit 2550 includes first, second, third, fourth, fifth, sixth and seventh protection building blocks 2551-2557 and is electrically connected to the first, second, third, fourth and fifth pads 2501-2505.

The first building block 2551 includes a first end electrically connected to the first pad 2501 and a second end electrically connected to the node $N_{COMMON\_1}$. The second building block 2552 includes a first end electrically connected to the second pad 2502 and a second end electrically connected to the node $N_{COMMON\_1}$. The third building block 2553 includes a first end electrically connected to the node $N_{COMMON\_1}$ and a second end electrically connected to a node $N_{COMMON\_2}$. The fourth building block 2554 includes a first end electrically connected to the node $N_{COMMON\_2}$ and a second end electrically connected to a node $N_{COMMON\_3}$. The fifth building block 2555 includes a first end electrically connected to the node $N_{COMMON\_3}$ and a second end electrically connected to the fifth pad 2505. The sixth building block 2556 includes a first end electrically connected to the third pad 2503 and a second end electrically connected to the node $N_{COMMON\_2}$. The seventh building block 2557 includes a first end electrically connected to the fourth pad 2504 and a second end electrically connected to the node $N_{COMMON\_3}$.

Figure 26:
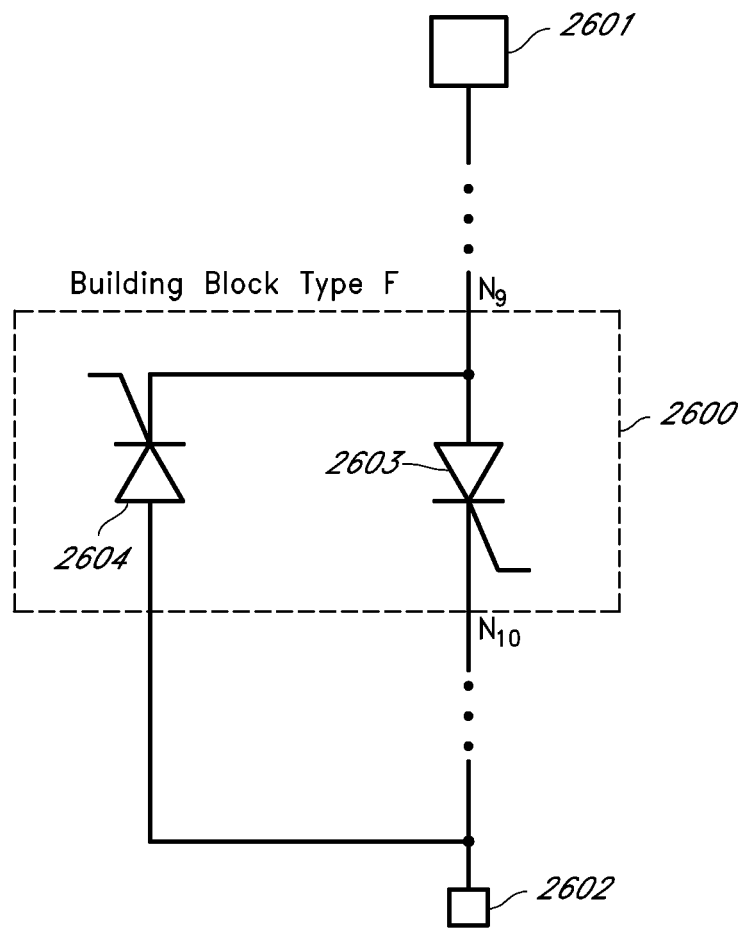
FIG. 26 is a circuit diagram illustrating a pad circuit building block in accordance with another embodiment.

FIG. 26 is a circuit diagram illustrating a pad circuit building block in accordance with another embodiment, and which can have a high reverse blocking voltage (HRBV) in certain implementations. The illustrated Type F building block 2600 can be used in the pad protection circuits of FIGS. 20A and 20B, as well as in other pad circuits described herein, including, for example, the pad circuits of FIGS. 4A, 4B, 25A and 25B described earlier. The Type F building block includes a first silicon control rectifier with high reverse breakdown voltage (SCR-HRBV) 2603 and a second SCR-HRBV 2604, and is electrically connected between a first pad 2601 and a second pad 2602. The first pad 2601 can be, for example, the first or second pads 2004, 2005 of FIGS. 20A-20B, and the second pad 2602 can be, for example, the third pad 2006 of FIGS. 20A-20B. Each SCR-HRBV 2603, 2604 can be a structure with, for example, a medium voltage trigger in the range of about 8 V to about 20 V for forward conduction between the first pad 2601 and the second pad 2602, and a very high blocking voltage in the range of about 40V to about 60V for reverse conduction between the first pad 2601 and the second pad 2602. The first SCR-HRBV 2603 need not have the same breakdown characteristics as the second SCR-HRBV 2604. Rather, the breakdown characteristic of each SCR-HRBV can be independently tuned for a particular application.

The first SCR-HRBV 2603 includes an anode electrically connected to a cathode of the second SCR-HRBV 2604 at a node $N_9$. The node $N_9$ can be electrically connected to another building block in a cascade, such as any of the cascades illustrated in FIGS. 20A-20B, to a node connected to a different cascade of building blocks, such as the node $N_{COMMON}$ of FIGS. 20A-20B, or to the first pad 2601. The first SCR-HRBV 2603 further includes a cathode electrically connected to the node $N_{10}$, which can be electrically connected to another building block in a cascade, to a node common to another cascade, such as the node $N_{COMMON}$ of FIGS. 20A-20B, or to the second pad 2602. The second SCR-HRBV 2604 further includes an anode electrically connected to the second pad 2602.

The building block 2600 can be disposed, for example, alone or in combination with other building blocks in any of the pad protection subcircuits shown in FIGS. 20A-20B. The second pad 2602 can be, for example, a low impedance pad configured to handle a relatively large shunted current. A transient signal event can be received at the first pad 2601. When the transient signal event has a voltage that is negative with respect to the first pad 2601, the second SCR-HRBV 2604 can become forward-biased and provide current which can aid in protecting circuitry connected to the first pad 2601, such as an internal circuit of a sensor interface. When the transient signal event received at the first pad 2601 has a voltage that is positive with respect to the first pad 2601, the first SCR-HRBV 2603 can become forward-biased and provide transient signal protection.

Figure 27:
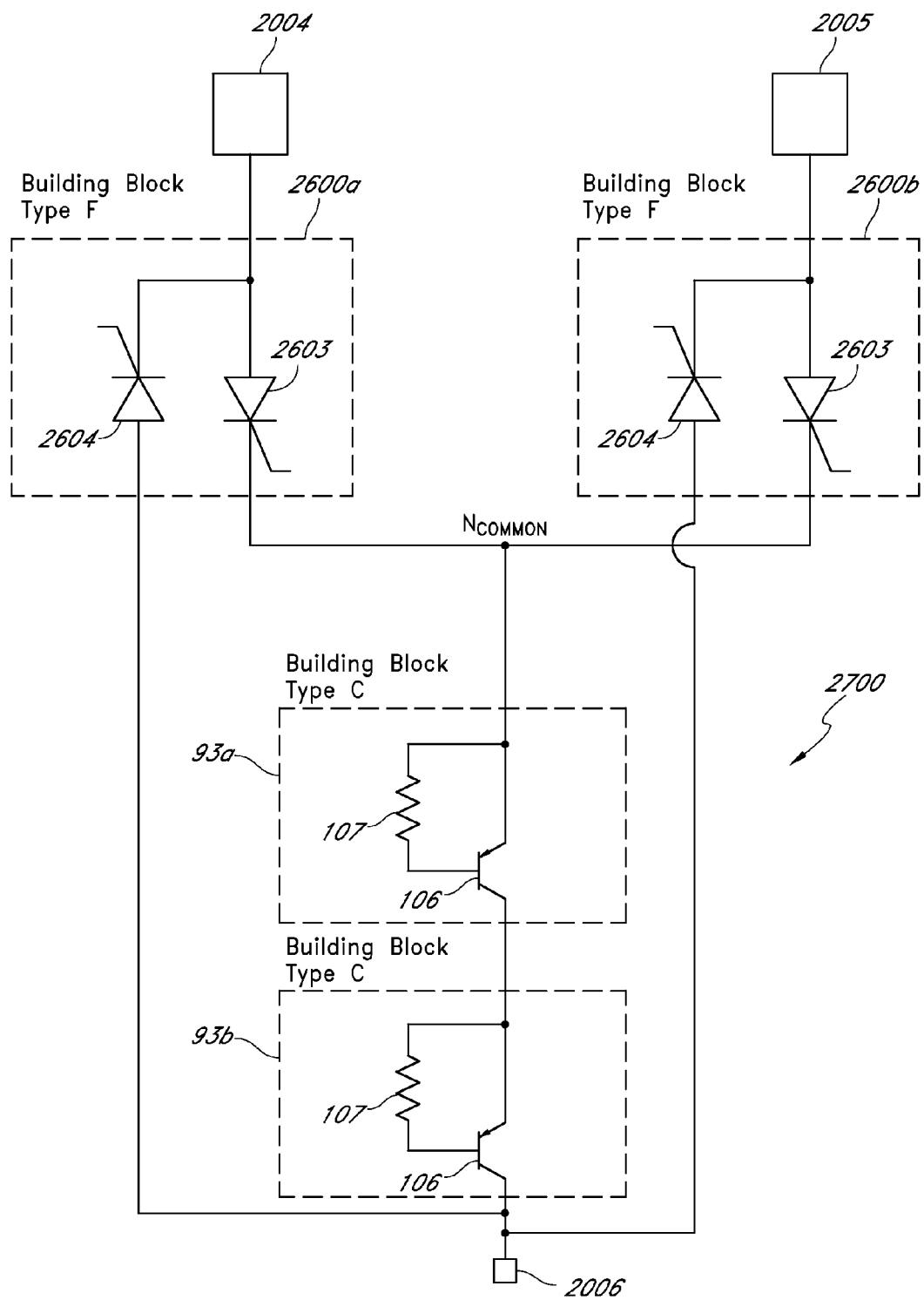
FIG. 27 is a circuit diagram of a pad protection circuit according to another embodiment.

FIG. 27 is a circuit diagram of a pad protection circuit 2700 according to another embodiment. The illustrated pad protection circuit 2700 includes a first Type F building block 2600a, a second Type F building block 2600b, a first Type C building block 93a, and a second Type C building block 93b. The pad protection circuit 2700 is electrically connected to the first pad 2004, to the second pad 2005 and to the third pad 2006.

The first Type F building block 2600a includes a first end electrically connected to the first pad 2004 and a second end electrically connected to the node $N_{COMMON}$. The second Type F building block 2600b includes a first end electrically connected to the second pad 2005 and a second end electrically connected to the node $N_{COMMON}$. The first and second Type C building blocks 93a, 93b are electrically connected in a cascade between the node $N_{COMMON}$ and the third pad 2006. For example, the first Type C building block 93a includes a first end electrically connected to the node $N_{COMMON}$ and a second end electrically connected to a first end of the second Type C building block 93b. The second Type C building block 93b further includes a second end electrically connected to the third pad 2006.

The first and second Type F building blocks 2600a, 2600b each include the first SCR-HRBV 2603 and the second SCR-HRBV 2604, which can be as described earlier. The first and second Type C building blocks 93a, 93b each include the PNP bipolar transistor 106 and the resistor 107, which were described earlier.

The pad protection circuit 2700 can have a breakdown path between the first pad 2004 and the third pad 2006 during a positive transient electrical event that is through the first SCR-HRBV 2603 of the first Type F building block 2600a and through the PNP bipolar transistors 106 of the first and second Type C building blocks 93a, 93b. Similarly, the pad protection circuit 2700 can have a breakdown path between the second pad 2005 and the third pad 2006 during a positive transient electrical event that is through the first SCR-HRBV 2603 of the second Type F building block 2600b and through the PNP bipolar transistors 106 of the first and second Type C building blocks 93a, 93b. During a negative transient electrical event received between the first pad 2004 and the third pad 2006, the second SCR-HRBV 2604 of the first Type F building block 2600a can provide the breakdown path. Similarly, during a negative transient electrical event received between the second pad 2005 and the third pad 2006, the second SCR-HRBV 2604 of the second Type F building block 2600b can provide the breakdown path.

The pad protection circuit 2700 can be configured to have a relatively large breakdown voltage between the first and second pads 2004, 2005, which can be useful in implementations in which the voltage swing of the first and second pads 2004, 2005 is relatively large and/or relatively far apart. For example, the first SCR-HRBV devices 2603 can be configured to have a relatively large reverse breakdown voltage such that when a transient electrical event increases the voltage of the first pad 2004 relative to the second pad 2005 a breakdown path is not provided through the first SCR-HRBV device 2603 of the second Type F building block 2600b. Rather, when a transient electrical event increases the voltage of the first pad 2004 relative to that of the second pad 2005, a breakdown path can be provided through the first SCR-HRBV 2603 of the first Type F building block 2600a, through the PNP bipolar transistors 106 of the first and second Type C building blocks 93a, 93b, and through the second SCR-HRBV 2604 of the second Type F building block 2600b. Likewise, when a transient electrical event increases the voltage of the second pad 2005 relative to that of the first pad 2004, a breakdown path can be provided through the first SCR-HRBV 2603 of the second Type F building block 2600b, through the PNP bipolar transistors 106 of the first and second Type C building blocks 93a, 93b, and through the second SCR-HRBV 2604 of the first Type F building block 2600a. By configuring the protection circuit 2700 in this manner, the protection circuit can be used in implementations in which the first and second pads 2004, 2005 have relatively large voltages that are relatively far apart.

Figure 28A:
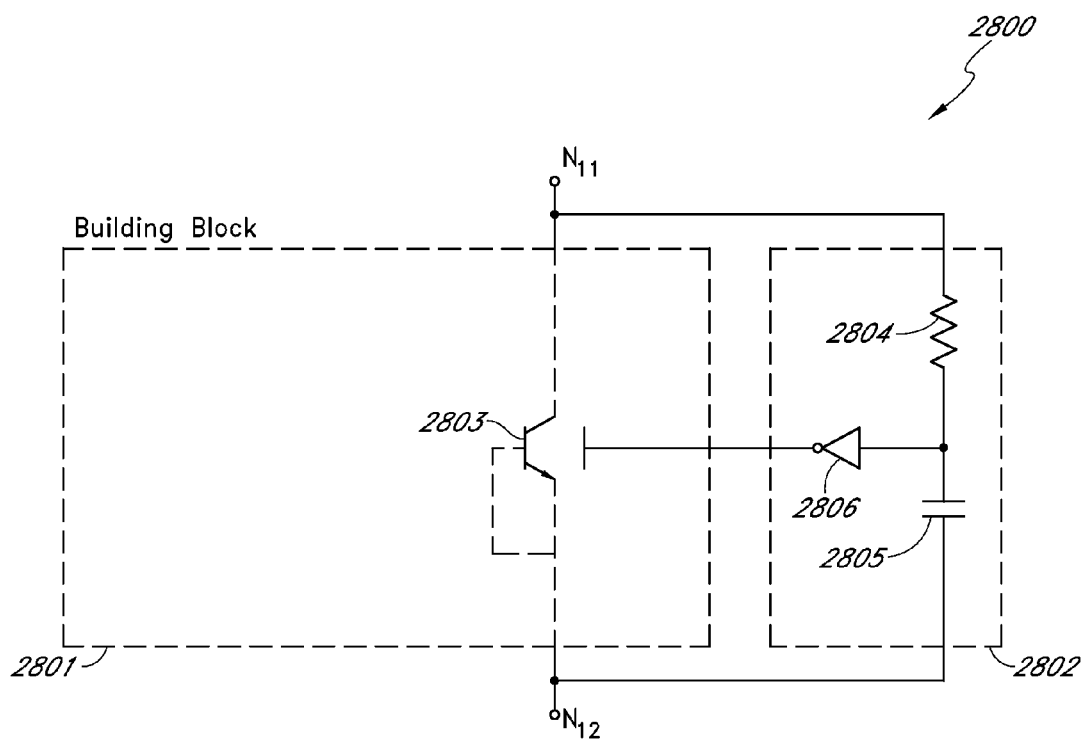
FIG. 28A is a circuit diagram of a portion of a pad protection circuit according to one embodiment.

FIG. 28A is a circuit diagram of a portion of a pad protection circuit 2800 according to one embodiment. The portion of the pad protection circuit includes a building block 2801 and a control circuit 2802.

The building block 2801 can be, for example, any of the building blocks disposed in the pad protection subcircuits 2051-2053 of FIG. 20B. The building block 2801 includes a first end electrically connected to a node $N_{11}$ and a second end electrically connected to a node $N_{12}$. The illustrated building block 2801 includes a gated NPN bipolar transistor 2803, but can be modified to include additional components.

The control block 2802 is electrically connected between the nodes $N_{11}$ and $N_{12}$, and includes a resistor 2804, a capacitor 2805, and an inverter 2806. The resistor 2804 includes a first end electrically connected to the node $N_{11}$, and a second end electrically connected to a first end of the capacitor 2805 and to an input of the inverter 2806. The capacitor 2805 further includes a second end electrically connected to the node $N_{12}$, and the inverter 2806 further includes an output electrically connected to the gate of the gated NPN bipolar transistor 2803.

The control block 2802 can be used to control the trigger voltage of the building block 2800 by controlling a potential provided to the gate of the gated NPN bipolar transistor 2803. For example, when the node $N_{11}$ increases during a transient electrical event, the voltage at the input of the inverter can increase at a rate determined by the time-constant of the resistor 2804 and the capacitor 2805. When the voltage at the input of the inverter 2806 exceeds the trip point of the inverter 2806, the inverter 2806 can change the potential of the gate of the gated NPN bipolar transistor 2803 so as to decrease the trigger voltage of the building block 2801. Using a control circuit, such as the control circuit 2802, can aid in expediting the trigger of a building block during a transient signal event. Although one implementation of the control block 2802 is illustrated, other variations are possible. Additionally, although a building block with an n-type device is illustrated, the control block 2802 can be modified to control a building block with a p-type device.

Figure 28B:
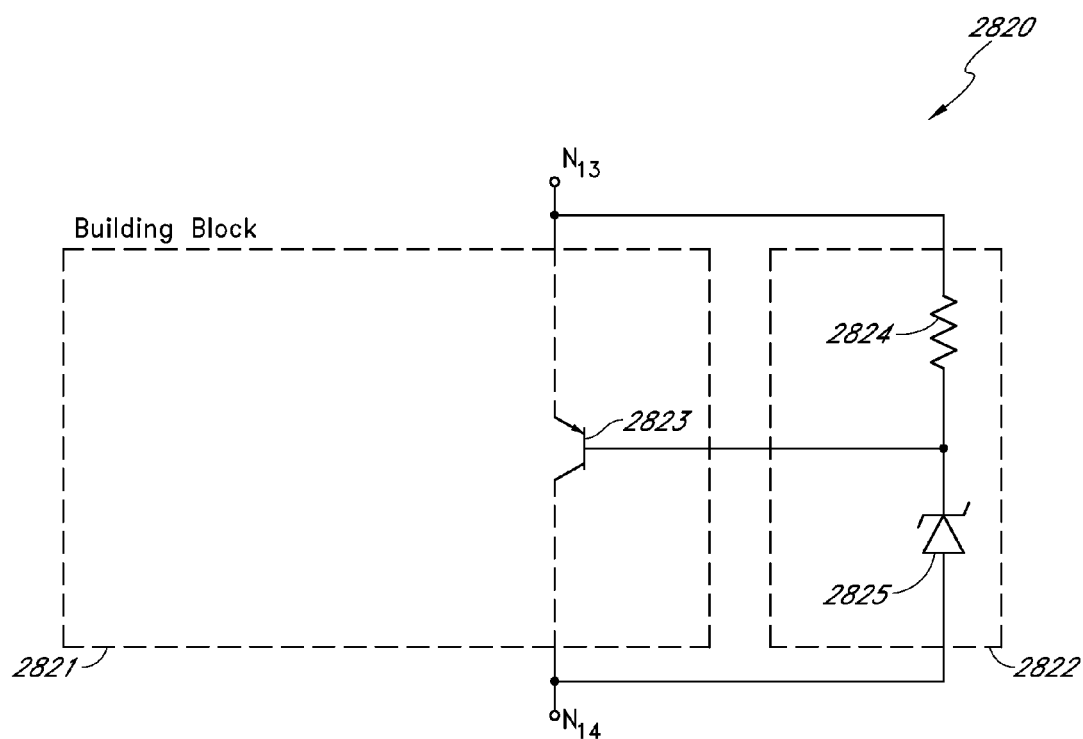
FIG. 28B is a circuit diagram of a portion of a pad protection circuit according to another embodiment.

FIG. 28B is a circuit diagram of a portion of a pad protection circuit 2820 according to another embodiment. The portion of the pad protection circuit includes a building block 2821 and a control circuit 2822.

The building block 2821 can be, for example, any of the building blocks disposed in the pad protection subcircuits 2051-2053 of FIG. 20B. The building block 2821 includes a first end electrically connected to a node $N_{13}$ and a second end electrically connected to a node $N_{14}$. The illustrated building block 2821 includes a PNP bipolar transistor 2823, but can be modified to include additional components.

The control block 2822 is electrically connected between the nodes $N_{13}$ and $N_{14}$, and includes a resistor 2824 and a reference voltage diode 2825, which can be, for instance, a cascade of diodes and/or Zener diode defining a predetermined turn-on voltage. The resistor 2824 includes a first end electrically connected to the node $N_{13}$, and a second end electrically connected to the first terminal of the reference voltage diode 2825 and to the base of the PNP bipolar transistor 2823. The reference voltage diode 2825 further includes a second terminal electrically connected to the node $N_{14}$.

The control block 2822 can be used to control the trigger voltage of the building block 2823 by controlling a current provided to the base of the PNP bipolar transistor 2823. For example, when the voltage of the node $N_{13}$ increases during a transient electrical event, the voltage at the first terminal of the reference voltage diode 2825 can increase until the voltage exceeds a breakdown voltage of the reference voltage diode 2825. Thereafter, the reference voltage diode 2825 can conduct a current that can build-up the base-emitter voltage of the PNP bipolar transistor 2823, thereby expediting the trigger of the building block 2821 during a transient signal event. Although one implementation of the control block 2822 is illustrated, other variations are possible. Additionally, although a building block with a p-type bipolar device is illustrated, the control block 2822 can be modified to control a building block with one or more n-type bipolar devices.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

Applications

Devices employing the above described schemes can be implemented into various electronic devices. Examples of the electronic devices can include, but are not limited to, medical imaging and monitoring, consumer electronic products, parts of the consumer electronic products, electronic test equipment, etc. Examples of the electronic devices can also include memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi functional peripheral device, a wrist watch, a clock, etc. Further, the electronic device can include unfinished products.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. An apparatus comprising:
   an integrated circuit comprising:
      a first pad disposed on a surface of the integrated circuit;
      a second pad disposed on the surface of the integrated circuit;
      a third pad disposed on the surface of the integrated circuit; and
      a protection circuit disposed within the integrated circuit, wherein the protection circuit comprises a first protection subcircuit electrically coupled between the first pad and a first node of the integrated circuit, a second protection subcircuit electrically coupled between the second pad and the first node, and a third protection subcircuit electrically coupled between the first node and the third pad;
   wherein the first node is not directly associated with the first pad, the second pad, or the third pad, and
   wherein the first protection subcircuit comprises a first silicon controlled rectifier (SCR) having an anode electrically connected to the first pad and a cathode electrically connected to the first node, and a second SCR having an anode electrically connected to the third pad and a cathode electrically connected to the first pad,
   wherein the second protection subcircuit comprises a third SCR having an anode electrically connected to the second pad and a cathode electrically connected to the first node, and a fourth SCR having an anode electrically connected to the third pad and a cathode electrically connected to the second pad,
   wherein in response to a first type of transient electrical event that increases a voltage of the first pad relative to a voltage of the second pad, the protection circuit is configured to provide a low impedance path from the first pad to the second pad through the first SCR, the third protection subcircuit, and the fourth SCR,
   wherein in response to a second type of transient electrical event that increases the voltage of the second pad relative to the voltage of the first pad, the protection circuit is configured to provide a low impedance path from the second pad to the first pad through the third SCR, the third protection subcircuit, and the second SCR.

2. The apparatus of claim 1, wherein the first, second, and third protection subcircuits comprise at least one protection circuit building block each, and wherein selection of a number of the protection circuit building blocks per protection subcircuit determines at least one of a holding voltage or a trigger voltage of the protection circuit associated with the first pad and at least one of a holding voltage or a trigger voltage of the protection circuit associated with the second pad.

3. The apparatus of claim 2, wherein each of the first and second protection subcircuits comprises one or more protection circuit building blocks of a first type, and wherein the third protection subcircuit comprises one or more protection circuit building blocks of a second type different than the first type.

4. The apparatus of claim 2, wherein the third protection subcircuit comprises a plurality of protection circuit building blocks arranged in a cascade.

5. The apparatus of claim 4, further comprising one or more additional building blocks electrically connected in parallel to the cascade of building blocks of the third protection subcircuit, wherein the one or more additional building blocks is configured to provide a protection response against transient electrical events received on the first and second pads of a first polarity, and wherein the cascade of building blocks of the third protection subcircuit is configured to provide a protection response against transient electrical events received on the first and second pads of a second polarity opposite the first polarity.

6. The apparatus of claim 2, wherein the cascade of building blocks comprises a first building block and a second building block, the first building block including a first end electrically connected to the first node and a second end electrically connected to a second node, and wherein the second building block includes a first end electrically connected to the second node and a second end electrically connected to the third pad, and wherein the integrated circuit further comprises a fourth pad and a third building block, the third building block including a first end electrically connected to the fourth pad and a second end electrically connected to the second node.

7. The apparatus of claim 2, wherein at least one of the protection circuit building blocks is configured to receive a control signal from a control block, wherein the at least one of the protection circuit building blocks is configured to select amongst two or more trigger voltages based at least partly on the control signal.

8. The apparatus of claim 2, wherein the first and second pads are electrically connected to a sensor interface.

9. The apparatus of claim 1, wherein the third pad comprises a low impedance ground reference pad.

10. The apparatus of claim 1, wherein the integrated circuit comprises a switch and a current source electrically connected in series between the second pad and the third pad.

11. The apparatus of claim 1, further comprising an internal circuit disposed within the integrated circuit, wherein the internal circuit is electrically connected to at least one of the first pad or the second pad, and wherein the protection circuit protects the internal circuit from transient electrical events.

12. The apparatus of claim 1, wherein the first node is internal to the integrated circuit and is not externally accessible.

13. The apparatus of claim 1,
wherein in response to a third type of transient electrical event that increases the voltage of the first pad relative to a voltage of the third pad, the protection circuit is configured to provide a low impedance path from the first pad to the third pad through the first SCR and the third protection subcircuit, and
wherein in response to a fourth type of transient electrical event that increases the voltage of the second pad relative to the voltage of the third pad, the protection circuit is configured to provide a low impedance path from the second pad to the third pad through the third SCR and the third protection subcircuit.

14. The apparatus of claim 13,
wherein in response to a fifth type of transient electrical event that increases the voltage of the third pad relative to the voltage of the first pad, the protection circuit is configured to provide a low impedance path from the third pad to the first pad through the second SCR, and
wherein in response to a sixth type of transient electrical that increases the voltage of the third pad relative to the voltage of the second pad, the protection circuit is configured to provide a low impedance path from the third pad to the second pad through the fourth SCR.

15. The apparatus of claim 1, wherein the first, second, third, and fourth SCRs each have a blocking voltage in the range of about 40 V to about 60 V for reverse conduction.

16. An apparatus comprising:
an integrated circuit comprising:
a first pad disposed on a surface of the integrated circuit;
a second pad disposed on the surface of the integrated circuit;
a third pad disposed on the surface of the integrated circuit; and
a protection circuit disposed within the integrated circuit, wherein the protection circuit comprises a first protection subcircuit electrically coupled between the first pad and a first node of the integrated circuit, a second protection subcircuit electrically coupled between the second pad and the first node, and a third protection subcircuit electrically coupled between the first node and the third pad;
wherein the first node is not directly associated with the first pad, the second pad, or the third pad,
wherein the first protection subcircuit comprises a first gated NPN bipolar transistor and a first diode, wherein a collector of the first gated NPN bipolar transistor is electrically connected to the first pad, wherein a gate, an emitter and a base of the first gated NPN bipolar transistor is electrically connected to the first node, wherein an anode of the first diode is electrically connected to first node and a cathode of the first diode is electrically connected to the first pad,
wherein the second protection subcircuit comprises a second gated NPN bipolar transistor and a second diode, wherein a collector of the second gated NPN bipolar transistor is electrically connected to the second pad, wherein a gate, an emitter and a base of the second gated NPN bipolar transistor is electrically connected to the first node, wherein an anode of the second diode is electrically connected to first node, and a cathode of the second diode is electrically connected to the second pad,
wherein in response to a first type of transient electrical event that increases a voltage of the first pad relative to a voltage of the second pad, the protection circuit is configured to provide a low impedance path between the first pad and the second pad through the first gated NPN bipolar transistor and the second diode, and wherein in response to a second type of transient electrical event that increases the voltage of the second pad relative to the voltage of the first pad, the protection circuit is configured to provide a low impedance path between the second pad and the first pad through the second gated NPN bipolar transistor and the first diode.

17. The apparatus of claim 16,
wherein the third protection subcircuit comprises a third gated NPN bipolar transistor and a fourth gated NPN bipolar transistor, wherein each of the third and fourth gated NPN bipolar transistors comprises a base, an emitter, a collector, and a gate, wherein the collector of the third gated NPN bipolar transistor is electrically connected to the gate, emitter, and base of each of the first and second gated NPN bipolar transistors, wherein the collector of the fourth gated NPN bipolar transistor is electrically connected to the gate, emitter, and base of the third gated NPN bipolar transistor, and wherein the gate, emitter, and base of the fourth gated NPN bipolar transistor are electrically connected to the third pad.

18. The apparatus of claim 17, further comprising a first resistor and a second resistor, wherein the first resistor comprises a first end electrically connected to the base of the third gated NPN bipolar transistor and a second end electrically connected to the gate and emitter of the third gated NPN bipolar transistor, and wherein the second resistor comprises a first end electrically connected to the base of the fourth gated NPN bipolar transistor and a second end electrically connected to the gate and emitter of the fourth gated NPN bipolar transistor.

19. The apparatus of claim 18, further comprising a PNP bipolar transistor comprising a base electrically connected to the first node and an emitter and collector electrically connected to the third pad.

20. The apparatus of claim 16, wherein the third pad comprises a low impedance ground reference pad.

21. The apparatus of claim 16, wherein the integrated circuit comprises a switch and a current source electrically connected in series between the second pad and the third pad.

22. The apparatus of claim 16, wherein the first node is internal to the integrated circuit and is not externally accessible.

23. The apparatus of claim 16, wherein the first and second pads are electrically connected to a sensor interface.

* * * * *